US007386484B1

(12) United States Patent
Cuzzocrea

(10) Patent No.: US 7,386,484 B1
(45) Date of Patent: Jun. 10, 2008

(54) BUYING METHOD FOR RETAIL ESTABLISHMENTS

(76) Inventor: Lawrence A. Cuzzocrea, 3502 E. Vineyard Rd., Phoenix, AZ (US) 85040

( * ) Notice: Subject to any disclaimer, the term of this patent is extended or adjusted under 35 U.S.C. 154(b) by 400 days.

(21) Appl. No.: 10/867,996

(22) Filed: Jun. 14, 2004

Related U.S. Application Data

(60) Provisional application No. 60/478,472, filed on Jun. 12, 2003.

(51) Int. Cl.
G06Q 30/00 (2006.01)
G06F 17/30 (2006.01)
(52) U.S. Cl. .......................................... 705/26; 705/27
(58) Field of Classification Search ............. 705/26–27
See application file for complete search history.

(56) References Cited

U.S. PATENT DOCUMENTS 6,115,690 A * 9/2000 Wong ............................. 705/7

2003/0105722 A1  6/2003  Welt

OTHER PUBLICATIONS

"Support For True Team Computing," InformationWeek, p. 144, Nov. 20, 1995.*

* cited by examiner

*Primary Examiner*—Matthew S. Gart
(74) *Attorney, Agent, or Firm*—Stoneman Volk Patent Group; Martin L. Stoneman; Michael D. Volk, Jr.

(57) ABSTRACT

A system for improving and streamlining the evaluation and purchase of products from salespeople by buyers. In particular, methods for successfully managing interactions between buyers and sellers in high volume retail environments by implementing a standardized product offer proposal method and subsequent controls on the buying decision-making process. It utilizes existing tools and new software to improve buyer's efficiency by consolidating the software systems tools into a single standardized user interface and improves seller's efficiency by providing product offering proposal preparation and presentation tools as well as buyer appointment scheduling tools and generates revenue by buyers as an integral part of the buying process.

20 Claims, 63 Drawing Sheets

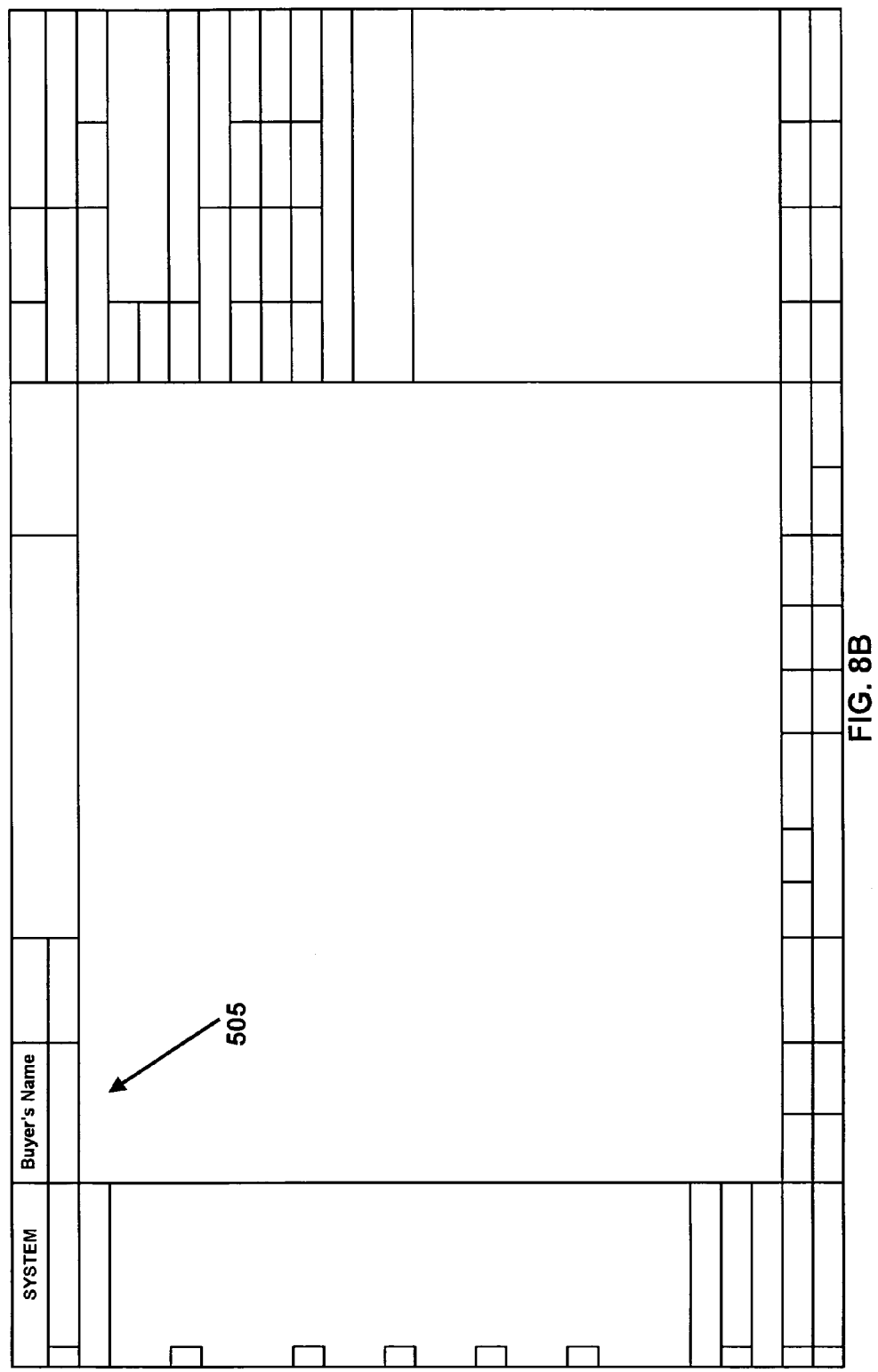

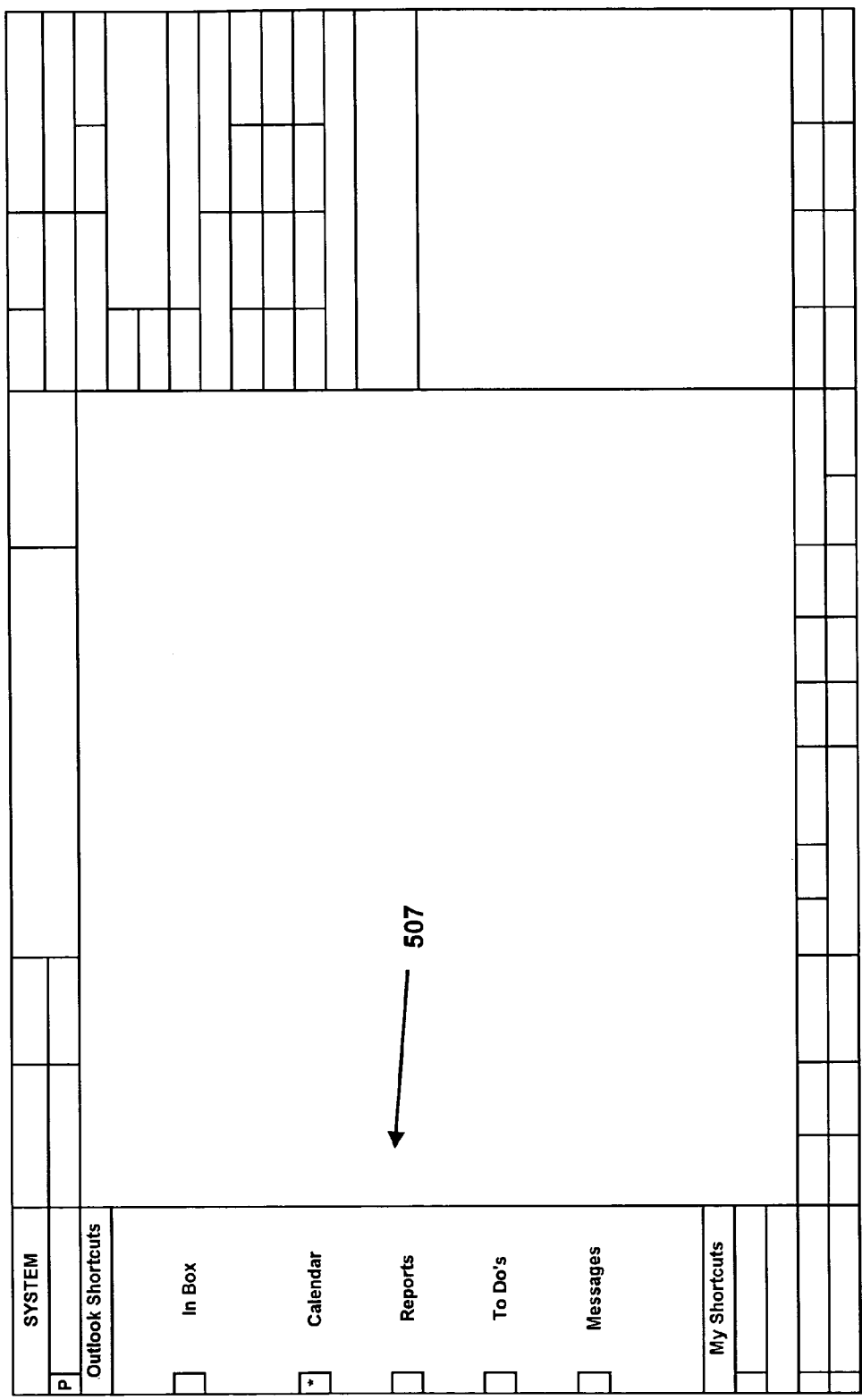

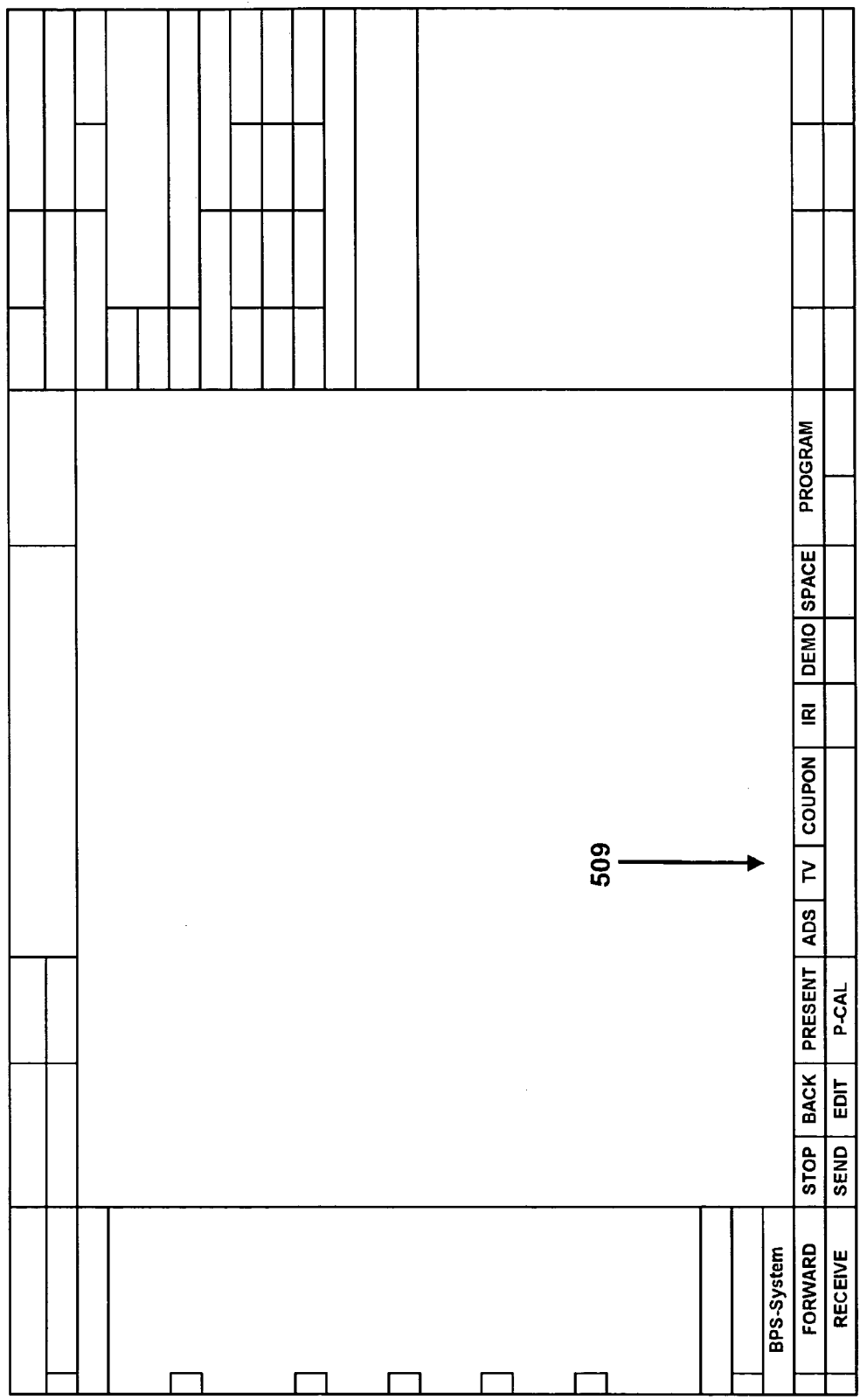

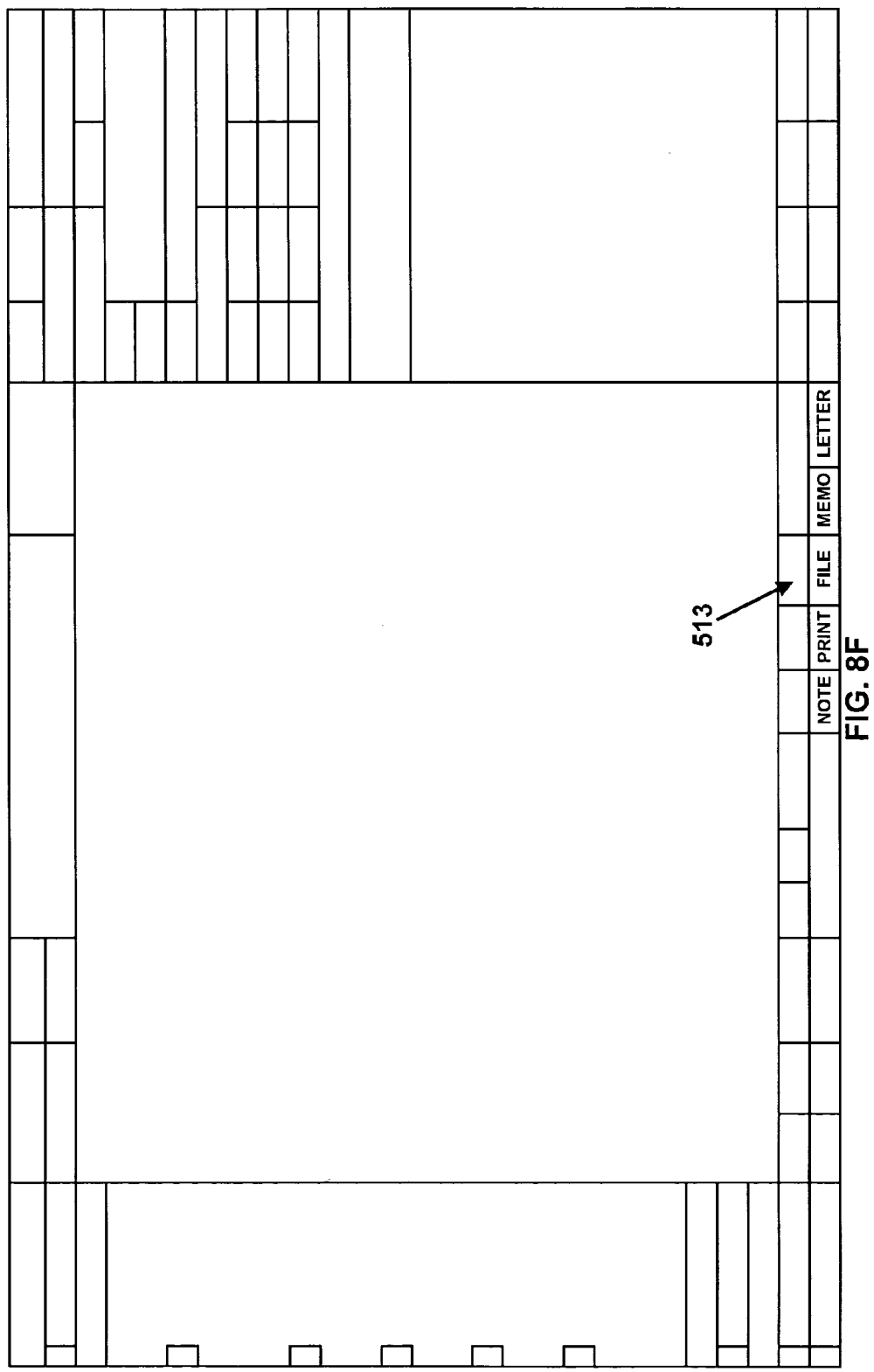

| SYSTEM | Buyer's Name | LOGO | BUYER'S COMPANY LOGO | BUYER IMAGE | CMS | HOME | September 18, 1999 |
|---|---|---|---|---|---|---|---|
| | PACKAGE ID | VOICE | | | MONDAY | | 1:26 PM |

| | | | | | |
|---|---|---|---|---|---|
| Outlook Shortcuts | | | | PRES. TIME | EXTEND | 0:00 |
| | | | | LOG-D | Start time | 12:56 PM |
| In Box | | | | LOG-M | End Time | 1:24 PM |
| | | | | LOG-T | Total | 0:28 |
| | | | | BILL TO | | LOG-All |
| Calendar | | | | ANS | Hang-UP | Cover | Scramble |
| | | | | FWD | Call-ID | Conf | Netwk |
| Reports | | | | HOLD | RECALL | REC | PH. BOOK |
| | | | | | Seller's Name | |
| To Do's | | ACTIVE SCREEN AREA | | SELLERS' COMPANY LOGO |
| | | 515 | | |
| Messages | | | | SELLER IMAGE |
| | | | | |
| My Shortcuts | | | | |
| PHONE LOG | | | | |
| BPS-System | | | | |

| FORWARD | STOP | BACK | PRESENT | ADS | TV | COUPON | IRI | DEMO | SPACE | PROGRAM | PHONE | V-MAIL | FAX | EMAIL |
|---|---|---|---|---|---|---|---|---|---|---|---|---|---|---|
| RECEIVE | SEND | EDIT | P-CAL | INTERNAL SYSTEMS | | | NOTE | PRINT | FILE | MEMO | LETTER | SCAN | ENCRYPT | SERVER | WWW |

| | |
|---|---|
| PRES. TIME | EXTEND 0:00 |
| LOG-D | Start time 12:56 PM |
| LOG-M | End Time 1:24 PM |
| LOG-T | Total 0:28 |
| BILL TO | LOG-All |

519

| SECURITY | Buyer's Name | LOGO | BUYER'S COMPANY LOGO | | BUYER | CMS | HOME | September 18, 1999 |
|---|---|---|---|---|---|---|---|---|
| 1 OF 7 | CSS-MN-SECURITY | VOICE | | | IMAGE | MONDAY | | 1:26 PM |

SECURITY MAIN PAGE - HOME PAGE

PASSWORDS

**A890-CFGL9***
**A890-CFGL9*  Verifying code  [A890-CFGL9***]
**A890-CFGL9*  User Name Field  [K G Durrant-4**]

MAIN-Password Instructions

| On / Off | Enter Password ONLY to open MAIN program |
| On / Off | Enter Password & Name to open MAIN program |
| On / Off | Enter Password, Name, & Voice scan to open MAIN program |
| On / Off | Voice Scan ONLY to open MAIN program |
| On / Off | Voice Scan & Password to open MAIN program |

Security Sequencer

| | |
|---|---|
| 1 | Password |
| 2 | Name |
| 3 | Voice Print |

MAIN-Screen Control

| On / Off | Enter Password ONLY on opening program |
| On / Off | Enter Password when screen is COVERED |
| On / Off | Enter Password before REPORTS is opened |
| On / Off | Enter Password before BPS is opened |
| On / Off | Enter Password before PERSONAL is opened |

Phone Log Access

| On / Off | At MAIN opening |
| On / Off | At EACH Access |
| On / Off | At OPEN 1st Access |
| On / Off | Separate ACCESS CODES |
| On / Off | **A890-CFGL9*** |
| On / Off | **A890-CFGL9*** |
| On / Off | **A890-CFGL9*** |

Personal-Password Instructions

| On / Off | Open Personal with Main system password |
| On / Off | Open Personal ONLY at first PERSONAL screen |

Passwords are necessary to:

| On / Off | COPY |
| On / Off | PRINT |
| On / Off | FAX |
| On / Off | E-Mail |
| On / Off | ENCRYPT |
| On / Off | SCRAMBLE |
| On / Off | EDIT |
| On / Off | SEND |
| On / Off | CSS-Button |
| On / Off | BPS- System |
| On / Off | PLS Button |
| On / Off | Internal Buttons |
| On / Off | SECURITY |

VOICE Verification is necessary to:

| On / Off | COPY |
| On / Off | PRINT |
| On / Off | FAX |
| On / Off | E-Mail |
| On / Off | ENCRYPT |
| On / Off | SCRAMBLE |
| On / Off | EDIT |
| On / Off | SEND |
| On / Off | CSS-Button |
| On / Off | BPS- System |
| On / Off | PLS Button |
| On / Off | Internal Buttons |
| On / Off | SECURITY |

PHONE LOG
BPS-System

| FORWARD | STOP | BACK | PASSWORDS | VOICE CONTROLS | AUTH USERS | VOICE SCAN | | | PHONE | V-MAIL | FAX | EMAIL |
|---|---|---|---|---|---|---|---|---|---|---|---|---|
| RECEIVE | SEND | EDIT | P-CAL | INTERNAL SYSTEMS | NOTE | PRINT | FILE | MEMO | LETTER | SCAN | ENCRYPT | SERVER | WWW |

FIG. 9

| SECURITY | Buyer's Name | LOGO | BUYER'S COMPANY LOGO | | BUYER IMAGE | CMS MONDAY | HOME | September 18, 1999 1:26 PM |
|---|---|---|---|---|---|---|---|---|
| P 2 OF 7 | CSS-MN-SECURITY | VOICE | | | | | | |

PASSWORDS

SECURITY MAIN PAGE- Personal

VOICE SCAN

Verifying code
User Name Field

VOICE Scan Instructions
- On / Off  Enter V-Scan ONLY to open MAIN program
- On / Off  Enter V-Scan & Name to open MAIN program
- On / Off  Enter Password & Name & Voice scan to open MAIN program
- On / Off  Voice scan ONLY to open PERSONAL program
- On / Off  Voice scan & Passwords to open PERSONAL program

Screen Control
- On / Off  Enter Password ONLY on opening MAIN program
- On / Off  Enter Password whenever screen is COVERED
- On / Off  Enter Password before REPORTS is opened
- On / Off  Enter Password before BPS is opened
- On / Off  Enter Password before Personal is opened

Personal-Password Instructions
- On / Off  Open Personal with Main system password- at opening screen
- On / Off  Open Personal ONLY at first PERSONAL screen

Passwords are necessary to:
- On / Off  COPY
- On / Off  PRINT
- On / Off  FAX
- On / Off  E-Mail
- On / Off  ENCRYPT
- On / Off  EDIT
- On / Off  SEND

VOICE Verification is necessary to:
- On / Off  COPY
- On / Off  PRINT
- On / Off  FAX
- On / Off  E-Mail
- On / Off  ENCRYPT
- On / Off  EDIT
- On / Off  SEND PHONE LOG
BPS-System

| FORWARD | STOP | BACK | | INTERNAL SYSTEMS | NOTE | PRINT | FILE | MEMO | LETTER | PHONE | V-MAIL | FAX | EMAIL |
|---|---|---|---|---|---|---|---|---|---|---|---|---|---|
| RECEIVE | SEND | EDIT | P-CAL | | | | | | | SCAN | ENCRYPT | SERVER | WWW |

| SYSTEM | Buyer's Name | LOGO | BUYER IMAGE | CMS | HOME | September 18, 1999 |
|---|---|---|---|---|---|---|
| P | PACKAGE ID | VOICE | | MONDAY | | 1:26 PM |

BUYER'S COMPANY LOGO

SECURITY MAIN PAGE

| | | | | PRES. TIME | EXTEND | 0:00 |
|---|---|---|---|---|---|---|
| | | | | LOG-D | Start time | 12:56 PM |
| User Name Field | | | | LOG-M | End Time | 1:24 PM |
| [          ] | | | | LOG-T | Total | 0:28 |
| | | | | BILL TO | | LOG-All |
| *Password Instructions* | | Password [          ] | | ANS | Hang-UP | Cover | Scramble |
| On / Off | Enter Password ONLY to open program | | | FWD | Call-ID | Conf | Netwk |
| On / Off | Enter Password & Name to open program | | | HOLD | RECALL | REC | PH. BOOK |
| On / Off | Enter Password, Name & Voice scan to open program | | | | Seller's Name | | |
| On / Off | Voice scan ONLY to open program | | | SELLERS' COMPANY LOGO | | | |
| On / Off | Voice scan & Password to open program | | | | | | |
| *Screen Control* | | Password [          ] | | | | | |
| On / Off | Enter password ONLY on opening program | | | | | | |
| On / Off | Enter password whenever screen is covered | | | SELLER IMAGE | | | |
| On / Off | Enter Password before REPORTS is opened | | | | | | |
| On / Off | Enter Password before BPS is opened | | | | | | |
| On / Off | Enter Password before Personal is opened | | | | | | |
| Voice Scan | | Authorized Users | | | | | |
| 1 | | 3 | | | | | |
| 2 | | 4 | | | | | |

BPS-System

| FORWARD | STOP | BACK | P-CAL | INTERNAL SYSTEMS | NOTE | PRINT | FILE | MEMO | LETTER | PHONE | V-MAIL | FAX | EMAIL |
|---|---|---|---|---|---|---|---|---|---|---|---|---|---|
| RECEIVE | SEND | EDIT | | | | | | | | SCAN | ENCRYPT | SERVER | WWW |

FIG. 12

| SECURITY | Buyer's Name | LOGO | BUYER'S COMPANY LOGO | BUYER IMAGE | CMS | HOME | September 18, 1999 |
|---|---|---|---|---|---|---|---|
| 4 OF 7 | CSS-MN-SECURITY | VOICE | | | MONDAY | | 1:26 PM |

VP Verification       Authorized USERS - MAIN

VOICE Print VERIFICATION

******** Verifying code
User Name Field

NAME    Voice Print

PHONE LOG
BPS-System

| FORWARD | STOP | BACK | | | | | | | | PHONE | V-MAIL | FAX | EMAIL |
|---|---|---|---|---|---|---|---|---|---|---|---|---|---|
| RECEIVE | SEND | EDIT | P-CAL | INTERNAL SYSTEMS | NOTE | PRINT | FILE | MEMO | LETTER | SCAN | ENCRYPT | SERVER | WWW |

| OUTLOOK | Buyer's Name | LOGO | BUYER'S COMPANY LOGO | | BUYER IMAGE | CMS | HOME | September 18, 1999 |
|---|---|---|---|---|---|---|---|---|
| P | 1 OF 5 | PACKAGE ID | VOICE | | | | MONDAY | 1:26 PM |

Outlook Shortcuts

Inbox

| | From | Subject | Received | Size |
|---|---|---|---|---|
| * | | | | |

* Calendar

☐ Reports

☐ To Do's

☐ Messages

*Typical MS Outlook Message list*

My Shortcuts

PHONE LOG

BPS-System

| FORWARD | STOP | BACK | | | | | | PHONE | V-MAIL | FAX | EMAIL |
|---|---|---|---|---|---|---|---|---|---|---|---|
| RECEIVE | SEND | EDIT | P-CAL | INTERNAL SYSTEMS | NOTE | PRINT | FILE | MEMO | LETTER | SCAN | ENCRYPT | SERVER | WWW |

| OUTLOOK | Buyer's Name | LOGO | BUYER'S COMPANY LOGO | BUYER IMAGE | CMS | HOME | September 18, 1999 |
|---|---|---|---|---|---|---|---|
| 3 OF 5 | PACKAGE ID | VOICE | | | MONDAY | | 1:26 PM |
| Outlook Shortcuts | TO DO - TASKS. | | | | PRES. TIME | EXTEND | 0:00 |
| | Subjects | | | | LOG-D | Start time | 12:56 PM |
| In Box | | | | | LOG-M | End Time | 1:24 PM |
| | | | | | LOG-T | Total | 0:28 |
| | | | | | BILL TO | | LOG-All |
| | | | | | ANS | Hang-UP | Cover | *Scramble* |
| Calendar | | | | | FWD | Call-ID | Conf | Netwk |
| | | | | | HOLD | RECALL | REC | PH. BOOK |
| | | | | | | | Seller's Name |
| Reports | | | | | SELLERS' COMPANY LOGO | | |
| To Do's | | | | | | | |
| Messages | | | | | SELLER IMAGE | | |
| My Shortcuts | | | | | | | |
| PHONE LOG | | | | | | | |
| BPS-System | | | | | | | |
| FORWARD | STOP | BACK | P-CAL | INTERNAL SYSTEMS | NOTE | PRINT | FILE | MEMO | LETTER | PHONE | V-MAIL | FAX | EMAIL |
| RECEIVE | SEND | EDIT | | | | | | | | SCAN | ENCRYPT | SERVER | WWW |

FIG. 17

| EXCEL | Buyer's Name | LOGO | | BUYER'S COMPANY LOGO | | | | BUYER IMAGE | | CMS | HOME | September 18, 1999 |
|---|---|---|---|---|---|---|---|---|---|---|---|---|
| 1 of 5 | PACKAGE ID | VOICE | | | | | | | | | MONDAY | 1:26 PM |
| Outlook Shortcuts | REPORTS | | By Department TOTAL - Brokerage $ | | | | | 1st Qtr | 1999 | PRES. TIME | | 0:00 |
| | BY COMPANY | | 1998 | 1999 | $ +/- | % +/- | | | | LOG-D | Start time | 12:56 PM |
| In Box | AMUROL | | $15,566.00 | $17,657 | $ 2,091 | 13.4% | | | | LOG-M | End Time | 1:24 PM |
| | Beernuts | | $2,829.00 | $2,915 | $ 86 | 3.0% | | | | LOG-T | Total | 0:28 |
| | Ferrara Pan Candy Co. | | $3,299.00 | $3,188 | $ (111) | -3.4% | | | | BILL TO | | LOG-All |
| | Ferrero USA | | $5,100.00 | $5,365 | $ 265 | 5.2% | | | | ANS | Hang-UP | Cover | Scramble |
| Calendar | Goodmark | | $8,400.00 | $10,380 | $ 1,980 | 23.6% | | | | FWD | Call-ID | Conf | Netwk |
| | Nature Kist | | $1,200.00 | $1,400 | $ 200 | 16.7% | | | | HOLD | RECALL | REC | PH. BOOK |
| | McKesson | | $5,800.00 | $6,200 | $ 400 | 6.9% | | | | Seller's Name | | |
| | Powerbar | | $2,378.00 | $2,155 | $ (223) | -9.4% | | | | SELLERS' COMPANY LOGO | | |
| Reports | Tootsie Roll | | $4,409.00 | $4,877 | $ 468 | 10.6% | | | | | | |
| | Very Fine | | $3,287.00 | $3,489 | $ 202 | 6.1% | | | | | | |
| To Do's | Totals | $ | 52,268 | $ 57,626 | $ 5,358 | 10.3% | | | | SELLER IMAGE | | |
| Messages | | | | | | | 15566 | | | | | |
| | AMUROL | | 2nd Qtr | | 3rd Qtr | | 4th Qtr | | 1998 vs. 1999 | | | |
| My Shortcuts | | | INTERNAL SYSTEMS | | NOTE | | PRINT | FILE | MEMO | LETTER | | |
| PHONE LOG | | | | | | | | | | PHONE | V-MAIL | FAX | EMAIL |
| BPS-System | STOP | BACK | | | | | | | | | | |
| FORWARD | SEND | EDIT | P-CAL | | | | | | | SCAN | ENCRYPT | SERVER | WWW |
| RECEIVE | | | | | | | | | | | | |

FIG. 18

| Outlook | Buyer's Name | LOGO | BUYER'S COMPANY LOGO | BUYER IMAGE | CMS | HOME | September 18, 1999 |
|---|---|---|---|---|---|---|---|
| 5 of 5 | PACKAGE ID | VOICE | | | MONDAY | | 1:26 PM |
| Outlook Shortcuts | MESSAGES | | | | PRES. TIME | EXTEND | 0:00 |
| | FROM: | Date | Time | Message | LOG-D | Start time | 12:56 PM |
| | | | | | LOG-M | End Time | 1:24 PM |
| In Box | | | | | LOG-T | Total | 0:28 |
| | | | | | BILL TO | | LOG-All |
| | | | | | ANS | Hang-UP | Cover | *Scramble* |
| Calendar | | | | | FWD | Call-ID | Conf | Netwk |
| | | | | | HOLD | RECALL | REC | PH. BOOK |
| | | | | | | Seller's Name | |
| Reports | | | | | SELLERS' COMPANY LOGO | | |
| To Do's | | | | | SELLER IMAGE | | |
| Messages | | | | | | | |
| My Shortcuts | | | | | | | |
| PHONE LOG | | | | | | | |
| BPS-System | | | | | | | |
| FORWARD | STOP | BACK | P-CAL | INTERNAL SYSTEMS | NOTE | PRINT | FILE | MEMO | LETTER | PHONE | V-MAIL | FAX | EMAIL |
| RECEIVE | SEND | EDIT | | | | | | | | SCAN | ENCRYPT | SERVER | WWW |

FIG. 19

BROKER INFO PAGE

BROKER
Broker Logo

Company
Address:

AE
Title

Phone
Cell
Pager
FAX
E-Mail
WEB Site

Secretary
Phone
Cell
Pager
FAX
E-Mail

| Transmit Info | Version |
|---|---|
| WINDOWS | 98 |
| EXCEL | 6.0 |
| WORD | 3.4 |
| POWERPOINT | 2000.0 |
| ACCESS | 4.2 |
| OUTLOOK | 6.1 |
| IMAGES | ULEAD |

Manufacturer
Manufacturer Logo

Company
Address:

AE
Title

Phone
Cell
Pager
FAX
E-Mail
WEB Site

Secretary
Phone
Cell
Pager
FAX
E-Mail

| Transmit Info | Version |
|---|---|
| WINDOWS | 98 |
| EXCEL | 6.0 |
| WORD | 3.4 |
| POWERPOINT | 2000.0 |
| ACCESS | 4.2 |
| OUTLOOK | 6.1 |
| IMAGES | ULEAD |

| Account Logo | Buyer INFO PAGE | Account Logo |
| --- | --- | --- |
| ACCOUNT- Head Buyer | | ACCOUNT- BUYER |

| Account: | | Account: | |
| --- | --- | --- | --- |
| Address: | | Address: | |
| Buyer: | | Buyer: | |
| Title | | Title | |
| Phone | | Phone | |
| Cell | | Cell | |
| Pager | | Pager | |
| FAX | | FAX | |
| E-Mail | | E-Mail | |
| WEB Site | | WEB Site | |
| Secretary | | Secretary | |
| Phone | | Phone | |
| Cell | | Cell | |
| Pager | | Pager | |
| FAX | | FAX | |
| E-Mail | | E-Mail | |

| Transmit Info | Version | Transmit Info | Version |
| --- | --- | --- | --- |
| WINDOWS | 98 | WINDOWS | 98 |
| EXCEL | 6.0 | EXCEL | 6.0 |
| WORD | 3.4 | WORD | 3.4 |
| POWERPOINT | 2000.0 | POWERPOINT | 2000.0 |
| ACCESS | 4.2 | ACCESS | 4.2 |
| OUTLOOK | 6.1 | OUTLOOK | 6.1 |
| IMAGES | ULEAD | IMAGES | ULEAD |

MANUFACTURER INFO PAGE

Manufacturer Logo     Manufacturer

Company:
Address:

AE
Title
Phone
Cell
Pager
FAX
E-Mail
WEB Site

Secretary
Phone
Cell
Pager
FAX
E-Mail

| Transmit Info | Version |
|---|---|
| WINDOWS | 98 |
| EXCEL | 6.0 |
| WORD | 3.4 |
| POWERPOINT | 2000.0 |
| ACCESS | 4.2 |
| OUTLOOK | 6.1 |
| IMAGES | ULEAD |

FIG. 22

| CONFIDENTIAL | | Internal Only | |
|---|---|---|---|
| | | INFO PAGE | |
| Phone Log Name | INFO ON HAND | Company | Advantage Sales & Mkt. |
| Mary Duginski | YES/NO | Address: | 3419 E. University Dr. |
| Phone Log Logo | UPDATE | | Phoenix, Arizona 85040 |
| | YES/NO | | |
| | | NAME | |
| Phone Log Static Photo | | Title | Account Executive |
| | | Phone | |
| | | Cell | |
| | | Pager | |
| | | V-Mail | |
| | | FAX | |
| | | E-Mail | |
| | | WEB Site | |
| | | Secretary | |
| | | Phone | |
| | | Cell | |
| | | Pager | |
| | | FAX | |
| ACTIVE Camera- RECEIVE | ON/OFF | E-Mail | |
| ACTIVE Camera- SEND | ON/OFF | | |
| Phone ONLY with Static Photo | ON/OFF | Transmit Info | Version |
| Phone ONLY with Company Logo | ON/OFF | WINDOWS | 98 |
| Personal | | EXCEL | 6.0 |
| Spouse | | WORD | 3.4 |
| Children | | POWERPOINT | 2000.0 |
| Hobbies | | ACCESS | 4.2 |
| | | OUTLOOK | 6.1 |
| | | IMAGES | ULEAD |
| | | CSS System Compatible | YES/NO |

| BPS Present | Buyer's Name | LOGO | MAIN PAGE | BUYER IMAGE | CMS | HOME | September 18, 1999 |
|---|---|---|---|---|---|---|---|
| 1 of 12 | SW-KD-P&G NI 18CT | VOICE | New Item Presentation | | MONDAY | | 1:26 PM |
| 9/18/1999 | Date | To: | BUYER'S COMPANY LOGO | SELLER LOGO | PRES. TIME | | EXTEND | 0:00 |
| 15100 | Project Log # | | | | LOG-D | Start time | 12:56 PM |
| Item Description | | | | | LOG-M | End Time | 1:24 PM |
| Coppertone - 12 piece Display | | | | | LOG-T | Total | 0:28 |
| Includes: | | | | | BILL TO | | LOG-All |
| | | | | | ANS | Hang-UP | Cover | Scramble |
| | | | | | FWD | Call-ID | Conf | Netwk |
| | | | | | HOLD | RECALL | REC | PH. BOOK |
| | | | | | | | Seller's Name |
| Date -Pres | GO -TO | 4/12/2000 | | | SELLERS' COMPANY LOGO | | |
| Date -Acpt | SEND | 5/6/2000 | | | | | |
| Date -Reject | SEND | | PROGRAM/PRODUCT IMAGE | | SELLER IMAGE | | |
| NEW ITEM | SEND | | | | | | |
| Promotion | SEND | | | | | | |
| Ad-Date | GO -TO | | | | | | |
| DEMO Dates | SEND | | | | | | |
| Program | SEND | | | | | | |
| Internal | SEND | | | | | | |
| Billing | SEND | | | | | | |
| Safe. RANK | GO -TO | | | | | | |
| Space Mang. | SEND | | | | | | |
| PHONE LOG | SEND | SET UP-ITEM | | | | | |
| BPS-System | | | | | | | |
| FORWARD | STOP | BACK | PRESENT | ADS | TV | COUPON | IRI | DEMO | SPACE | PROGRAM | PHONE | V-MAIL | FAX | EMAIL |
| RECEIVE | SEND | EDIT | P-CAL | INTERNAL SYSTEMS | NOTE | PRINT | FILE | MEMO | LETTER | SCAN | ENCRYPT | SERVER | WWW |

FIG. 26

| BPS Present | Buyer's Name | LOGO | MAIN PAGE | BUYER IMAGE | CMS | HOME | September 18, 1999 |
|---|---|---|---|---|---|---|---|
| 2 of 12 | SW-KD-P&G NI 18CT | VOICE | New Item Presentation | | | MONDAY | 1:26 PM |

| 9/18/1999 | Date | To: | BUYER'S COMPANY LOGO | SELLER LOGO | PRES. TIME | | EXTEND | 0:00 |
|---|---|---|---|---|---|---|---|---|
| 15100 | Project Log # | | | | LOG-D | Start time | | 12:56 PM |
| Item Description | | | | | LOG-M | End Time | | 1:24 PM |
| | | | | | LOG-T | Total | | 0:28 |
| Includes: | | | Coppertone - 12 piece Display | | BILL TO | | LOG-All | |
| | | | | | ANS | Hang-UP | Cover | Scramble |
| | | | KEY POINTS | | FWD | Call-ID | Conf | Netwk |
| | | | • • • • • • • • • | | HOLD | RECALL | REC | PH. BOOK |
| | | | | | | Seller's Name | | |
| | | | | | SELLERS' COMPANY LOGO | | | |
| PROGRAM/PRODUCT IMAGE | | | | | SELLER IMAGE | | | |

| BPS-System | | PRESS TO START | | | | | | | | | | | | |
|---|---|---|---|---|---|---|---|---|---|---|---|---|---|---|
| FORWARD | STOP | BACK | PRESENT | ADS | TV | COUPON | IRI | DEMO | SPACE | PROGRAM | PHONE | V-MAIL | FAX | EMAIL |
| RECEIVE | SEND | EDIT | P-CAL | INTERNAL SYSTEMS | NOTE | PRINT | FILE | MEMO | LETTER | | SCAN | ENCRYPT | SERVER | WWW |

FIG. 27

| BPS Present | Buyer's Name | LOGO | MAIN PAGE | BUYER IMAGE | CMS | HOME | September 18, 1999 |
|---|---|---|---|---|---|---|---|
| 3 of 12 | SW-KD-P&G NI 18CT | VOICE | New Item Presentation | SELLER LOGO | MONDAY | | 1:26 PM |
| 9/18/1999 | Date | | To: | | PRES. TIME | EXTEND | 0:00 |
| 15100 | Project Log # | | BUYER'S COMPANY LOGO | | LOG-D | Start time | 12:56 PM |
| Item Description | | | | | LOG-M | End Time | 1:24 PM |
| Includes: | | | Coppertone - 12 piece Display | | LOG-T | Total | 0:28 |
| | | | | | BILL TO | | LOG-All |
| | | | | | ANS | Hang-UP | Cover | Scramble |
| | | | AD SUPPORT | | FWD | Call-ID | Conf | Netwk |
| | | | . . . . . . . . . | | HOLD | RECALL | REC | PH. BOOK |
| | | | | | | Seller's Name | |
| | | | | | SELLERS' COMPANY LOGO | | |
| | | | PROGRAM/PRODUCT IMAGE | | SELLER IMAGE | | |
| BPS-System | | | PRESS FOR AD SUPPORT | | | | |
| | STOP | BACK | PRESENT | ADS | TV | COUPON | IRI | DEMO | SPACE | PROGRAM | PHONE | V-MAIL | FAX | EMAIL |
| FORWARD | SEND | EDIT | P-CAL | INTERNAL SYSTEMS | NOTE | PRINT | FILE | MEMO | LETTER | SCAN | ENCRYPT | SERVER | WWW |
| RECEIVE | | | | | | | | | | | | | |

FIG. 28

| BPS Present | Buyer's Name | LOGO | MAIN PAGE | BUYER IMAGE | CMS | HOME | September 18, 1999 |
|---|---|---|---|---|---|---|---|
| 5 of 12 | SW-KD-P&G NI 18CT | VOICE | New Item Presentation | SELLER LOGO | MONDAY | | 1:26 PM |
| 9/18/1999 | Date | To: | BUYER'S COMPANY LOGO | | PRES. TIME | EXTEND | 0:00 |
| 15100 | Project Log # | | | | LOG-D | Start time | 12:56 PM |
| Item Description | | | | | LOG-M | End Time | 1:24 PM |
| | | | | | LOG-T | Total | 0:28 |
| Includes: | | | Coppertone - 12 piece Display | | BILL TO | | LOG-All |
| | | | | | ANS | Hang-UP | Cover | Scramble |
| | | | TV ADVERTISING | | FWD | Call-ID | Conf | Netwk |
| | | | · · · · · · · · | | HOLD | RECALL | REC | PH. BOOK |
| | | | | | | Seller's Name | |
| | | | | | SELLERS' COMPANY LOGO | | |
| | | PROGRAM/PRODUCT IMAGE | | | SELLER IMAGE | | |

| BPS-System | | | | PRESS FOR TV ADS | | | | | | | | | |
|---|---|---|---|---|---|---|---|---|---|---|---|---|---|
| FORWARD | STOP | BACK | PRESENT | ADS | TV | COUPON | IRI | DEMO | SPACE | PROGRAM | PHONE | V-MAIL | FAX | EMAIL |
| RECEIVE | SEND | EDIT | P-CAL | INTERNAL SYSTEMS | NOTE | PRINT | FILE | MEMO | LETTER | SCAN | ENCRYPT | SERVER | WWW |

FIG. 29

| BPS Present | Buyer's Name | LOGO | MAIN PAGE | BUYER IMAGE | CMS | HOME | September 18, 1999 |
|---|---|---|---|---|---|---|---|
| 62 of 12 | SW-KD-P&G NI 18CT | VOICE | New Item Presentation | | MONDAY | | 1:26 PM |
| 9/18/1999 | Date | To: | BUYER'S COMPANY LOGO | SELLER LOGO | PRES. TIME | EXTEND | 0:00 |
| 15100 | Project Log # | | | | LOG-D | Start time | 12:56 PM |
| Item Description | | | | | LOG-M | End Time | 1:24 PM |
| | | | | | LOG-T | Total | 0:28 |
| Includes: | | | Coppertone - 12 piece Display | | BILL TO | | LOG-All |
| | | | | | ANS | Hang-UP | Cover | Scramble |
| | | | COUPON SUPPORT | | FWD | Call-ID | Conf | Netwk |
| | | | | | HOLD | RECALL | REC | PH. BOOK |
| | | | . . . . . . . . . . . . . | | | Seller's Name | |
| | | | | | SELLERS' COMPANY LOGO | | |
| | PROGRAM/PRODUCT IMAGE | | | | SELLER IMAGE | | |
| BPS-System | | | PRESS FOR COUPON SUPPORT | | | | |
| FORWARD | STOP | BACK | PRESENT | ADS | TV | COUPON | IRI | DEMO | SPACE | PROGRAM | PHONE | V-MAIL | FAX | EMAIL |
| RECEIVE | SEND | EDIT | P-CAL | INTERNAL SYSTEMS | NOTE | PRINT | FILE | MEMO | LETTER | SCAN | ENCRYPT | SERVER | WWW |

FIG. 30

| BPS Present | Buyer's Name | LOGO | MAIN PAGE | BUYER | CMS | HOME | September 18, 1999 |
|---|---|---|---|---|---|---|---|
| P 7 of 12 | SW-KD-P&G NI 18CT | VOICE | New Item Presentation | IMAGE | MONDAY | | 1:26 PM |
| 9/18/1999 | Date | To: | BUYER'S COMPANY LOGO | SELLER LOGO | PRES. TIME | | EXTEND 0:00 |
| 15100 | Project Log # | | | | LOG-D | Start time | 12:56 PM |
| Item Description | | | | | LOG-M | End Time | 1:24 PM |
| | | | | | LOG-T | Total | 0:28 |
| Includes: | | | Coppertone - 12 piece Display | | BILL TO | | LOG-All |
| | | | | | ANS | Hang-UP | Cover | Scramble |
| | | | IRI DATA | | FWD | Call-ID | Conf | Netwk |
| | | | · · · · · · · · | | HOLD | RECALL | REC | PH. BOOK |
| | | | | | | Seller's Name | |
| | | | | | SELLERS' COMPANY LOGO | | |
| PROGRAM/PRODUCT IMAGE | | | | | SELLER IMAGE | | |
| | | | PRESS FOR IRI DATA | | | | |
| BPS-System | | | | | | | |
| | STOP | BACK | PRESENT | ADS | TV | COUPON | IRI | DEMO | SPACE | PROGRAM | PHONE | V-MAIL | FAX | EMAIL |
| FORWARD | SEND | EDIT | P-CAL | INTERNAL SYSTEMS | NOTE | PRINT | FILE | MEMO | LETTER | SCAN | ENCRYPT | SERVER | WWW |
| RECEIVE | | | | | | | | | | | | | |

FIG. 31

| BPS Present | Buyer's Name | | LOGO | MAIN PAGE | BUYER IMAGE | CMS | HOME | September 18, 1999 |
|---|---|---|---|---|---|---|---|---|
| 8 of 12 | SW-KD-P&G NI 18CT | | VOICE | New Item Presentation | | MONDAY | | 1:26 PM |
| 9/18/1999 | Date | | To: | BUYER'S COMPANY LOGO | SELLER LOGO | PRES. TIME | EXTEND | 0:00 |
| 15100 | Project Log # | | | | | LOG-D | Start time | 12:56 PM |
| Item Description | | | | | | LOG-M | End Time | 1:24 PM |
| Includes: | | | | Coppertone - 12 piece Display | | LOG-T | Total | 0:28 |
| | | | | | | BILL TO | | LOG-All |
| | | | | | | ANS | Hang-UP | Cover | Scramble |
| | | | | DEMO SUPPORT | | FWD | Call-ID | Conf | Netwk |
| | | | | . . . . . . . . . . | | HOLD | RECALL | REC | PH. BOOK |
| | | | | | | | Seller's Name | |
| | | | | | | SELLERS' COMPANY LOGO | | |
| PROGRAM/PRODUCT IMAGE | | | | | | SELLER IMAGE | | |
| BPS-System | | | | PRESENT | ADS | TV | COUPON | IRI | DEMO | SPACE | PROGRAM | PRESS FOR DEMO SUPPORT |
| FORWARD | STOP | BACK | | P-CAL | INTERNAL SYSTEMS | NOTE | PRINT | FILE | MEMO | LETTER | | |
| RECEIVE | SEND | EDIT | | PHONE | V-MAIL | FAX | EMAIL | | | | | |
| | | | | SCAN | ENCRYPT | SERVER | WWW | | | | | |

FIG. 32

| BPS Present | Buyer's Name | LOGO | MAIN PAGE | BUYER IMAGE | CMS | HOME | September 18, 1999 |
|---|---|---|---|---|---|---|---|
| 9 of 12 | SW-KD-P&G NI 18CT | VOICE | New Item Presentation | | MONDAY | | 1:26 PM |
| 9/18/1999 | Date | To: | BUYER'S COMPANY LOGO | SELLER LOGO | PRES. TIME | | EXTEND | 0:00 |
| 15100 | Project Log # | | | | LOG-D | Start time | 12:56 PM |
| Item Description | | | | | LOG-M | End Time | 1:24 PM |
| Includes: | | | Coppertone - 12 piece Display | | LOG-T | Total | 0:28 |
| | | | | | BILL TO | | LOG-All |
| | | | SCHEMATIC RECOMMENDATIONS | | ANS | Hang-UP | Cover | Scramble |
| | | | · · · · · · · · · | | FWD | Call-ID | Conf | Netwk |
| | | | | | HOLD | RECALL | REC | PH. BOOK |
| | | | | | | Seller's Name | |
| PROGRAM/PRODUCT IMAGE | | | | | SELLERS' COMPANY LOGO | | |
| | | | | | SELLER IMAGE | | |
| | | | PRESS FOR SCHEMATICS | | | | |
| BPS-System | | | | | | | |
| FORWARD | STOP | BACK | PRESENT | ADS | TV | COUPON | IRI | DEMO | SPACE | PROGRAM | PHONE | V-MAIL | FAX | EMAIL |
| RECEIVE | SEND | EDIT | P-CAL | INTERNAL SYSTEMS | NOTE | PRINT | FILE | MEMO | LETTER | SCAN | ENCRYPT | SERVER | WWW |

FIG. 33

| BPS Present | Buyer's Name | LOGO | MAIN PAGE | BUYER IMAGE | CMS | HOME | September 18, 1999 |
|---|---|---|---|---|---|---|---|
| 10 of 12 | SW-KD-P&G NI 18CT | VOICE | New Item Presentation | | MONDAY | | 1:26 PM |
| 9/18/1999 | Date | | To: | SELLER LOGO | PRES. TIME | EXTEND | 0:00 |
| 16100 | Project Log # | | BUYER'S COMPANY LOGO | | LOG-D | Start time | 12:56 PM |
| Item Description | | | | | LOG-M | End Time | 1:24 PM |
| | | | | | LOG-T | Total | 0:28 |
| Includes: | | | Coppertone - 12 piece Display | | BILL TO | | LOG-All |
| | | | | | ANS | Hang-UP | Cover | Scramble |
| | | | PROGRAM - 2000 | | FWD | Call-ID | Conf | Netwk |
| | | | . . . . . . . . . | | HOLD | RECALL | REC | PH. BOOK |
| | | | | | | Seller's Name | |
| | | | | | SELLERS' COMPANY LOGO | | |
| PROGRAM/PRODUCT IMAGE | | | | | SELLER IMAGE | | |
| | | | | | | | |
| | | | PRESS FOR PROGRAM | | | | |
| BPS-System | | | PRESENT | ADS | TV | COUPON | IRI | DEMO | SPACE | PROGRAM | PHONE | V-MAIL | FAX | EMAIL |
| FORWARD | STOP | BACK | P-CAL | INTERNAL SYSTEMS | NOTE | PRINT | FILE | MEMO | LETTER | SCAN | ENCRYPT | SERVER | WWW |
| RECEIVE | SEND | EDIT | | | | | | | | | | | |

FIG. 34

| Outlook | Buyer's Name | LOGO | BUYER'S COMPANY LOGO | BUYER IMAGE | CMS | HOME | September 18, 1999 | | |
|---|---|---|---|---|---|---|---|---|---|
| 1 of 5 | PACKAGE ID | VOICE | | | MONDAY | | 1:26 PM | | |
| | | | | | PRES. TIME | | EXTEND | 0:00 | |
| | | | | | LOG-D | | Start time | 12:56 PM | |
| | | | | | LOG-M | | End Time | 1:24 PM | |
| | | | | | LOG-T | | Total | 0:28 | |
| | | | | | BILL TO | | LOG-All | | |
| | | | | | ANS | Hang-UP | Cover | Scramble | |
| | | | | | FWD | Call-ID | Conf | Netwk | |
| | | | | | HOLD | RECALL | REC | PH. BOOK | |
| | | | | | | Seller's Name | | | |
| | | | | | SELLERS' COMPANY LOGO | | | | |
| | | | | | SELLER IMAGE | | | | |
| | | | Buyer's Company Logo | | | | | | |
| | | | | | PHONE | V-MAIL | FAX | EMAIL | |
| | | | | | SCAN | ENCRYPT | SERVER | WWW | |

FIG. 35

| CMS | Buyer's Name | LOGO | BUYER'S COMPANY LOGO | BUYER IMAGE | CMS | HOME | September 18, 1999 |
|---|---|---|---|---|---|---|---|
| P | 1 of 4 | PACKAGE ID | VOICE | | MONDAY | | 1:26 PM |
| Phone Log | | | Phone Log- Main Control Page # 1 | | | | |
| LOG-START | | | | | Call-ID | ON | Auto Call-ID |
| LOG-M | | | | | | | Call Waiting - NOTE |
| LOG-T | ANSWER | ON | Auto Answer | Immediate | | | Call Waiting - Blink |
| LOG ALL | | 3 | Number of Rings to V-Mail | | Scramble | | Auto Scramble |
| BILL To | | ON | Foreword to | SET Clock | | | ALL Conference |
| ANSWER | Hang-UP | ON | AUTO HANG-UP | Year / Month / Day | | | ALL Network |
| Hang-UP | | | Immediate Hang Up | 1999 / 9 / Monday | | | Auto Bug Check |
| | | | Use Cover Image | Hour / Min / Sec | Conference | | Auto Conference |
| HOLD | | | | 12 / 34 / 15 | | | INTERNAL Only |
| COVER | HOLD | ON | AUTO- HOLD HOLD Message | on/off Daylight Savings | | | |
| Call-ID | | | Use Cover Image #1 | Please HOLD and I will return momentarily | | | External |
| Scramble | | | Use Cover Image #2 | | | | WWW. Network |
| Conference | | | Use Cover Image #3 | If you cannot HOLD at this time, Please hang up and return your call in 5 minutes | | | Auto Security Check |
| Network | COVER | ON | AUTO COVER-Reg Active ONLY | | Network | | Auto Send- Preselected Group |
| | | | COVER FULL ACTIVE AREA | Please HOLD and I will return momentarily | | | Auto Network |
| | | | COVER FULL PAGE | | | | INTERNAL Only |
| | | | Delay Cover- Seconds | BUYER'S COMPANY LOGO | | | External |
| | | | Screen Saver COVER #1> ON | | | | WWW. Network |
| Encrypt | | | COVER #1> | | | | Auto Security Check |
| Security | | | COVER #2> COVER #2> | | | | Auto Send- Preselected Group |
| PHONE LOG | | | COVER #3 | | | | Please Connect NOW |
| BPS-System | | | COVER #3> | | | | Network Meeting will Begin at: 10:00am |
| FORWARD | STOP | BACK | | NOTE | PRINT | FILE | MEMO | LETTER | PHONE | V-MAIL | FAX | EMAIL |
| RECEIVE | SEND | EDIT | P-CAL | INTERNAL SYSTEMS | SCAN | ENCRYPT | SERVER | WWW |

FIG. 37

| CMS | Buyer's Name | LOGO | BUYER'S COMPANY LOGO | BUYER IMAGE | CMS | HOME | September 18, 1999 |
|---|---|---|---|---|---|---|---|
| 2 OF 4 | PACKAGE ID | VOICE | | | MONDAY | | 1:26 PM |

Phone Log- Main Control Page # 2

| Phone Log | | | | | | | |
|---|---|---|---|---|---|---|---|
| LOG-D | | | | | | | |
| LOG-M | | | | | | | |
| LOG-T | Phone Log | GENERAL Controls | | Encrypt | ON | Auto Encryption- Before Transmit | |
| LOG ALL | LOG ALL | ON | Auto Log-Logs ALL Calls | | | All pages in Active Screen Area | |
| BILL To | | | Log ONLY BPS Presentations | | | Encrypt ALL Data | |
| ANSWER | BILL To | ON | Auto Bill- Any EXTEND Pres. Time | | | Encrypt Page Only When Selected | |
| Hang-UP | | | Bill ONLY -X-Box in Phone LOG-M | | | | |
| HOLD | | | | | | | |
| COVER | | | | | | | |
| Call-ID | LOG-D | By Date | LOG-M | By Manufacturer | LOG-T | Total Log | Security |
| Scramble | View Order | | View Order | | View Order | | Auto Log - All Access |
| Conference- | Oldest First | ON | Oldest First | ON | Oldest First | ON | Notify USER |
| Network | Newest First | | Newest First | | Newest First | | Authorized Access Codes |
| RECALL | | | | | | | |
| RECORD | DAY | | DAY | | DAY | | |
| PH BOOK | WEEK | | WEEK | | WEEK | | Auto-to LOG-S |
| | MONTH | | MONTH | ON | MONTH | | Access ONLY Via |
| Encrypt | ALL | | ALL | | ALL | ON | Security Main Page |
| Security | | | | | | | |
| PHONE LOG | | | | | | | |
| BPS-System | | | | | | | |
| FORWARD | STOP | BACK | PRESENT | ADS | TV | COUPON | IRI | DEMO | SPACE | PROGRAM | PHONE | V-MAIL | | FAX | EMAIL |
| RECEIVE | SEND | EDIT | P-CAL | INTERNAL SYSTEMS | | NOTE | PRINT | FILE | MEMO | LETTER | SCAN | ENCRYPT | SERVER | WWW |

FIG. 38

| CMS | Buyer's Name | LOGO | BUYER'S COMPANY LOGO | BUYER IMAGE | CMS | HOME | September 18, 1999 |
|---|---|---|---|---|---|---|---|
| 3 of 4 | PACKAGE ID | VOICE | | | MONDAY | | 1:26 PM |
| Phone Log | | | | | PRES. TIME | EXTEND | 0:00 |
| LOG-START | | | *Phone Log - Sample POP UP NOTICES #3* | | LOG-D | Start time | 12:56 |
| LOG-by Manf | | | | | LOG-M | End Time | 13:04 |
| LOG-TOTAL | | | Message POP UP for | | LOG-T | Total | 0:08 |
| LOG ALL | | | Network Connections | | BILL TO | | LOG-All |
| BILL To | | | Please Connect NOW | | ANSWER | Hang-UP | COVER | Scramble |
| ANSWER | | | Network Meeting will Begin at: | | Forward | Call-ID | Conference | Network |
| Hang-UP | | | 10:00am | | HOLD | CALLER ID POP UP AREA | |
| HOLD | | | | | SELLERS' COMPANY LOGO | | |
| COVER | | | | | | | |
| Call-ID | | | Message POP UP for Both | | | | |
| Scramble | | | Scrambled Connections | | | | |
| Conference | | | CONTACT CONFIRMED | | Active cell or Photo pop up | | |
| Network | | | PHONE CONVERSATION | | | | |
| RECALL | | | SCRAMBLED | | | | |
| RECORD | | | | | | | |
| PH BOOK | | | Message POP UP for Both | | | | |
| | | | Encrypted Connections | | CMS SYSTEM | | |
| Encrypt | | | MESSAGE | | | | |
| Security | | | *ENCRYPTED* | | | | |
| PHONE LOG | | | | | ACTIVE POP UP Area | | |
| BPS-System | | | | | | | |
| FORWARD | STOP | BACK | PRESENT | ADS | TV | COUPON | IRI | DEMO | SPACE | PROGRAM | PHONE | V-MAIL | FAX | EMAIL |
| RECEIVE | SEND | EDIT | P-CAL | INTERNAL SYSTEMS | | | NOTE | PRINT | FILE | MEMO | LETTER | SCAN | ENCRYPT | SERVER | WWW |

FIG. 39

| CMS | Buyer's Name | LOGO | BUYER'S COMPANY LOGO | BUYER IMAGE | CMS | HOME | September 18, 1999 |
|---|---|---|---|---|---|---|---|
| 1 of 3 | PACKAGE ID | VOICE | | | MONDAY | | 1:26 PM |
| Phone Log | | | | | PRES. TIME | EXTEND | 0:00 |
| LOG-START | | | *Phone Log - MAIN LOG - LOG ALL* | | LOG-D | Start time | 12:56 |
| LOG-by Manf | | | | | LOG-M | End Time | 13:04 |
| LOG-TOTAL | | | | | LOG-T | Total | 0:08 |
| LOG ALL | | ☐ Log ALL Phone Calls | *LOG Access-Security* | | BILL TO | | LOG-All |
| BILL To | | ☐ Log ONLY Presentation Calls | | | ANSWER | Hang-UP | COVER | Scramble |
| ANSWER | | | | | Forward | Call-ID | Conference | Network |
| Hang-UP | | ☐ Flash Extend Button >>> | Flash Interval | | HOLD | RECALL | RECORD | PH BOOK |
| HOLD | | ☐ Flash all Phone Butons >>> | Flash Interval | | | *CALLER ID POP UP AREA* | |
| COVER | | ☐ REVERSE COLOR & HOLD | | | SELLERS' COMPANY LOGO | | |
| Call-ID | | | | | | | |
| Scramble | | | | | | | |
| Conference | | | | | SELLER IMAGE | | |
| Network | | | | | | | |
| | | | | | | | |
| *Encrypt* | | | | | | | |
| Security | | | | | | | |
| PHONE LOG | | | | | | | |
| BPS-System | | | | | | | |
| FORWARD | STOP | Back | MAIN Entry | LOG Reports | Month | YEAR | Manufacturer | REPORT | Phone | V-Mail | FAX | E-Mail |
| RECEIVE | SEND | EDIT | P-CAL | INTERNAL SYSTEMS | NOTE | PRINT | FILE | MEMO | LETTER | SCAN | ENCRYPT | SERVER | WWW |

| CMS | Buyer's Name | LOGO | BUYER'S COMPANY LOGO | BUYER IMAGE | CMS | HOME | September 18, 1999 |
|---|---|---|---|---|---|---|---|
| P  1 of 3 | PACKAGE ID | VOICE | | | MONDAY | | 1:26 PM |
| Phone Log | | | | | PRES. TIME | EXTEND | 0:00 |
| LOG-START | | | *Phone Log- MAIN SCREEN LOG ALL CALLER* | | LOG-D | Start time | 12:56 PM |
| LOG-by Manf | | | | | LOG-M | End Time | 1:24 PM |
| LOG-TOTAL | | | | | LOG-T | Total | 0:28 |
| LOG ALL | *CALLER NAME FIELD* | | | | BILL TO | | LOG-All |
| BILL To | | Activate Caller Name Field | | | ANS | Hang-UP | Cover | *Scramble* |
| ANSWER | | Activate Caller ID in Name Field | | | FWD | Call-ID | Conf | Netwk |
| Hang-UP | | Activate Call Waiting in Name Field | | | HOLD | RECALL | REC | PH. BOOK |
| HOLD | | | | | | Seller's Name | | |
| COVER | *LOGO FIELD* | | | *LOG ALL SAMPLE* | SELLERS' COMPANY LOGO | | |
| Call-ID | | Activate Caller LOGO Field | | | | | |
| Scramble | | Activate Caller ID in LOGO Field | | | | | |
| Conference | | Activate Call waiting in LOGO Field | | | | SELLER IMAGE | | |
| Network | *PHOTO FIELD* | | | | | | |
| | SEND | RECEIVE | Activate LOGO ONLY in Photo Field | | | | |
| | | | Activate Photo Field- Active Camera | | | | |
| | | | Activate Still Photo ONLY in Photo Field | | | | |
| *Encrypt* | | | | | | | |
| Security | * | * | LOG All Phone Calls | | | | |
| PHONE LOG | | | Record ALL Phone Calls | | | | |
| BPS-System | | | | | | | |
| FORWARD | STOP | BACK | MAIN Entry | LOG Reports | Month | YEAR | Manufacturer | REPORT | PHONE | V-MAIL | FAX | EMAIL |
| RECEIVE | SEND | EDIT | P-CAL | INTERNAL SYSTEMS | NOTE | PRINT | FILE | MEMO | LETTER | SCAN | ENCRYPT | SERVER | WWW |

FIG. 42

| CMS | Buyer's Name | LOGO | BUYER IMAGE | CMS | HOME | September 18, 1999 |
|---|---|---|---|---|---|---|
| 1 of 3 | PACKAGE ID | VOICE | | MONDAY | | 1:26 PM |
| Phone Log | | | | PRES. TIME | EXTEND | 0:00 |
| LOG-START | *Phone Log- MAIN SCREEN LOG ALL CALLER* | | | LOG-D | Start time | 12:56 PM |
| LOG-by Manf | | | | LOG-M | End Time | 1:24 PM |
| LOG- TOTAL | | | | LOG-T | Total | 0:28 |
| LOG ALL | | | | BILL TO | | LOG-All |
| *BILL To* | Activate Caller Name Field | | | ANS | Hang-UP | Cover | *Scramble* |
| ANSWER | Activate Caller ID in Name Field | | | FWD | Call-ID | Conf | Netwk |
| Hang-UP | Activate Call Waiting in Name Field | | | HOLD | RECALL | REC | PH. BOOK |
| HOLD | | | | | Seller's Name | |
| COVER | | | *BILL TO SAMPLE* | SELLERS' COMPANY LOGO | | |
| Call-ID | Activate Caller LOGO Field | | | | | |
| Scramble | Activate Caller ID in LOGO Field | | | | | |
| Conference | Activate Call waiting in LOGO Field | | | | SELLER IMAGE | |
| Network | | | | | | |
| | SEND RECEIVE | | | | | |
| | Activate LOGO ONLY in Photo Field | | | | | |
| | Activate Photo Field- Active Camera | | | | | |
| | Activate Still Photo ONLY in Photo Field | | | | | |
| *Encrypt* | | | | | | |
| Security | LOG All Phone Calls | | | | | |
| PHONE LOG | Record ALL Phone Calls | | | | | |
| BPS-System | | | | | | |
| FORWARD | STOP | BACK | MAIN Entry | LOG Reports | Month | YEAR | Manufacturer | REPORT | PHONE | V-MAIL | FAX | EMAIL |
| RECEIVE | SEND | EDIT | P-CAL | INTERNAL SYSTEMS | NOTE | PRINT | FILE | MEMO | LETTER | SCAN | ENCRYPT | SERVER | WWW |

FIG. 43

| CMS | Buyer's Name | LOGO | | | BUYER'S COMPANY LOGO | | | BUYER IMAGE | | CMS | HOME | September 18, 1999 | |
|---|---|---|---|---|---|---|---|---|---|---|---|---|---|
| 1 OF 17 | PACKAGE ID | VOICE | | | | | | | | MONDAY | | 1:26 PM | |
| Phone Log | | | | | | | | | | PRES. TIME | | EXTEND | 0:00 |
| LOG-Day | | | | | Phone Log - MAIN LOG - TOTAL | | | | | LOG-D | | Start time | 12:56 |
| LOG-by Manf | | | | | | | | | | LOG-M | | End Time | 13:04 |
| LOG-TOTAL | Date | Start | End | Total Min | Bill | BILL To | EX-Time | Comment | | LOG-T | | Total | 0:08 |
| LOG ALL | 5/20/1999 | 9:00 | 9:05 | 0:05 | | | | | | BILL TO | | LOG-All | |
| BILL To | 5/21/1999 | 10:00 | 10:15 | 0:15 | X | NESTLE | 15 | Present Extend Time | | ANSWER | Hang-UP | COVER | Scramble |
| ANSWER | 5/22/1999 | 11:00 | 11:06 | 0:06 | | | | | | Forward | Call-ID | Conference | Network |
| Hang-UP | 5/23/1999 | 12:00 | 12:05 | 0:05 | | | | | | HOLD | RECALL | RECORD | PH BOOK |
| HOLD | 5/24/1999 | 13:00 | 13:07 | 0:07 | | | | | | CALLER ID POP UP AREA | | | |
| COVER | 5/25/1999 | 14:00 | 14:05 | 0:05 | | | | | | SELLERS' COMPANY LOGO | | | |
| Call-ID | 5/26/1999 | 15:00 | 15:05 | 0:05 | | | | | | | | | |
| Scramble | 5/27/1999 | 16:00 | 16:05 | 0:05 | | | | | | Active cell or Photo pop up | | | |
| Conference | 5/28/1999 | 17:00 | 17:05 | 0:05 | | | | | | | | | |
| Network | 5/29/1999 | 18:00 | 18:05 | 0:05 | | | | | | | | | |
| | 5/30/1999 | 19:00 | 19:05 | 0:05 | | | | | | | | | |
| | 5/31/1999 | 20:00 | 20:05 | 0:05 | | | | | | | | | |
| | 6/1/1999 | 21:00 | 21:05 | 0:05 | | | | | | | | | |
| | 6/2/1999 | 22:00 | 22:05 | 0:05 | | | | | | | | | |
| Encrypt | 6/3/1999 | 23:00 | 23:05 | 0:05 | | | | | | | | | |
| Security | 6/4/1999 | 0:00 | 0:05 | 0:05 | | | | | | | | | |
| PHONE LOG | 6/5/1999 | 1:00 | 1:05 | 0:05 | | | | | | | | | |
| BPS-System | 6/6/1999 | 2:00 | 2:05 | 0:05 | | | | | | | | | |
| FORWARD | STOP | Back | MAIN Entry | LOG Reports | | Month | YEAR | Manufacturer | BPS REPORT | PHONE | V-Mail | FAX | E-Mail |
| RECEIVE | SEND | EDIT | P-CAL | INTERNAL SYSTEMS | | NOTE | PRINT | FILE | MEMO | LETTER | SCAN | ENCRYPT | SERVER | WWW |

FIG. 44

| CMS | Buyer's Name | LOGO | | | | BUYER'S COMPANY LOGO | | BUYER IMAGE | | CMS | HOME | September 18, 1999 |
|---|---|---|---|---|---|---|---|---|---|---|---|---|
| 1 OF 17 | PACKAGE ID | VOICE | | | | | | | | | MONDAY | 1:26 PM |
| Phone Log | | | | | | Phone Log- MAIN LOG- TOTAL | | | | | | |
| LOG-Day | | | | | | | | | | | | |
| LOG-by Manf | Date | Start | End | Total Min | Bill | EX-Time | BILL To | Comment | | Bill Address | Bill Date | $Amount |
| LOG-TOTAL | 5/20/1999 | 9:00 | 9:05 | 0:05 | | | | | | | | |
| LOG ALL | 5/21/1999 | 10:00 | 10:15 | 0:15 | x | 15 | NESTLE | Present Extend Time | | 13567 W. Hampton Phoenix, AZ 85040 | 6/1/1999 | $ 26.25 |
| BILL To | 5/22/1999 | 11:00 | 11:06 | 0:06 | | | | | | | | |
| ANSWER | 5/23/1999 | 12:00 | 12:05 | 0:05 | | | | | | | | |
| Hang-UP | 5/24/1999 | 13:00 | 13:07 | 0:07 | | | | | | | | |
| HOLD | 5/25/1999 | 14:00 | 14:05 | 0:05 | | | | | | | | |
| COVER | 5/26/1999 | 15:00 | 15:05 | 0:05 | | | | | | | | |
| Call-ID | 5/27/1999 | 16:00 | 16:05 | 0:05 | | | | | | | | |
| Scramble | 5/28/1999 | 17:00 | 17:05 | 0:05 | | | | | | | | |
| Conference | 5/29/1999 | 18:00 | 18:05 | 0:05 | | | | | | | | |
| Network | 5/30/1999 | 19:00 | 19:05 | 0:05 | | | | | | | | |
| | 5/31/1999 | 20:00 | 20:05 | 0:05 | | | | | | | | |
| | 6/1/1999 | 21:00 | 21:05 | 0:05 | | | | | | | | |
| | 6/2/1999 | 22:00 | 22:05 | 0:05 | | | | | | | | |
| | 6/3/1999 | 23:00 | 23:05 | 0:05 | | | | | | | | |
| Encrypt | 6/4/1999 | 0:00 | 0:05 | 0:05 | | | | | | | | |
| Security | 6/5/1999 | 1:00 | 1:05 | 0:05 | | | | | | | | |
| PHONE LOG | 6/6/1999 | 2:00 | 2:05 | 0:05 | | | | | | | | |
| BPS-System | | | | | | | | | | | | |
| FORWARD | STOP | Back | MAIN Entry | LOG Reports | | Month | YEAR | Manufacturer | BPS REPORT | PHONE | V-Mail | FAX | E-Mail |
| RECEIVE | SEND | EDIT | P-CAL | INTERNAL SYSTEMS | | NOTE | PRINT | FILE | MEMO | LETTER | SCAN | ENCRYPT | SERVER | WWW |

FIG. 45

| CMS | Buyer's Name | LOGO | BUYER'S COMPANY LOGO | BUYER IMAGE | CMS | HOME | September 18, 1999 |
|---|---|---|---|---|---|---|---|
| 1 of 3 | PACKAGE ID | VOICE | | | MONDAY | | 1:26 PM |

Phone Log - MAIN LOG by DATE

| Phone Log | | | | | | | | PRES. TIME | | EXTEND | 0:00 |
|---|---|---|---|---|---|---|---|---|---|---|---|
| LOG-START | | | | | | | | LOG-D | Start time | 12:56 PM | |
| LOG-by Manf | | | | | | | | LOG-M | End Time | 1:24 PM | |
| LOG-TOTAL | Date | Start | End | Total Min | Bill | Ex-Time | BILL To | Comment | LOG-T | Total | 0:28 |
| LOG ALL | 5/20/1999 | 9:00 | 9:05 | 0:05 | | | | | BILL TO | | LOG-All |
| BILL To | 5/21/1999 | 10:00 | 10:15 | | x | 15 | NESTLE | Present Extend Time | ANS | Hang-UP | Cover | Scramble |
| ANSWER | 5/22/1999 | 11:00 | 11:06 | 0:06 | | | | | FWD | Call-ID | Conf | Netwk |
| Hang-UP | 5/23/1999 | 12:00 | 12:05 | 0:05 | | | | | HOLD | RECALL | REC | PH. BOOK |
| HOLD | 5/24/1999 | 13:00 | 13:07 | 0:07 | | | | | | Seller's Name | | |
| COVER | 5/25/1999 | 14:00 | 14:05 | 0:05 | | | | | SELLERS' COMPANY LOGO | | | |
| Call-ID | 5/26/1999 | 15:00 | 15:05 | 0:05 | | | | | | | | |
| Scramble | 5/27/1999 | 16:00 | 16:05 | 0:05 | | | | | | | | |
| Conference | 5/28/1999 | 17:00 | 17:05 | 0:05 | | | | | SELLER IMAGE | | | |
| Network | 5/29/1999 | 18:00 | 18:05 | 0:05 | | | | | | | | |
| | 5/30/1999 | 19:00 | 19:05 | 0:05 | | | | | | | | |
| | 5/31/1999 | 20:00 | 20:05 | 0:05 | | | | | | | | |
| Encrypt | | | | | | | | | | | | |
| Security | | | | | | | | | | | | |
| PHONE LOG | | | | | | | | | | | | |
| BPS-System | | | | | | | | | | | | |
| FORWARD | STOP | BACK | MAIN Entry | LOG Reports | Month | YEAR | Manufacturer | BPS REPORT | PHONE | V-MAIL | FAX | EMAIL |
| RECEIVE | SEND | EDIT | P-CAL | INTERNAL SYSTEMS | NOTE | PRINT | FILE | MEMO | LETTER | SCAN | ENCRYPT | SERVER | WWW |

FIG. 46

| CMS | Buyer's Name | LOGO | | BUYER'S COMPANY LOGO | | | BUYER IMAGE | | CMS | HOME | September 18, 1999 |
|---|---|---|---|---|---|---|---|---|---|---|---|
| 1 of 3 | PACKAGE ID | VOICE | | | | | | | MONDAY | | 1:26 PM |
| Phone Log | | | | | | | | | PRES. TIME | EXTEND | 0:00 |
| LOG-START | | | | | | | | | LOG-D | Start time | 12:56 PM |
| LOG-by Manf | | | *Phone Log- MAIN LOG by Manufacturer* | | | | | | LOG-M | End Time | 1:24 PM |
| LOG-TOTAL | Date | Start | End | Total Min | Bill | EX-Time | BILL To | Comment | LOG-T | Total | 0:28 |
| LOG ALL | 5/21/1999 | 10:00 | 10:15 | 0:15 | X | 15 | NESTLE | Present Extend Time | BILL TO | | LOG-All |
| BILL To | 6/17/1999 | 12:00 | 12:06 | 0:06 | X | 6 | NESTLE | Present Extend Time | ANS | Hang-UP | Cover | Scramble |
| ANSWER | | | | | | | | | FWD | Call-ID | Conf | Netwk |
| Hang-UP | | | | | | | | | HOLD | RECALL | REC | PH. BOOK |
| HOLD | | | | | | | | | | Seller's Name | |
| COVER | | | | | | | | | SELLERS' COMPANY LOGO | | |
| Call-ID | | | | | | | | | | | |
| Scramble | | | | | | | | | | | |
| Conference | | | | | | | | | SELLER IMAGE | | |
| Network | | | | | | | | | | | |
| | | | | | | | | | | | |
| | | | | | | | | | | | |
| *Encrypt* | | | | | | | | | | | |
| Security | | | | | | | | | | | |
| PHONE LOG | | | | | | | | | | | |
| BPS-System | | | | | | | | | | | |
| | STOP | BACK | MAIN Entry | LOG Reports | | Month | YEAR | Manufacturer | BPS REPORT | PHONE | V-MAIL | FAX | EMAIL |
| FORWARD | SEND | EDIT | P-CAL | INTERNAL SYSTEMS | NOTE | PRINT | FILE | MEMO | LETTER | SCAN | ENCRYPT | SERVER | WWW |
| RECEIVE | | | | | | | | | | | | | |

FIG. 47

| PLS | Buyer's Name | LOGO | BUYER'S COMPANY LOGO | | BUYER IMAGE | CMS | HOME | September 18, 1999 | |
|---|---|---|---|---|---|---|---|---|---|
| 1 of 5 | PACKAGE ID | VOICE | | | | MONDAY | | 1:26 PM | |
| Phone Log | | | | | | PRES. TIME | | EXTEND | 0:00 |
| LOG-START | | | V-MAIL RECEIVED | | | LOG-D | Start time | | 12:56 |
| LOG-by Manf | | | | | | LOG-M | End Time | | 13:04 |
| LOG-TOTAL | Date | Start | End | Number | OPEN | Call | Company | Name | LOG-T | Total | 0:08 |
| LOG ALL | ###### | 9:00 | | | | | | | BILL TO | | LOG-All |
| BILL To | ###### | 10:00 | | | | | | | ANS | Hang-UP | COVER | Scramble |
| ANSWER | ###### | 11:00 | | | | | | | FORWARD | Call-ID | Conf | Network |
| Hang-UP | ###### | 13:48 | | | | | | | HOLD | RECALL | REC | PH. BOOK |
| HOLD | | | | | | | | | SELLERS' COMPANY LOGO | | | |
| COVER | | | | | | | | | | | | |
| Call-ID | | | | | | | | | | | | |
| Scramble | | | | | | | | | | | | |
| Conference | | | | | | | | | Active cell or Photo pop up | | | |
| Network | | | | | | | | | | | | |
| | | | | | | | | | | | | |
| | | | | | | | | | | | | |
| Encrypt | | | | | | | | | | | | |
| Security | | | | | | | | | V-Mail | | | |
| PLS | | | | | | | | | | | | |
| BPS-System | | | | | | | | | | | | |
| FORWARD | STOP | Back | MAIN Entry | LOG Reports | Month | YEAR | Manufacturer | REPORT | Phone | V-Mail | FAX | E-Mail |
| RECEIVE | SEND | EDIT | P-CAL | INTERNAL SYSTEMS | NOTE | PRINT | FILE | MEMO | LETTER | SCAN | ENCRYPT | SERVER | WWW |

| EXCEL | Buyer's Name | LOGO | BUYER'S COMPANY LOGO | | | BUYER IMAGE | CMS | HOME | September 18, 1999 |
|---|---|---|---|---|---|---|---|---|---|
| P 3 of 6 | PACKAGE ID | VOICE | | | | | MONDAY | 1:26 PM |
| Outlook Shortcuts | REPORTS | | *By Department TOTAL - Brokerage $* | | | | PRES. TIME | EXTEND | 0:00 |
| | BY COMPANY | | 1998 | 1999 | $ +/- | % +/- | LOG-D | Start time | 12:56 PM |
| In Box | AMUROL | | $15,566.00 | $17,657 | $ 2,091 | 13.4% | LOG-M | End Time | 1:24 PM |
| | Beernuts | | $2,829.00 | $2,915 | $ 86 | 3.0% | LOG-T | Total | 0:28 |
| | Ferrara Pan Candy Co. | | $3,299.00 | $3,188 | $ (111) | -3.4% | BILL TO | | LOG-All |
| | Ferrero USA | | $5,100.00 | $5,365 | $ 265 | 5.2% | ANS | Hang-UP | Cover | *Scramble* |
| Calendar | Goodmark | | $8,400.00 | $10,380 | $ 1,980 | 23.6% | FWD | Call-ID | Conf | Netwk |
| | Nature Kist | | $1,200.00 | $1,400 | $ 200 | 16.7% | HOLD | RECALL | REC | PH. BOOK |
| | McKesson | | $5,800.00 | $6,200 | $ 400 | 6.9% | | Seller's Name |
| Reports | Powerbar | | $2,378.00 | $2,155 | $ (223) | -9.4% | SELLERS' COMPANY LOGO |
| | Tootsie Roll | | $4,409.00 | $4,877 | $ 468 | 10.6% | |
| | Very Fine | | $3,287.00 | $3,489 | $ 202 | 6.1% | |
| To Do's | Totals $ | | 52,268 | $ 57,626 | $ 5,358 | 10.3% | SELLER IMAGE |
| Messages | | | AMUROL | | 15566 | | |
| My Shortcuts | | | | | | | |
| PHONE LOG | | | | | | 1998 vs. 1999 year | |
| BPS-System | | | 2nd Qtr | 3rd Qtr | 4th Qtr | | |
| FORWARD | STOP | BACK | P-CAL | INTERNAL SYSTEMS | NOTE | PRINT | FILE | MEMO | LETTER | PHONE | V-MAIL | FAX | EMAIL |
| RECEIVE | SEND | EDIT | | | | | | | | SCAN | ENCRYPT | SERVER | WWW |

FIG. 50

| EXCEL | Buyer's Name | LOGO | BUYER'S COMPANY LOGO | | | | | BUYER IMAGE | | CMS | HOME | | September 18, 1999 |
|---|---|---|---|---|---|---|---|---|---|---|---|---|---|
| P | 5 of 5 | PACKAGE ID | VOICE | | | | | | | | MONDAY | | 1:26 PM |
| Outlook Shortcuts | REPORTS | | By Manufacturer- Brokerage $ | | | | | 1st Qtr. | 1999 | PRES. TIME | | EXTEND | 0:00 |
| | BY COMPANY | | 1998 | | 1999 | | $ +/- | % +/- | | LOG-D | Start time | | 12:56 PM |
| In Box | | Goodmark | $ | 8,400.00 | $ | 10,380.00 | $ 1,980 | 23.6% | | LOG-M | End Time | | 1:24 PM |
| | 5 year history | | 1995 | 1996 | 1997 | 1998 | 1999 | | | LOG-T | Total | | 0:28 |
| | $ Sales | | $ 61,356 | $ 72,765 | $ 83,998 | $ 91,551 | $ 108,990 | 5 yr | 5 yr | BILL TO | | LOG-All | |
| Calendar | Brokerage $ | | $ 3,068 | $ 3,638 | $ 4,200 | $ 8,400 | $ 10,380 | $ +/- | % | ANS | Hang-UP | Cover | Scramble |
| | Case Sales | | 500 | 560 | 590 | 600 | 780 | $ 47,634 | 78% | FWD | Call-ID | Conf | Netwk |
| | | | | | | | | $ 7,312 | 238% | HOLD | RECALL | REC | PH. BOOK |
| | | | 5 Year Sales Analysis | | | | | $ 280 | 56% | | | | |
| Reports | | | | | | | | | | SELLERS' COMPANY LOGO | | | |
| To Do's | | | | | | | | | | | | | |
| Messages | | | % Year Gross Brokerage $ | | | | | | | Seller's Name | | | |
| | | | | | | | | | | SELLER IMAGE | | | |
| My Shortcuts | | | | | | | | | | | | | |
| PHONE LOG | | | | | | | | | | | | | |
| BPS-System | | | | | | | | | | | | | |
| FORWARD | STOP | BACK | P-CAL | 2nd Qtr | 3rd Qtr | | 4th Qtr | 1998 vs. 1999 year | | PHONE | V-MAIL | FAX | EMAIL |
| RECEIVE | SEND | EDIT | | INTERNAL SYSTEMS | NOTE | FILE | PRINT | MEMO | LETTER | SCAN | ENCRYPT | SERVER | WWW |

FIG. 51

| PERSONAL | Buyer's Name | LOGO | 1999 | *Personal Home Page* | | BUYER | CMS | HOME | September 18, 1999 | | |
|---|---|---|---|---|---|---|---|---|---|---|---|
| 1 of 5 | PACKAGE ID | VOICE | MAY | Tuesday | May 20, 1999 | IMAGE | MONDAY | | 1:26 PM | | |
| HOME Files | | | | | | | PRES. TIME | | EXTEND | | 0:00 |
| *Financial* | | | | | | | LOG-D | | Start time | | 12:56 PM |
| *Benefits* | | | | | | | LOG-M | | End Time | | 1:24 PM |
| *Mileage* | | | | | | | LOG-T | | Total | | 0:28 |
| *Expense Rpt* | | | | | | | BILL TO | | | LOG-All | |
| *Medical* | | | | | | | ANS | Hang-UP | Cover | | Scramble |
| *Cars* | | | | | | | FWD | Call-ID | Conf | | Netwk |
| *Stocks* | | | | | | | HOLD | RECALL | REC | | PH. BOOK |
| | | | | | | | | | Seller's Name | | |
| | | | | | | | | | SELLERS' COMPANY LOGO | | |
| | | | | | | | | | Active cell or Photo pop up | | |
| | | | | | | | | | | | |
| | | | | | | | | | | | |
| | | | | | | | | | V-Mail | | |
| PHONE LOG | | | | | | | | | | | |
| BPS-System | | STOP | BACK | | | | | | | | |
| FORWARD | | SEND | EDIT | P-CAL | INTERNAL SYSTEMS | NOTE | PRINT | FILE | MEMO | LETTER | |
| RECEIVE | | | | | | | | | | PHONE | V-MAIL | FAX | EMAIL |
| | | | | | | | | | | SCAN | ENCRYPT | SERVER | WWW |

FIG. 52

BUYING METHOD FOR RETAIL ESTABLISHMENTS

CROSS-REFERENCE TO RELATED APPLICATION

The present application is related to and claims priority from prior provisional application Ser. No. 60/478,472 filed Jun. 12, 2003, entitled "BUYING SYSTEM FOR RETAIL ESTABLISHMENTS", the contents of which are incorporated herein by this reference and are not admitted to be prior art with respect to the present invention by the mention in this cross-reference section.

BACKGROUND

This invention relates to providing a system for improving and streamlining the evaluation and purchase of products from salespeople by buyers.

A major activity of retail establishments is the wholesale purchase of the products they place on the shelves. The number and types of products can mount into the tens of thousands, particularly in the case of a large store, such as a supermarket or large department store. Large retail establishments employ a staff of buyers whose job is to evaluate products, typically presented by salespeople, to choose and order new products and replacement products. This is an extremely time-intensive and costly procedure, as large numbers of salespeople are constantly vying for the attention of the buyer in order to have their products purchased and placed on the shelves of the retail establishment. The buyers have many different duties, tasks and procedures during the course of a workday.

Phone operations are currently performed on regular phones or on cell phones. The called and calling parties of the buyers (acting for retailers) require separate programming and entries in their respective address books. There exists a need to immediately track such things as the length of a call, and the ability to directly bill the salesperson for the time spent interacting with them. Moreover, simple instructions for the use of systems for tracking time and party names do not exist. Furthermore, the use of multiple programs to perform the above standard operations requires a number of different operations to produce the same end function. This is all tedious, inefficient, and time-consuming. Furthermore, when responding to FAX, E-Mail, letters and memos, and the return of such, the use of multiple programs and procedures requires a number of different operations by a buyer to produce the same end function. Again, this is tedious, inefficient, and time-consuming.

In regard to maintaining the confidentiality of information and communications, current security systems generally require separate computer applications to be opened and separately configured for security scans, encryption, and scrambling. The selection process and the configuring are time-consuming and tedious.

In addition to the above, additional problems exist during the course of the buyers' viewing presentations given by the salespeople (acting for the retail product providers) presenting products. For example, the current method of doing business is to present to buyers physically in their place of business, i.e., at the buyer's department office for the retail establishment. The physical calling on the buyer at the buyer's place of business is inefficient, time-consuming, has security issues involved with it, and is, from a time management standpoint, uncontrollable. Additionally, when dealing with the presentation's quality and completeness, due to the varying knowledge, ability, attention to detail, and selling professionalism of the individual salesman, the presentations are widely disparate. Thus, the current presentation procedure is clumsy, inconsistent, incomplete in many cases, and also requires ground-up preparation for each presentation by the salesman. Additionally, buyer requests for corrected forms, clarifications, and representations are very time-consuming for all parties involved. Further yet, from the salesperson's standpoint, there are significant fixed costs involved with every presentation. Depending on the size and complexity of the presentation, the costs associated with it can be in the thousands of dollars. And even after such a high cost, there is no guarantee that the presentation will be complete when it is presented to a buyer.

Additional problems exist following presentations. The communications after each salesperson's presentation are difficult, as most large retail establishments do not have integrated communications-forwarding systems or procedures to notify key players of the decision to buy, or not to buy. Also, once a buy decision is made, the current retail establishment systems do not have automatic billing capabilities. Billing has to be done on an individual job or purchase-order basis set-up by each buyer individually. This billing or order must then be input into the internal system of the retail establishment, which may only log it to the accounting department. The buyer, in many cases, has to personally do the direct billing, or an assistant has to complete the process. This is time-consuming and ponderous. Further yet, currently no program exists that ties the costs associated with reviewing a presentation made to a buyer with an actual charge-back or billing to the presenting salesperson.

In addition to the above, retail establishments currently have a myriad of reports, top level and otherwise, to track their business. However, in most cases, the key reports that allow one to look at the retail establishment business quickly and concisely do not exist, and most are not available on a computer system or on-line. In some cases, it takes combining two and three reports to see the whole picture. This lack of concise and easily-assembled reports is extremely frustrating and time-inefficient for the buyers and their management.

Yet a further problem is that the buyers for retail establishments currently do not have means at their disposal for the management of their own time and the presenters' time. Contributors to this problem include such things as the lack of standardization within the retail establishment and the associated product sales companies with regard to presentation of products; i.e., each salesperson and the company that salesperson represents produce different product presentations oftentimes varying from product to product. Thus, waste of the buyer's time and the presenter's time occurs. In addition, the physical presentation process for products is not time-efficient, and any even small presence or use of computer procedures and programs in this area is inefficient or completely lacking.

Recently, a wide range of interactive devices has been developed to provide information to consumers via communications networks. These interactive devices include, for example, computers connected to various computer on-line services, interactive kiosks, interactive television systems and the like. In particular, the popularity of computer on-line services has grown immensely in popularity over the last decade. Computer on-line services are provided by a wide variety of different companies. In general, most computer on-line services are accessed via the Internet. The Internet is a global network of computers. One popular part of the Internet is the World Wide Web, or the "Web." The World Wide Web contains computers that display graphical and textual information. Computers that provide information on the World Wide Web are typically called "Web sites." A Web site is defined by an Internet address that has an associated electronic page, often called a "home page." Generally, a home page is an electronic document that organizes the presentation of text, graphical images, audio and video into a desired display. These Web sites are operated by a wide variety of entities, which are typically called "providers."

A user may access the Internet via a dedicated high-speed line or by using a personal computer (PC) equipped with a conventional modem. Special interface software, called "browser" software, is installed within the PC. When the user wishes to access the Internet by normal telephone line, an attached modem is automatically instructed to dial the telephone number associated with the local Internet host server. The user can then access information at any address accessible over the Internet. Two well-known web browsers, for example, are the Netscape Navigator browser marketed by Netscape Communications Corporation and the Internet Explorer browser marketed by Microsoft Corporation.

Information exchanged over the Internet is typically encoded in HyperText Mark-up Language (HTML) format. The HTML format is a scripting language that is used to generate the home pages for different content providers. In this setting, a content provider is an individual or company that places information (content) on the Internet so that others can access it. As is well known in the art, the HTML format is a set of conventions for marking different portions of a document so that each portion appears in a distinctive format. For example, the HTML format identifies or "tags" portions of a document to identify different categories of text (e.g., the title, header, body text, etc.). When a web browser accesses an HTML document, the web browser reads the embedded tags in the document so it appears formatted in the specified manner.

An HTML document can also include hyperlinks, which allow a user to move from one document to another document on the Internet. A hyperlink is an underlined or otherwise emphasized portion of text that, when selected using an input device such as a mouse, activates a software connection module, which allows the user to jump between documents or pages (i.e., within the same Web site or to other Web sites). Hyperlinks are well known in the art, and have been sometimes referred to as anchors. The act of selecting the hyperlink is often referred to as "clicking on" the hyperlink.

OBJECTS AND FEATURES OF THE INVENTION

An object and feature of this invention is to overcome the above-stated problems, and others, of the prior art.

It is also an object and feature of the present invention to streamline the evaluation and the purchase of products from salespeople by buyers.

A further object and feature of the present invention is to utilize computer system(s) and program(s) to efficiently integrate and enable tasks performed by buyers in the course of evaluating products, placing orders for the products, and communicating those decisions to involved parties.

It is yet another object and feature of the present invention is to utilize hardware and software to enable specific computer commands as they relate to specific system tasks involved in the process of a product buyer interacting with product salespeople, the salesperson's products and product presentations to the buyer.

It is a further object and feature the present invention to utilize standardized button screen controls, which react to mouse clicking, keyboard inputs, touch screen input, or preferably, voice input commands and preferably located in standardized positions upon the computer screen(s) to simplify and streamline these interactions.

Yet another object and feature of the present invention includes automatic logging of all phone entries, security entries, and other key system activities to allow tracking and security control within embodiments of the present invention.

Another object and feature the present invention is the partition of a computer monitor's viewable screen area into control areas and their association with particular programs or program modules to control specific functions of the programs operating within the system.

A further object and feature of the present invention is to act as a control point for the preparation and presentation of product proposals to buyers by salesmen.

It is a further object and feature of the present invention to integrate private branch exchange telephone systems functions with the software related functions of the system to permit integrated conferencing and network conferencing Caller-ID, call forwarding, Voice-Mail, and call encryption.

It is a further object and feature of the present invention to provide features and objects that allow for the attachment of notes to sales presentations, automatic creation of letters and memoranda, and scanning and filing of documents, artwork and photographs related to sales presentations.

Another object and feature of the present invention is to provide the ability to enable totally or specifically encrypted voice communications and data communications.

Yet another object and feature of the present invention is to generate revenue to buying organizations through the sale to selling organizations of "presentation opportunities" which permit the presentation of a product proposal in a defined structure to streamline and standardize the buying process.

A further object and feature of the present invention is to provide a billing module capability that enables automatic billing of time and presentation charges as determined by the buying organization.

A further object and feature of the present invention is to build the system around generally accepted computer operating systems and widely used application software which operates in an Internet-based communications environment.

A further object and feature of the present invention is to increase the speed of operation on the part of the buyer and the sales organizations.

SUMMARY OF THE INVENTION

In accordance with a preferred embodiment hereof, this invention provides a method, relating to managing presentation of at least one retail product offering by at least one retail-product-providing selling entity to at least one for-retailer buying entity, comprising the steps of: offering at least one buying management system to such at least one for-retailer buying entity by at least one offeror; wherein such at least one buying management system comprises at least one proposal package for use by such at least one retail-product-providing selling entity; and authorizing such at least one retail-product-providing selling entity to use such at least one proposal package to present such at least one retail product offering to such at least one for-retailer buying entity. Moreover, it provides such a method wherein such step of authorizing such at least one retail-product-providing selling entity to use such at least one proposal package to present such at least one retail product offering to such at least one for-retailer buying entity comprises the steps of: receiving payment from such at least one retail-product-providing selling entity for such at least one proposal package; issuing at least one authorization to present such at least one proposal package to such at least one retail-product-providing selling entity; associating such at least one authorization with such at least one for-retailer buying entity; permitting preparation of such at least one proposal package using such at least one retail product offering by at least one sales representative of such at least one retail-product-providing selling entity; and permitting presentation of such at least one prepared proposal package by such at least one sales representative to at least one buying representative of such at least one for-retailer buying entity. Additionally, it provides such a method further comprising the steps of: permitting scheduling at least one appointment with such at least one buying representative to present such at least one prepared proposal package by such at least one retail-product-providing selling entity; permitting remote presentation of such at least one prepared proposal package to such at least one buying representative by such at least one sales representative; and recording completion of such presentation of such at least one prepared proposal package. Also, it provides such a method further comprising the step of permitting such at least one for-retailer buying entity to require such at least one retail-product-providing selling entity to use such buying management system for such at least one retail product offering presentation. In addition, it provides such a method further comprising the steps of: calculating at least one first portion of such at least one payment from such at least one retail-product-providing selling entity to be paid to such at least one for-retailer buying entity; calculating at least one second portion of such at least one payment from such at least one retail-product-providing selling entity to be paid to such at least one offeror; paying at least one first portion of such at least one payment from such at least one retail-product-providing selling entity to be paid to such at least one for-retailer buying entity; and paying at least one second portion of such at least one payment from such at least one retail-product-providing selling entity to be paid to such at least one offeror. And, it provides such a method further comprising the step of recording decision about such at least one presented proposal package by such at least one buying representative. Further, it provides such a method wherein the step of recording decision about such at least one presented proposal package by such at least one buying representative comprises the steps of: permitting requesting at least one alteration to such at least one presented proposal package by such at least one buying representative; notifying such at least one selling representative of such at least one requested alteration to such at least one presented proposal package; permitting alteration of such at least one presented proposal package by such at least one selling representative; and permitting remote presentation of such at least one altered proposal package by such at least one selling representative to such at least one buying representative. Even further, it provides such a method wherein the step of recording decision about such at least one presented proposal package by such at least one buying representative comprises the steps of: recording rejection of such at least one presented proposal package by such at least one buying representative; and substantially automatically notifying such at least one selling representative of such rejection of such at least one presented proposal package by such at least one buying representative. Moreover, it provides such a method wherein the step of recording decision about such at least one presented proposal package by such at least one buying representative comprises the steps of: recording approval of such at least one presented proposal package by such at least one buying representative; substantially automatically notifying such at least one selling representative of such approval of such at least one presented proposal package by such at least one buying representative; and substantially automatically notifying at least one operations representative of such at least one for-retailer buying entity of such approval of such at least one presented proposal package. Additionally, it provides such a method wherein the step of recording approval of such at least one presented proposal package by such at least one buying representative comprises the steps of: notifying at least one buying review representative of such at least one for-retailer buying entity; permitting review of such at least one presented proposal package by such at least one buying review representative; recording at least one comment by such at least one buying review representative; and permitting such at least one buying representative to review such at least one recorded comment. Also, it provides such a method wherein such at least one proposal package comprises at least one interest inquiry proposal package. In addition, it provides such a method wherein such at least one proposal package comprises at least one on-going product proposal package. And, it provides such a method wherein such at least one proposal package comprises at least one product introduction proposal package. Further, it provides such a method wherein such at least one product introduction proposal package comprises: at least one standard presentation outline; wherein such at least one standard presentation outline comprises at least five of the group consisting essentially of product presentation control display, product offering key points display, print advertising support plans display, television advertising support plans display, coupon support plans display, market research analysis display, demonstration support plans analysis, product placement recommendations, and product offering summary display. Even further, it provides such a method wherein the step of offering such at least one buying management system to such at least one for-retailer buying entity comprises the steps of: licensing such at least one buying management system to such at least one for-retailer buying entity by such at least one offeror; and receiving license payment from such at least one for-retailer buying entity by such at least one offeror. Moreover, it provides such a method further comprising the steps of: recording at least one telephone log entry relating to at least one telephone call received by such at least one buying representative; and recording such at least one telephone log entry relating to at least one telephone call placed by such at least one buying representative. Additionally, it provides such a method further comprising the steps of: permitting such at least one buying representative to identify such at least one telephone log entry as billable; substantially automatically creating at least one invoice related to each such identified telephone log entry; and receiving payment from such at one retail-product-providing selling entity related to such at least one invoice.

In accordance with another preferred embodiment hereof, this invention provides a buying management system for computer-managing at least one product offering presentation by at least one plurality of retail-product-providing selling entities to at least one for-retailer buying entity comprising, in combination: at least one desktop integration computer-program module adapted to manage essentially simultaneous access to at least one plurality of computer-based software systems; and at least one product proposal computer-program module adapted to control such at least one product offering presentation to such at least one for-retailer buying entity. Also, it provides such a buying management system wherein such at least one product proposal computer-program module comprises: at least one presentation preparation computer-program module adapted to control information content of at least one product proposal; at least one presentation scheduling computer-program module adapted to schedule at least one appointment between at least one selling representative of at least one retail-product-providing selling entity of such plurality of retail-product-providing selling entities and at least one buying representative of such at least one for-retailer buying entity; and at least one presentation management computer-program module adapted to permit remote presentation of such at least one product proposal by such at least one selling representative to such at least one buying representative. In addition, it provides such a buying management system further comprising, in combination: at least one for-retailer buying entity decision computer-program module adapted to require at least one for-retailer buying entity decision regarding such at least one presented product proposal; and at least one for-retailer buying entity decision notification computer-program module adapted to electronically communicate such at least one for-retailer buying entity decision to at least one operations representative of such at least one for-retailer buying entity. And, it provides such a buying management system further comprising, in combination; at least one accounting computer-program module adapted to distribute payments made by such at least one retail-product-providing selling entity to such at least one for-retailer buying entity and at least one buying management system licensor; and at least one reporting and analysis computer-program module adapted to create at least one analysis report on request by such at least one buying representative. Further, it provides such a buying management system wherein such at least one reporting and analysis computer-program module adapted to create at least one analysis report on request by such at least one buying representative comprises: at least one department quota analysis report; at least one retail-product-providing selling entity analysis report; at least one five-year trend analysis report; and at least one parameter-based analysis report controlled by input from such at least one for-retailer buying entity. Even further, it provides such a buying management system wherein such at least one at least one desktop integration computer-program module is adapted to manage essentially simultaneous access to at least one plurality of computer-based software systems comprising, in combination; at least one visual display manager adapted to simultaneously display functions provided by at least one plurality of computer-based software systems; and at least one external computer-program module communication manager adapted to permit interactive selection of displayed functions performable by such at least one computer-based software system. Moreover, it provides such a buying management system wherein such plurality of computer-based software systems comprises: at least one personal time management system; at least one email system; at least one Internet-based collaboration system; at least one private branch exchange telephone system; such at least one presentation scheduling computer-program module; such at least one presentation management computer-program module; such at least one product offering approval computer-program module; such at least one approval notification computer-program module; such at least one accounting computer-program module; and such at least one reporting and analysis computer-program module.

In accordance with another preferred embodiment hereof, this invention provides a buying management system for computer-managing at least one product offering presentation by at least one plurality of retail-product-providing selling entities to at least one for-retailer buying entity comprising, in combination: computer processing means for managing essentially simultaneous access to at least one plurality of computer-based software systems; and computer processing means for controlling such at least one product offering presentation to such at least one for-retailer buying entity. Additionally, it provides such a buying management system further comprising, in combination: computer processing means for controlling information content of at least one product proposal; computer processing means for scheduling at least one appointment between at least one selling representative of at least one retail-product-providing selling entity of such plurality of retail-product-providing selling entities and at least one buying representative of such at least one for-retailer buying entity; and computer processing means for permitting remote presentation of such at least one product proposal by such at least one selling representative to such at least one buying representative. Also, it provides such a buying management system further comprising, in combination: computer processing means for requiring at least one for-retailer buying entity decision regarding such at least one presented product proposal; and computer processing means for electronically communicating such at least one for-retailer buying entity decision to at least one operations representative of such at least one for-retailer buying entity. In addition, it provides such a buying management system further comprising, in combination; computer processing means for distributing payments made by such at least one retail-product-providing selling entity to such at least one for-retailer buying entity and at least one buying management system licensor; and computer processing means for creating at least one analysis report on request by such at least one buying representative. And, it provides such a buying management system wherein such computer processing means for creating at least one analysis report on request by such at least one buying representative comprises computer processing means for providing: at least one department quota analysis report; at least one retail-product-providing selling entity analysis report; at least one five-year trend analysis report; and at least one parameter-based analysis report controlled by input from such at least one for-retailer buying entity. Further, it provides such a buying management system wherein such computer processing means for managing essentially simultaneous access to at least one plurality of computer-based software comprises computer processing means for managing; simultaneous display functions provided by at least one plurality of computer-based software systems; and interactive selection of displayed functions performable by at least one of such at least one plurality of computer-based software systems. Even further, it provides such a buying management system wherein such plurality of computer-based software systems comprises: at least one personal time management system; at least one email system; at least one Internet-based collaboration system; at least one private branch exchange telephone system; such at least one presentation scheduling computer-program module; such at least one presentation management computer-program module; such at least one product offering approval computer-program module; such at least one approval notification computer-program module; such at least one accounting computer-program module; and such at least one reporting and analysis computer-program module.

In accordance with another preferred embodiment hereof, this invention provides a buying management computer-program system, relating to computer-assisting of utilizing a plurality of proposal packages to manage presentation of at least one product offering by at least one retail-product-providing selling entity to at least one for-retailer buying entity, comprising computer-assisting the steps of: recording receipt information relating to at least one proposal package payment from such at least one retail-product-providing selling entity; issuing at least one authorization to present such at least one proposal package to such at least one retail-product-providing selling entity, associating such at least one authorization with such at least one for-retailer buying entity; and authorizing such at least one retail-product-providing selling entity to use such at least one proposal package to present such at least one product offering to such at least one for-retailer buying entity. Moreover, it provides such a buying management system further comprising the steps of: consolidating presentation of at least one plurality of computer-based software modules into at least one standardized computer-based display; permitting, essentially simultaneous access to such at least one plurality of computer-based software modules by at least one buyer representative of such at least one for-retailer buying entity; wherein such at least one plurality of computer-based software modules comprises at least one first computer-based software module related to such buying management system, and at least one second computer-based software module unrelated to such buying management system; accepting at least one selection of at least one of such at least one plurality of such computer-based software modules; and reconfiguring such at least one standardized computer-based display based on such at least one selection by such at least one buyer representative. Additionally, it provides such a buying management system further comprising the steps of: storing such at least one product offering by such at least one sales representative of such at least one retail-product-providing selling entity; formatting such at least one product offering into such at least one proposal package; storing such at least one proposal package; storing at least one presentation appointment between such at least one buyer representative and such at least one sales representative; permitting remote presentation of such at least one product proposal package to such at least one buyer representative by such at least one sales representative; and storing completion of presentation of such at least one proposal package. Also, it provides such a buying management system further comprising the steps of: calculating at least one first portion of such at least one payment from such at least one retail-product-providing selling entity to be paid to such at least one for-retailer buying entity; and calculating at least one second portion of such at least one payment from such at least one retail-product-providing selling entity to be paid to at least one buying management system licensor. In addition, it provides such a buying management system further comprising the steps of: storing at least one request for alteration to such at least one presented proposal package by such at least one buyer representative; notifying, substantially automatically, such at least one sales representative of such at least one request for alteration to such at least one presented proposal package; permitting alteration of such at least one presented proposal package by such at least one sales representative; storing such at least one altered presented proposal package; and permitting remote presentation of such at least one altered presented proposal package to such at least one buyer representative by such at least one sales representative. And, it provides such a buying management system further comprising the steps of: recording rejection of such at least one presented proposal package by such at least one buyer representative; and notifying, substantially automatically, such at least one sales representative of such rejection. Further, it provides such a buying management system further comprising the steps of: recording approval of such at least one presented proposal package by such at least one buyer representative; notifying, substantially automatically, such at least one sales representative of such approval; and notifying, substantially automatically, at least one operations representative of such at least one for-retailer buying entity of approval of such at least one presented proposal package. Even further, it provides such a buying management system further comprising the steps of: permitting review of such at least one presented proposal package by at least one buying review representative of such at least one for-retailer buying entity; recording at least one comment by such at least one buying review representative; and permitting such at least one buyer representative of such at least one for-retailer buying entity to review such at least one recorded comment. Moreover, it provides such a buying management system wherein such at least one proposal package comprises at least one for-retailer buying entity interest inquiry proposal package. Additionally, it provides such a buying management system wherein such at least one proposal package comprises at least one on-going product proposal package. Also, it provides such a buying management system wherein such at least one proposal package comprises at least one product introduction proposal package. In addition, it provides such a buying management system wherein such at least one product introduction proposal package comprises at least one program to manage each of at least five of the group consisting essentially of: product presentation control display; product offering key points display; print advertising support plans display; television advertising support plans display; coupon support plans display; market research analysis display; demonstration support plans analysis; product placement recommendations; and product offering summary display. And, it provides such a buying management system further comprising the steps of: recording at least one telephone log entry relating to at least one telephone call received by such at least one buyer representative; recording such at least one telephone log entry relating to at least one telephone call placed by such at least one buyer representative; wherein such at least one telephone log entry comprises at least three of the group consisting essentially of the following items date call start time call end time call duration telephone number of called person telephone number of calling person. Further, it provides such a buying management system further comprising the steps of: recording identification of such at least one telephone log entry as billable by such at least one buyer representative; and creating, substantially automatically, at least one invoice related to such at least one identified telephone log entry.

In accordance with another preferred embodiment hereof, this invention provides a buying management computer system, relating to computer means relating to assisting of utilizing a plurality of proposal packages to manage presentation of at least one product offering by at least one retail-product-providing selling entity to at least one for-retailer buying entity, comprising, in combination: computer interface means for recording receipt information relating to at least one proposal package payment from such at least one retail-product-providing selling entity; computer processor means for issuing at least one authorization to present such at least one proposal package to such at least one retail-product-providing selling entity, computer processor means for associating such at least one authorization with such at least one for-retailer buying entity; and computer processor means for authorizing such at least one retail-product-providing selling entity to use such at least one proposal package to present such at least one product offering to such at least one for-retailer buying entity. Even further, it provides such a buying management system further comprising: computer processor means for consolidating presentation of at least one plurality of computer-based software modules into at least one standardized computer-based display; computer processor means for permitting essentially simultaneous access to such at least one plurality of computer-based software modules by at least one buyer representative of such at least one for-retailer buying entity; wherein such at least one plurality of computer-based software modules comprises at least one first computer-based software module related to such buying management system, and at least one second computer-based software module unrelated to such buying management system; computer processor means for accepting at least one selection of at least one of such at least one plurality of such computer-based software modules; and computer processor means for reconfiguring such at least one standardized computer-based display based on such at least one selection by such at least one buyer representative. Moreover, it provides such a buying management system further comprising: computer data-storage means for storing such at least one product offering by such at least one sales representative of such at least one retail-product-providing selling entity; computer processor means for formatting such at least one product offering into such at least one proposal package; computer data-storage means for storing such at least one proposal package; computer data-storage means for storing at least one presentation appointment between such at least one buyer representative and such at least one sales representative; computer interface means for permitting remote presentation of such at least one product proposal package to such at least one buyer representative by such at least one sales representative; and computer data-storage means for storing completion of presentation of such at least one proposal package. Additionally, it provides such a buying management system further comprising: computer processor means for calculating at least one first portion of such at least one payment from such at least one retail-product-providing selling entity to be paid to such at least one for-retailer buying entity; and computer processor means for calculating at least one second portion of such at least one payment from such at least one retail-product-providing selling entity to be paid to at least one buying management system licensor. Also, it provides such a buying management system further comprising: computer data-storage means for storing at least one request for alteration to such at least one presented proposal package by such at least one buyer representative; computer processor means for notifying, substantially automatically, such at least one sales representative of such at least one request for alteration to such at least one presented proposal package; computer processor means for permitting alteration of such at least one presented proposal package by such at least one sales representative; computer data-storage means for storing such at least one altered presented proposal package; and computer interface means for permitting remote presentation of such at least one altered presented proposal package to such at least one buyer representative by such at least one sales representative. In addition, it provides such a buying management system further comprising: computer processor means for recording rejection of such at least one presented proposal package by such at least one buyer representative; and computer processor means for notifying, substantially automatically, such at least one sales representative of such rejection. And, it provides such a buying management system further comprising the steps of: computer processor means for recording approval of such at least one presented proposal package by such at least one buyer representative; computer processor means for notifying, substantially automatically, such at least one sales representative of such approval; and computer processor means for notifying, substantially automatically, at least one operations representative of such at least one for-retailer buying entity of approval of such at least one presented proposal package. Further, it provides such a buying management system further comprising: computer processor means for permitting review of such at least one presented proposal package by at least one buying review representative of such at least one for-retailer buying entity; computer processor means for recording at least one comment by such at least one buying review representative; and computer processor means for permitting such at least one buyer representative of such at least one for-retailer buying entity to review such at least one recorded comment. Even further, it provides such a buying management system wherein such at least one proposal package comprises at least one for-retailer buying entity interest inquiry proposal package. Moreover, it provides such a buying management system wherein such at least one proposal package comprises at least one on-going product proposal package. Additionally, it provides such a buying management system wherein such at least one proposal package comprises at least one product introduction proposal package. Also, it provides such a buying management system wherein such at least one product introduction proposal package comprises at least one module to manage each of at least five of the group consisting essentially of: computer processor means for product presentation control display; computer processor means for product offering key points display; computer processor means for print advertising support plans display; computer processor means for television advertising support plans display; computer processor means for coupon support plans display; computer processor means for market research analysis display; computer processor means for demonstration support plans analysis; computer processor means for product placement recommendations; and computer processor means for product offering summary display. In addition, it provides such a buying management system further comprising: computer processor means for recording at least one telephone log entry relating to at least one telephone call received by such at least one buyer representative; computer processor means for recording such at least one telephone log entry relating to at least one telephone call placed by such at least one buyer representative; wherein such at least one telephone log entry comprises at least three of the group consisting essentially of the following items date call start time call end time call duration telephone number of called person telephone number of calling person. And, it provides such a buying management system further comprising: computer processor means for recording identification of such at least one telephone log entry as billable by such at least one buyer representative; and computer processor means for creating, substantially automatically, at least one invoice related to such at least one identified telephone log entry.

In accordance with another preferred embodiment hereof, this invention provides a method, relating to managing presentation of at least one retail product offering by at least one retail-product-providing selling entity to at least one for-retailer buying entity, comprising the steps of: offering at least one buying management system to such at least one for-retailer buying entity by at least one offeror; wherein such at least one buying management system comprises at least one proposal package for use by such at least one retail-product-providing selling entity; permitting such at least one for-retailer buying entity to require such at least one retail-product-providing selling entity to use such buying management system for such at least one retail product offering presentation; receiving payment from such at least one retail-product-providing selling entity for such at least one proposal package; issuing at least one authorization to present such at least one proposal package to such at least one retail-product-providing selling entity; associating such at least one authorization with such at least one for-retailer buying entity; permitting preparation of such at least one proposal package using such at least one retail product offering by at least one sales representative of such at least one retail-product-providing selling entity; permitting scheduling at least one appointment with such at least one buying representative to present such at least one prepared proposal package by such at least one retail-product-providing selling entity; permitting remote presentation of such at least one prepared proposal package to such at least one buying representative by such at least one sales representative; recording completion of such presentation of such at least one prepared proposal package; recording decision about such at least one presented proposal package by such at least one buying representative; calculating at least one first portion of such at least one payment from such at least one retail-product-providing selling entity to be paid to such at least one for-retailer buying entity; calculating at least one second portion of such at least one payment from such at least one retail-product-providing selling entity to be paid to such at least one offeror; paying at least one first portion of such at least one payment from such at least one retail-product-providing selling entity to be paid to such at least one for-retailer buying entity; and paying at least one second portion of such at least one payment from such at least one retail-product-providing selling entity to be paid to such at least one offeror. Further, it provides such a method wherein the step of recording decision about such at least one presented proposal package by such at least one buying representative comprises the steps of: permitting requesting at least one alteration to such at least one presented proposal package by such at least one buying representative; notifying such at least one selling representative of such at least one requested alteration to such at least one presented proposal package; permitting alteration of such at least one presented proposal package by such at least one selling representative; permitting remote presentation of such at least one altered proposal package by such at least one selling representative to such at least one buying representative; recording rejection of such at least one presented proposal package by such at least one buying representative; substantially automatically notifying such at least one selling representative of such rejection of such at least one presented proposal package by such at least one buying representative; recording approval of such at least one presented proposal package by such at least one buying representative; wherein the step of recording approval of such at least one presented proposal package by such at least one buying representative comprises the steps of notifying at least one buying review representative of such at least one for-retailer buying entity, permitting review of such at least one presented proposal package by such at least one buying review representative, recording at least one comment by such at least one buying review representative, and permitting such at least one buying representative to review such at least one recorded comment; substantially automatically notifying such at least one selling representative of such approval of such at least one presented proposal package by such at least one buying representative; and substantially automatically notifying at least one operations representative of such at least one for-retailer buying entity of such approval of such at least one presented proposal package. Even further, it provides such a method wherein such at least one proposal package comprises: at least one interest inquiry proposal package; at least one on-going product proposal package; at least one product introduction proposal package; wherein such at least one product introduction proposal package comprises at least one standard presentation outline; wherein such at least one standard presentation outline comprises at least five of the group consisting essentially of product presentation control display, product offering key points display, print advertising support plans display, television advertising support plans display, coupon support plans display, market research analysis display, demonstration support plans analysis, product placement recommendations, and product offering summary display. Even further, it provides such a method wherein the step of offering such at least one buying management system to such at least one for-retailer buying entity comprises the steps of: licensing such at least one buying management system to such at least one for-retailer buying entity by such at least one offeror; and receiving license payment from such at least one for-retailer buying entity by such at least one offeror. Even further, it provides such a method further comprising the steps of: recording at least one telephone log entry relating to at least one telephone call received by such at least one buying representative; recording such at least one telephone log entry relating to at least one telephone call placed by such at least one buying representative; permitting such at least one buying representative to identify such at least one telephone log entry as billable; substantially automatically creating at least one invoice related to each such identified telephone log entry; and receiving payment from such at one retail-product-providing selling entity related to such at least one invoice.

GLOSSARY OF GENERAL TERMS AND ACRONYMS

The following terms and acronyms explained below as background and are used throughout the detailed description:

Buying Review Representative. As used herein, a person charged with responsibility for reviewing and or approving buying decisions on proposals from brokers and manufacturers made by individual buyers. This term may also represent members of buying committee which may make final buying decisions on proposals from brokers and manufacturers.

Client-Server. A model of interaction in a distributed system in which a program at one site sends a request to a program at another site and waits for a response. The requesting program is called the "client," and the program which responds to the request is called the "server." In the context of the World Wide Web, the client is typically a "Web browser" which runs on a user's computer; the program which responds to Web browser requests at a Web site is commonly referred to as a "Web server."

Domain Name System (DNS). An Internet service that translates domain names (which are alphabetic identifiers) into IP addresses (which are numeric identifiers for machines on a TCP/IP network).

Experience. This term is used interchangeably with the term "subject" and is intended to have the same definition.

HyperText Markup Language (HTML). A standard coding convention and set of codes for attaching presentation and linking attributes to informational content within documents. During a document authoring stage, the HTML codes (referred to as "tags") are embedded within the informational content of the document. When the Web document (or "HTML document") is subsequently transferred from a Web server to a Web browser, the codes are interpreted by the Web browser and used to parse and display the document. In addition to specifying how the Web browser is to display the document, HTML tags can be used to create links to other websites and other Web documents (commonly referred to as "hyperlinks"). For more information on HTML, see Ian S. Graham, The HTML Source Book, John Wiley and Sons, Inc., 1995 (ISBN 0471-11894-4).

HyperText Transport Protocol (HTTP). The standard World Wide Web client-server protocol used for the exchange of information (such as HTML documents, and client requests for such documents) between a Web browser and a Web server. HTTP includes a number of different types of messages that can be sent from the client to the server to request different types of server actions. For example, a "GET" message, which has the format GET, causes the server to return the document or file located at the specified Universal Resource Locator (URL).

Internet. A collection of interconnected (public and/or private) networks that are linked together by a set of standard protocols to form a distributed network. While this term is intended to refer to what is now commonly known as the Internet, it is also intended to encompass variations which may be made in the future, including changes and additions to existing standard protocols.

Internet Information Server (IIS). Microsoft Corporation's Web server that runs on Windows NT platforms.

Java. A general purpose programming language developed by Sun Microsystems. Java has a number of features that make the language well-suited for use on the World Wide Web. Small Java applications are called Java applets and can be downloaded from a Web server and run on a personal computer by a Java-compatible Web browser, such as Netscape Navigator or Microsoft Explorer.

Java Servlets. A small Java-based program designed to perform a specific task within a Web server environment. Java Servlets are analogous to Java applets except they are designed to only run on the Web server.

Java Virtual Machine. A set of applications that create a run time environment for executing Java code.

JRun. A server-side extension that allows a Web server to execute Java Servlets for the processing and display of information. JRun is a widely adopted engine for developing and deploying server-side Java applications that use Java Servlets and Java Server Pages (JSP).

Java Database Connectivity (JDBC). A Java API developed by JavaSoft, a subsidiary of Sun Microsystems of Mountain View, Calif. JDBC enables Java programs to execute SQL statements, which allows Java programs to interact with any SQL-compliant database. Since many relational database management systems (DBMSs) support SQL, and because Java itself runs on most platforms, JDBC makes it possible to write a single database application that can run on different platforms and interact with different database management systems. JDBC is similar to ODBC but is designed specifically for Java programs, whereas ODBC is language-independent.

Open Data Base Connectivity (ODBC). A database access method developed by Microsoft Corporation. ODBC allows an application to access data from a database by translating the application's data queries into commands that the database management system (DBMS) can understand.

Operations Representative. As used herein, the term is used to generally represent personnel within a retail organization whose responsibilities may include shipping/receiving, accounts payable, purchasing, product distribution, etc. In general, personnel in these areas must be informed of buying decisions to successfully meet their responsibilities.

Product Program Offering. A combination of physical product, time-based promotional programs, demonstration support, product placement recommendations and pricing incentives presented as a "package" to a retailer. Promotional programs may include coupon programs, print advertising and television advertising.

Transmission Control Protocol/Internet Protocol (TCP/IP). A standard Internet protocol (or set of protocols) which specifies how two computers exchange data over the Internet. TCP/IP handles issues such as packetization, packet addressing, handshaking and error correction. For more information on TCP/IP, see Volumes I, II and III of Corner and Stevens, Internetworking with TCP/IP, Prentice Hall, Inc., ISBNs 0-13-468505-9 (vol. I), 0-13-125527-4 (vol. II), and 0-13-474222-2 (vol. III).

Uniform Resource Locator (URL). A unique address which fully specifies the location of a file or other resource on the Internet. The general format of a URL is protocol://machine address:port/path/filename. The port specification is optional, and if none is entered by the user, the Web browser defaults to the standard port for whatever service is specified as the protocol. For example, if HTTP is specified as the protocol, the Web browser will use the HTTP default port. The machine address in this example is the domain name for the computer or device on which the file is located.

World Wide Web ("Web"). Used herein to refer generally to both (1) a distributed collection of interlinked, user-viewable hypertext documents (commonly referred to as "Web documents", "Web pages", "electronic pages" or "home pages") that are accessible via the Internet, and (2) the client and server software components that provide user access to such documents using standardized Internet protocols. Currently, the primary standard protocol for allowing applications to locate and acquire Web documents is the HyperText Transfer Protocol (HTTP), and the electronic pages are encoded using the HyperText Markup Language (HTML). However, the terms "World Wide Web" and "Web" are intended to encompass future markup languages and transport protocols which may be used in place of or in addition to the HyperText Markup Language and the HyperText Transfer Protocol.

BRIEF DESCRIPTION OF THE DRAWINGS

FIG. 9 is a diagrammatic view which illustrates a preferred buyer's login screen according to a preferred embodiment of the present invention.

FIG. 10 is a diagrammatic view which illustrates a preferred security settings screen used to set the levels of security in selected functional areas of the buying system according to a preferred embodiment of the present invention.

FIG. 11 is a diagrammatic view which illustrates a preferred additional security settings screen used to set the levels of security in selected additional functional areas of the buying system according to a preferred embodiment of the present invention.

Figure 12:
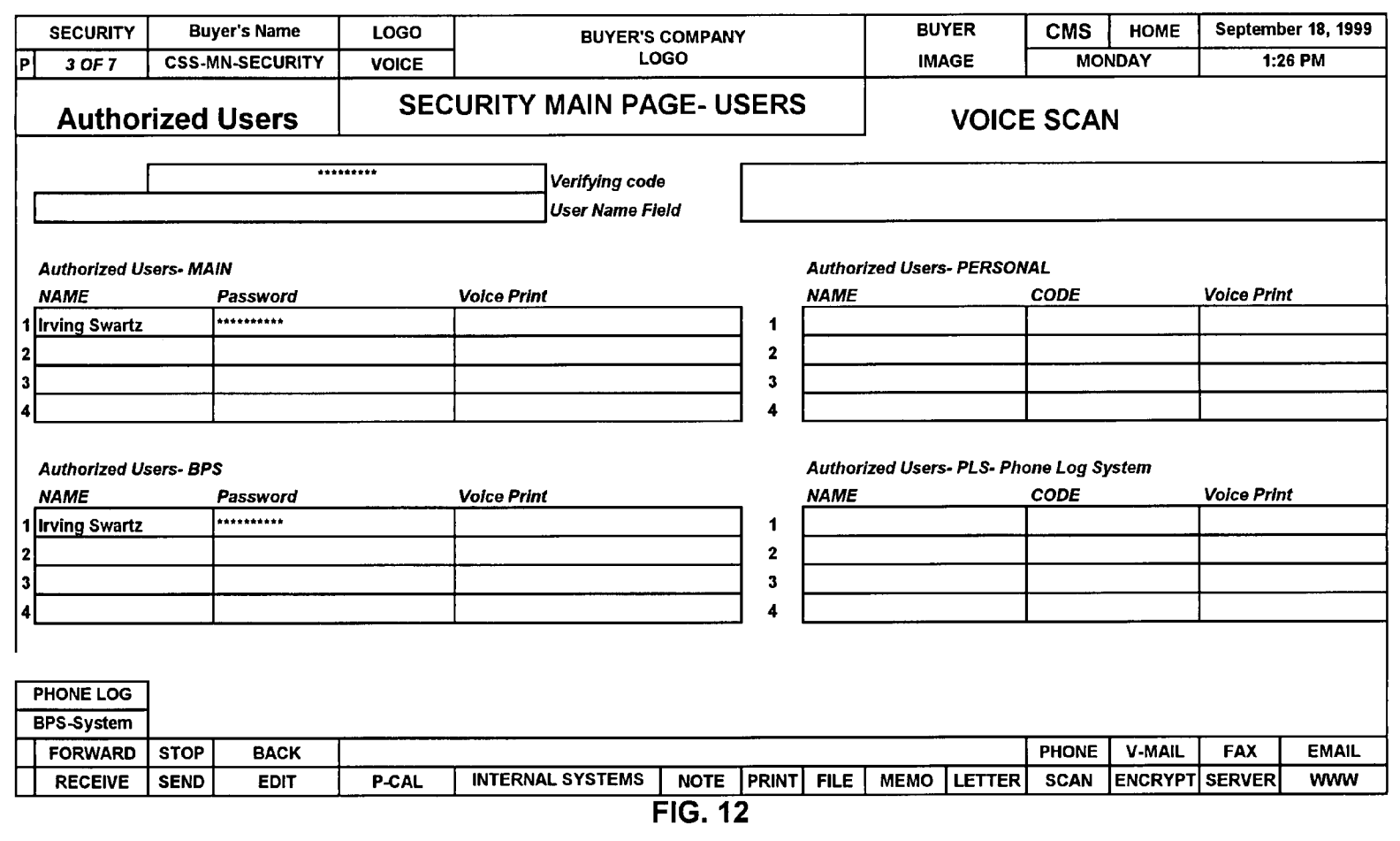

FIG. 12 is a diagrammatic view which illustrates a preferred user set up screen which permit a system administrator to add authorized users to the system and establish each user's primary security settings and passwords according to a preferred embodiment of the present invention.

FIG. 13 is a diagrammatic view which illustrates a preferred user management screen which permits authorized users and their passwords and voice prints for each primary functional area of the instant system according to a preferred embodiment of the present invention.

FIG. 15 is a diagrammatic view which illustrates a preferred presentation when a personal calendaring and email application, such as Microsoft Outlook, has been loaded into the active screen area of the instant system and the phone log area of the screen has been excluded according to a preferred embodiment of the present invention.

Figure 16:
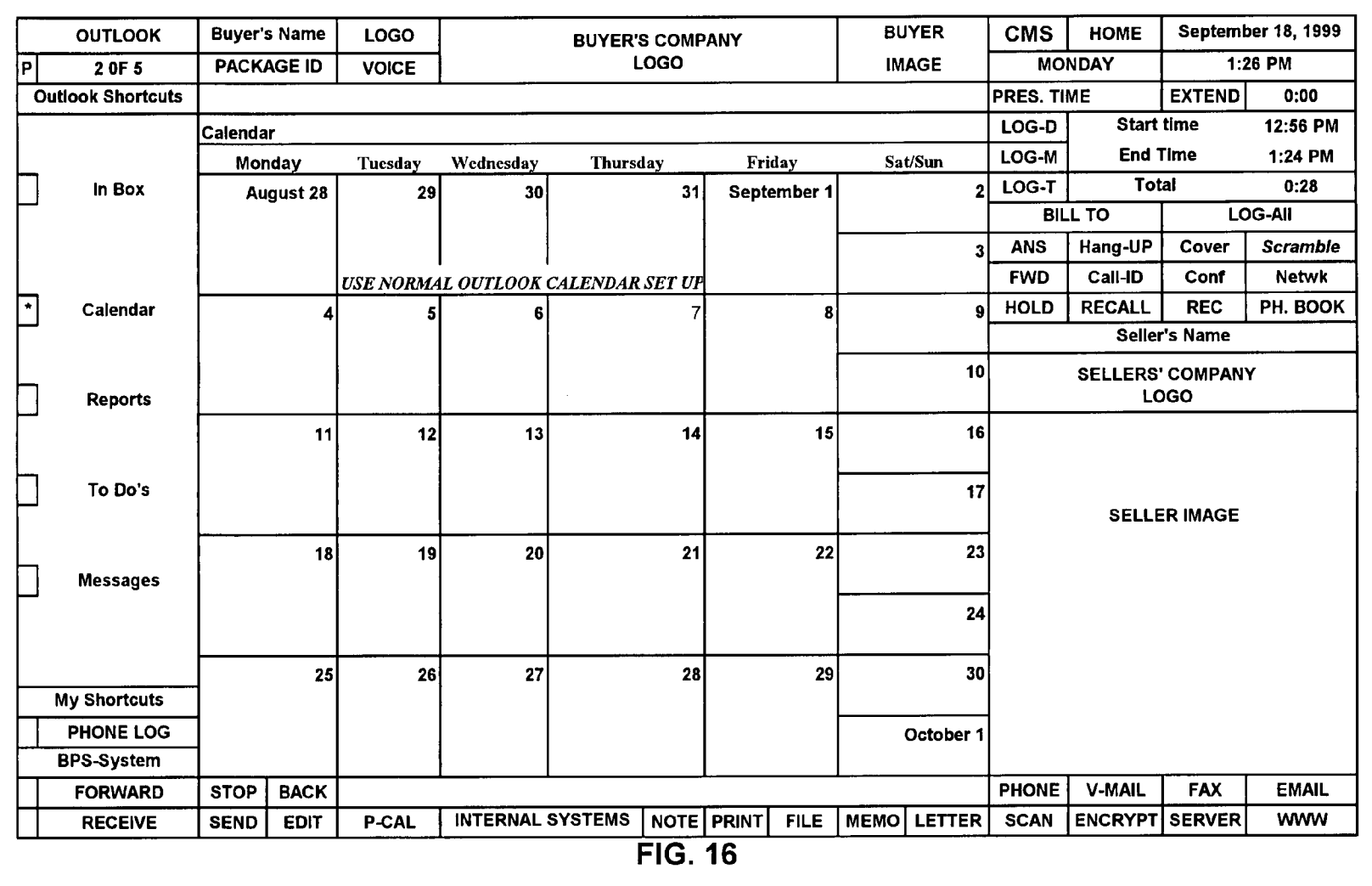

FIG. 16 is a diagrammatic view which illustrates a preferred presentation when the personal calendar of a personal calendaring and email application, such as Microsoft Outlook, has been loaded into the active screen area of the instant system according to a preferred embodiment of the present invention.

FIG. 17 is a diagrammatic view which illustrates a preferred presentation when the task list of a personal calendaring and email application, such as Microsoft Outlook, has been loaded into the active screen area of the instant system according to a preferred embodiment of the present invention.

FIG. 18 is a diagrammatic view which illustrates a preferred presentation when an analysis report has been requested and is displayed in the active screen area of the instant system according to a preferred embodiment of the present invention.

FIG. 19 is a diagrammatic view which illustrates a preferred presentation when the task list of a personal calendaring and email application, such as Microsoft Outlook, has been loaded into the active screen area of the instant system according to a preferred embodiment of the present invention.

FIG. 20 is a diagrammatic view which illustrates a preferred broker set up screen used to capture the basic profile for each broker and the product manufacturer which the broker represents according to a preferred embodiment of the present invention.

FIG. 21 is a diagrammatic view which illustrates a preferred buyer set up screen used to capture the basic profile for each buyer and their position according to a preferred embodiment of the present invention.

FIG. 22 is a diagrammatic view which illustrates a preferred manufacturer set up screen used to capture the basic profile for each manufacturer's representative according to a preferred embodiment of the present invention.

FIG. 23 is a diagrammatic view which illustrates a preferred the buyer internal information page used to display information necessary for internal set up and communications according to a preferred embodiment of the present invention.

FIG. 25 is a diagrammatic view which illustrates a preferred buyer interest inquiry screen prepared by a sales person to elicit interest by a buyer in the represented product which provides only basic information about the product offering according to a preferred embodiment of the present invention.

FIG. 26 is a diagrammatic view which illustrates a preferred start screen (controls the presentation and decision making process) for a product offering presentation to a buyer in the active screen area according to a preferred embodiment of the present invention.

FIG. 27 is a diagrammatic view which illustrates a preferred key points (product offering overview) screen for a product offering presentation to a buyer in the active screen area according to a preferred embodiment of the present invention.

FIG. 28 is a diagrammatic view which illustrates a preferred print advertising support screen for a product offering presentation to a buyer in the active screen area which provides a summary and details of print advertising plans for the product offering according to a preferred embodiment of the present invention.

FIG. 29 is a diagrammatic view which illustrates a preferred television advertising support screen for a product offering presentation to a buyer in the active screen area which provides a summary and details of television advertising plans for the product offering according to a preferred embodiment of the present invention.

FIG. 30 is a diagrammatic view which illustrates a preferred coupon support screen for a product offering presentation to a buyer in the active screen area which provides a summary and details of coupon plans for the product offering according to a preferred embodiment of the present invention.

FIG. 31 is a diagrammatic view which illustrates a preferred market potential analysis screen for a product offering presentation to a buyer in the active screen area which provides a summary and details of market potential analysis for the product offering according to a preferred embodiment of the present invention.

FIG. 32 is a diagrammatic view which illustrates a preferred product demonstration support plans screen for a product offering presentation to a buyer in the active screen area which provides a summary and details of product demonstration support plans for the product offering according to a preferred embodiment of the present invention.

FIG. 33 is a diagrammatic view which illustrates a preferred schematic (store location and display) recommendations screen for a product offering presentation to a buyer in the active screen area which provides a summary and details of schematic (store location and display) recommendations for the product offering according to a preferred embodiment of the present invention.

FIG. 34 is a diagrammatic view which illustrates a preferred presentation (product offering) recap screen for a product offering presentation to a buyer in the active screen area which provides a summary and details of the seller's product offering presentation according to a preferred embodiment of the present invention.

FIG. 35 is a diagrammatic view which illustrates a preferred usage of a "partial screen cover" used to hide a sensitive portion of the active screen area of screen without modifying or losing the underlying information displayed on the screen according to a preferred embodiment of the present invention.

FIG. 37 is a diagrammatic view which illustrates a preferred first phone log system set up options screen for setting each buyer's preferences for how the phone log system will behave according to a preferred embodiment of the present invention.

FIG. 38 is a diagrammatic view which illustrates a preferred second phone log system set up options screen for setting each buyer's preferences for how the phone log system will behave according to a preferred embodiment of the present invention.

FIG. 39 is a diagrammatic view which illustrates a preferred third phone log system set up options screen for setting each buyer's pop up preferences for how the phone log system will behave according to a preferred embodiment of the present invention.

FIG. 40 is a diagrammatic view which illustrates a preferred phone call logging options set up screen for setting each buyer's phone call logging and security preferences according to a preferred embodiment of the present invention.

Figure 41:
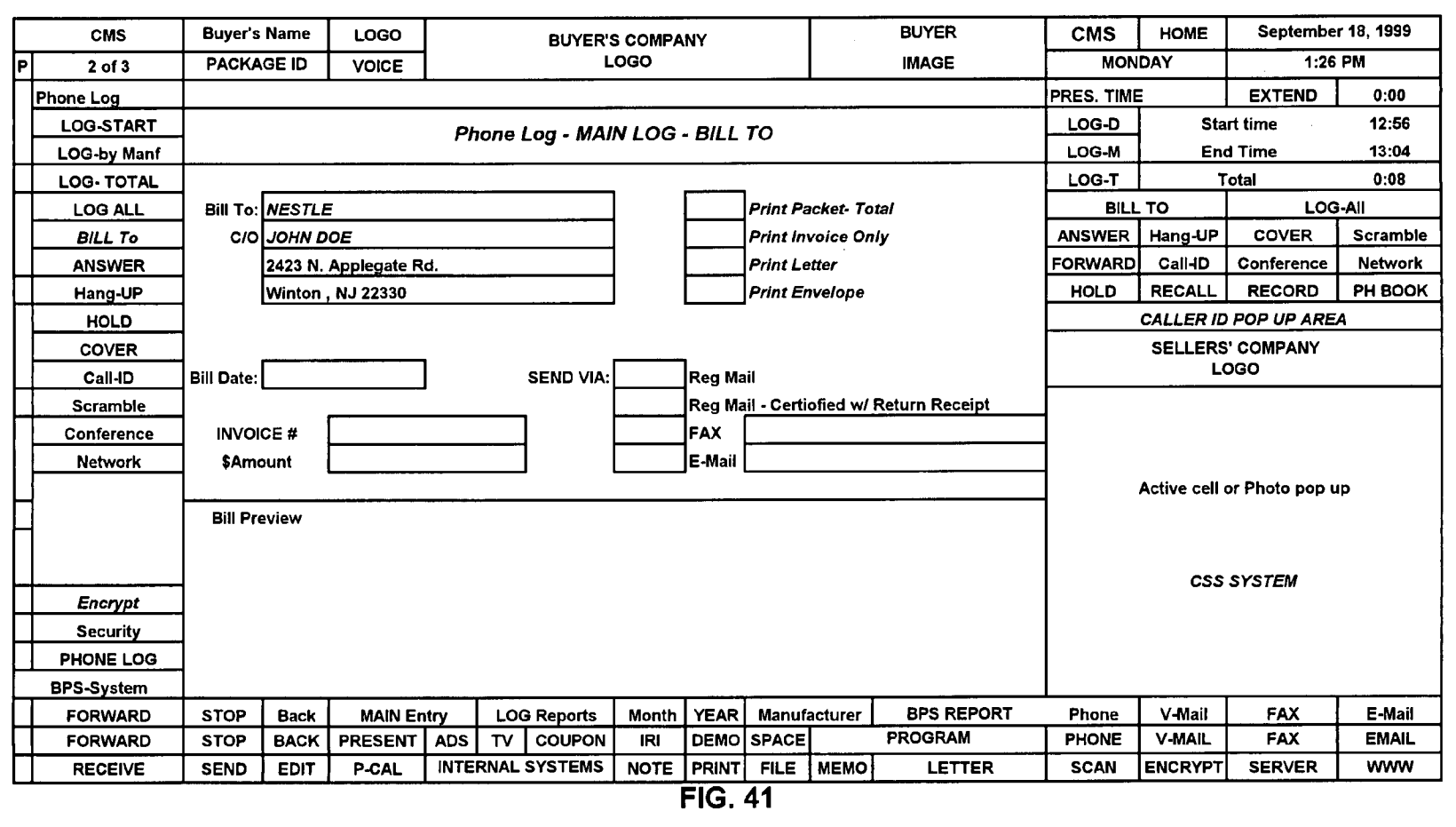

FIG. 41 is a diagrammatic view which illustrates a preferred phone call billing set up screen for setting the billing parameters of automatically billing sellers for logged phone calls to a buyer according to a preferred embodiment of the present invention.

FIG. 42 is a diagrammatic view which illustrates a preferred main log all callers screen for managing call settings for individual callers according to a preferred embodiment of the present invention.

FIG. 43 is a diagrammatic view which illustrates a preferred main bill to callers screen for managing billing settings for individual callers according to a preferred embodiment of the present invention.

FIG. 44 is a diagrammatic view which illustrates a preferred log of all calls made or received by a buyer which the buyer uses to identify calls to be billed according to a preferred embodiment of the present invention.

FIG. 45 is a diagrammatic view which illustrates a preferred expanded log of all calls made or received by a buyer which the buyer uses to identify calls to be billed according to a preferred embodiment of the present invention.

FIG. 46 is a diagrammatic view which illustrates a preferred log of all calls made or received by a buyer for a selected date range which the buyer uses to identify calls to be billed according to a preferred embodiment of the present invention.

FIG. 47 is a diagrammatic view which illustrates a preferred log of all calls made or received by a buyer for a selected manufacturer or broker which the buyer uses to identify calls to be billed according to a preferred embodiment of the present invention.

FIG. 48 is a diagrammatic view which illustrates a preferred log of voice mail messages received by a buyer for selective review and return according to a preferred embodiment of the present invention.

Figure 49:
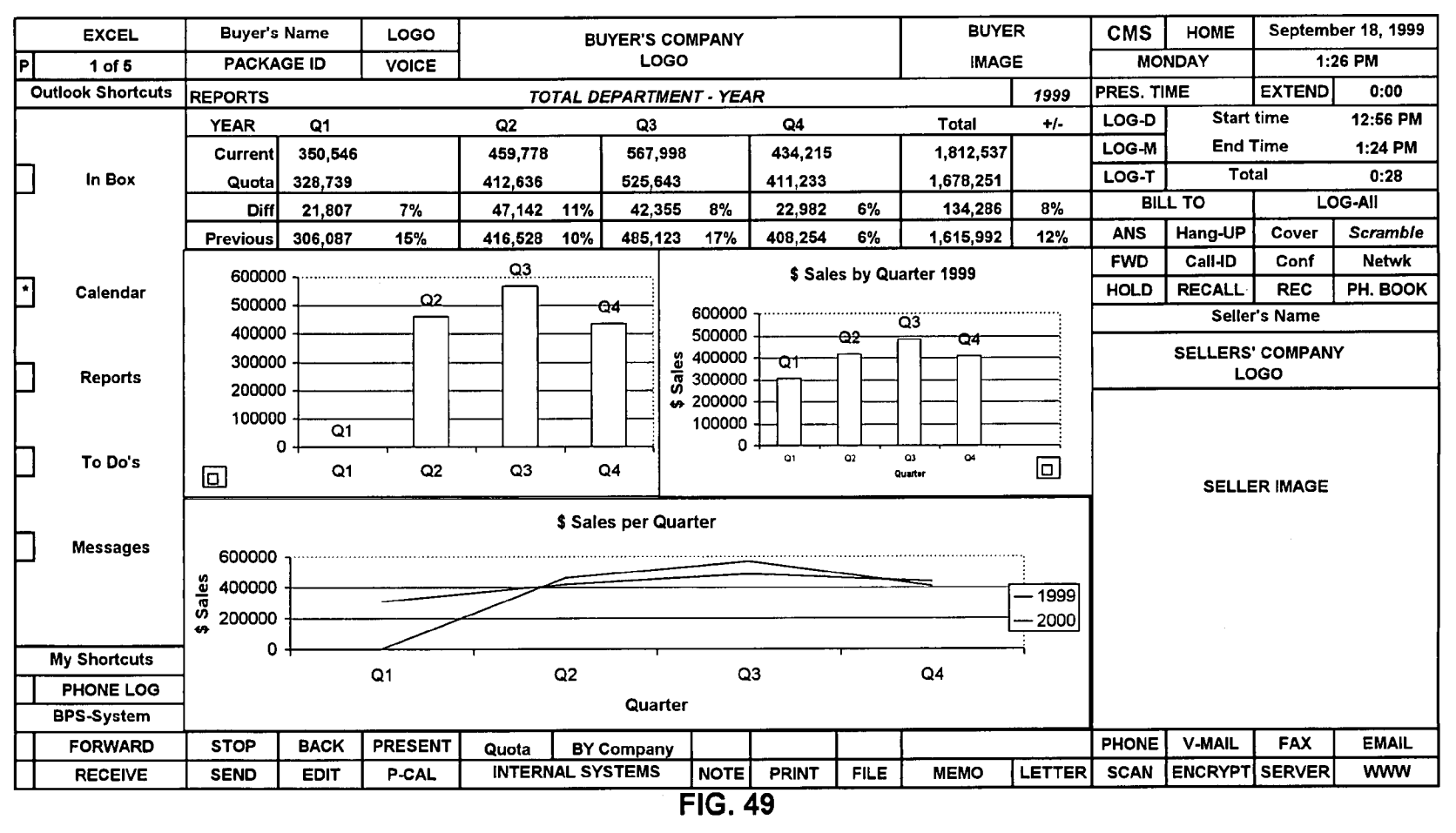

FIG. 49 is a diagrammatic view which illustrates a preferred sales analysis report for a department available to a buyer according to a preferred embodiment of the present invention.

FIG. 50 is a diagrammatic view which illustrates a preferred brokerage analysis report for a department by year available to a buyer according to a preferred embodiment of the present invention.

FIG. 51 is a diagrammatic view which illustrates a preferred brokerage analysis report for a manufacturer by year available to a buyer according to a preferred embodiment of the present invention.

FIG. 52 is a diagrammatic view which illustrates a preferred personal management screen for use by buyers for their own personal notes, calls, expense reports, etc., according to a preferred embodiment of the present invention.

DETAILED DESCRIPTION OF THE BEST MODES AND PREFERRED EMBODIMENTS OF THE INVENTION

In the accompanying drawings, well-known structures and devices are shown in block diagram form in order to provide an understanding of the interrelationship between components and the flow of information and control throughout the depicted preferred embodiment of the present invention. It will be apparent to one skilled in the art from the teachings herein that the invention may be practiced with a variety of different specific components, without detraction or departure from the scope of the present invention, provided to serve the generalized block diagram description. Specific statements made with respect to any of these operations are intended to clarify the nature of the operation being performed, but should not be taken as a limitation of the operation should an alternative operation be desired in a substantially similar situation or setting.

Figure 1:
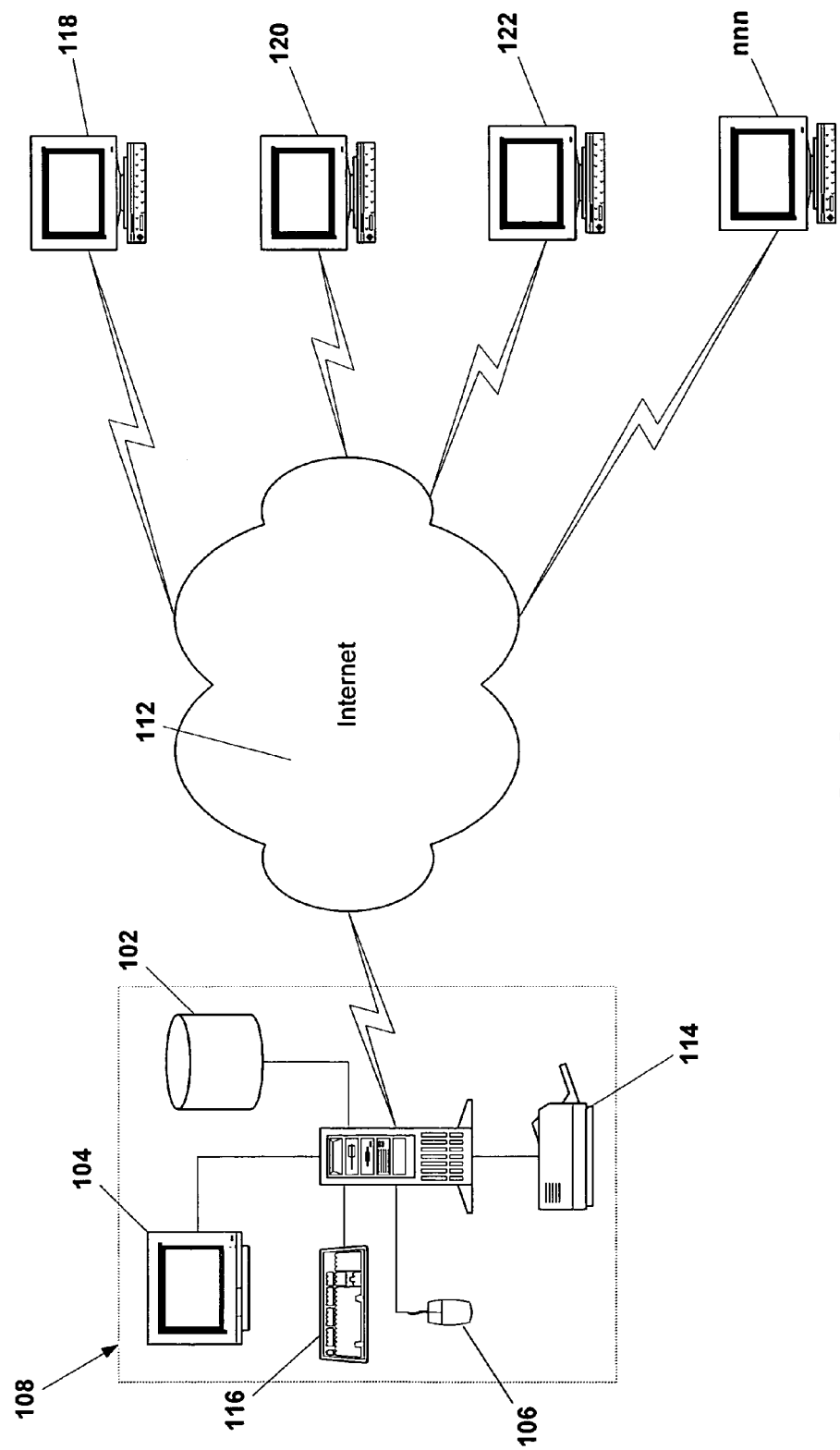
FIG. 1 is diagrammatical overview of the Internet communications used in the instant system according to preferred embodiments of the present invention.

Referring now to FIG. 1, a diagrammatical overview of the Internet communications used in the instant system according to preferred embodiments of the present invention is shown. The present invention preferably comprises a computer system 108. The computer system 108 comprises input and output devices as is well known in the art. For example, the computer system 108 preferably comprises a display screen or monitor 104, a keyboard 116, a printer 114, a mouse 106, etc. The computer system 108 further preferably comprises a database 102 for storage of the data and software comprising preferred embodiments of the present invention. The computer system 108 is preferably connected to the Internet 112 that serves as the presently preferred communications medium. The Internet 112 comprises a global network of networks and computers, public and private which permits communication and the exchange of information between individual computers and web servers. The Internet 112 is the preferred connection method to the users 118, 120, 122 and nnn in preferred embodiments of the present invention.

Figure 2:
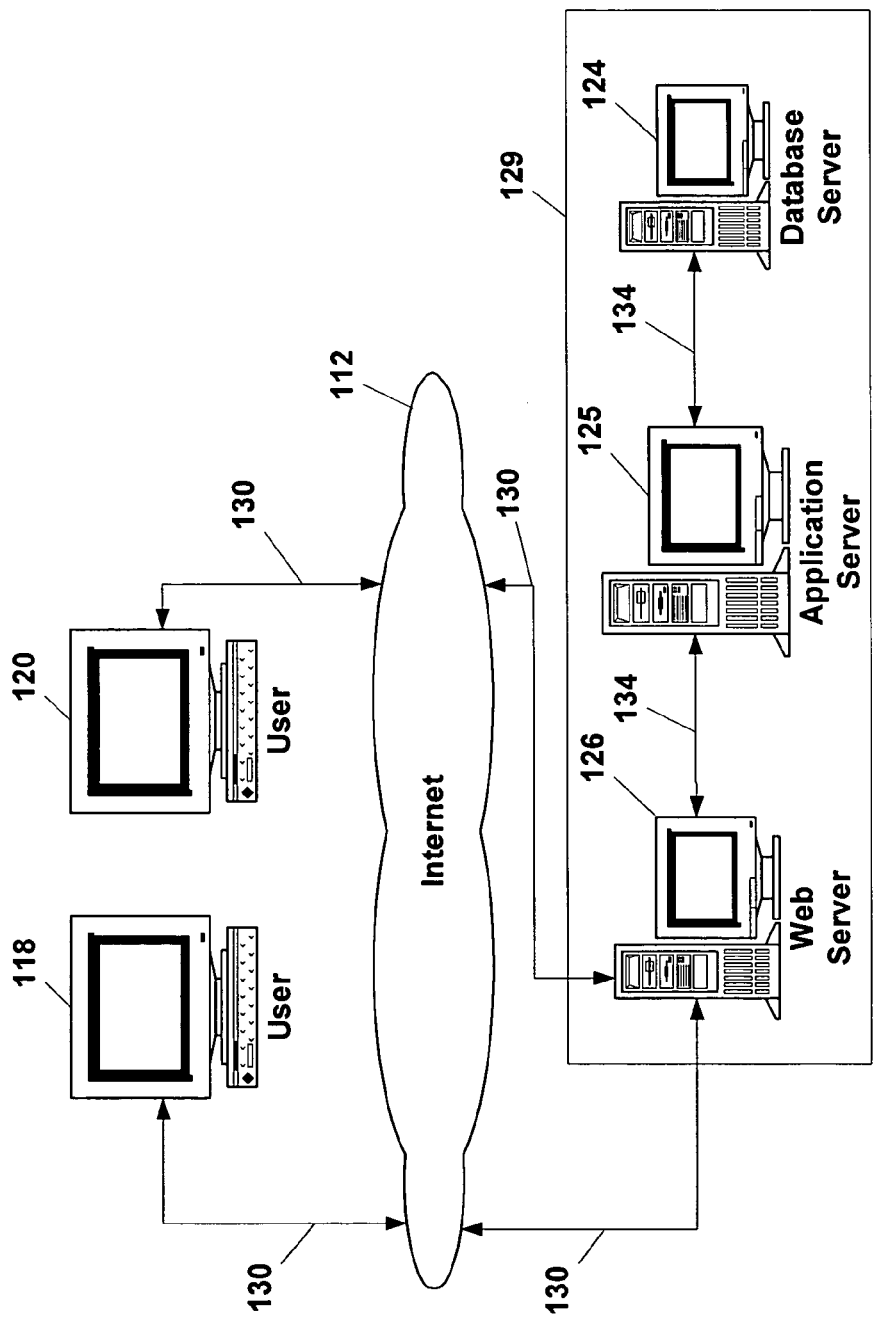
FIG. 2 is diagrammatical overview of the website computer system according preferred embodiments of the present invention.

Referring to FIG. 2, a diagrammatical overview of the website computer system according to preferred embodiments of the present invention is shown. This figure shows the preferred relationships between a user 118 (exemplary of any number of users 118, 120, 122, nnn), the Internet 112, the web server 126, the application server 125 and the database server 124. As shown, a user 118 requests a page from the web site of the present invention. The user 118 is preferably connected via the Internet 112, and the web page request preferably is received by the web server 126 which then initiates a call via an LAN connection 134, or similar local connection, to the application server 125 on which the present invention is implemented. The present invention may then preferably retrieve the requested data via an LAN connection 134, or similar local connection, from the database server 124, and preferably generate an HTML page. The application server 125 then passes the completed HTML page to the web server 126 which, in turn, preferably transmits the completed HTML page containing the data requested by the user 118 through the Internet 112 to the user 118. Upon reading the teachings of this specification, those with ordinary skill in the art will now understand that, under appropriate circumstances, considering issues such as request volumes and the numbers of user 118 (exemplary of any number of users 118, 120, 122, nnn) other arrangements may suffice, such as, combining web server 126, database server 124 and application server 125 into a single computer.

Figure 3:
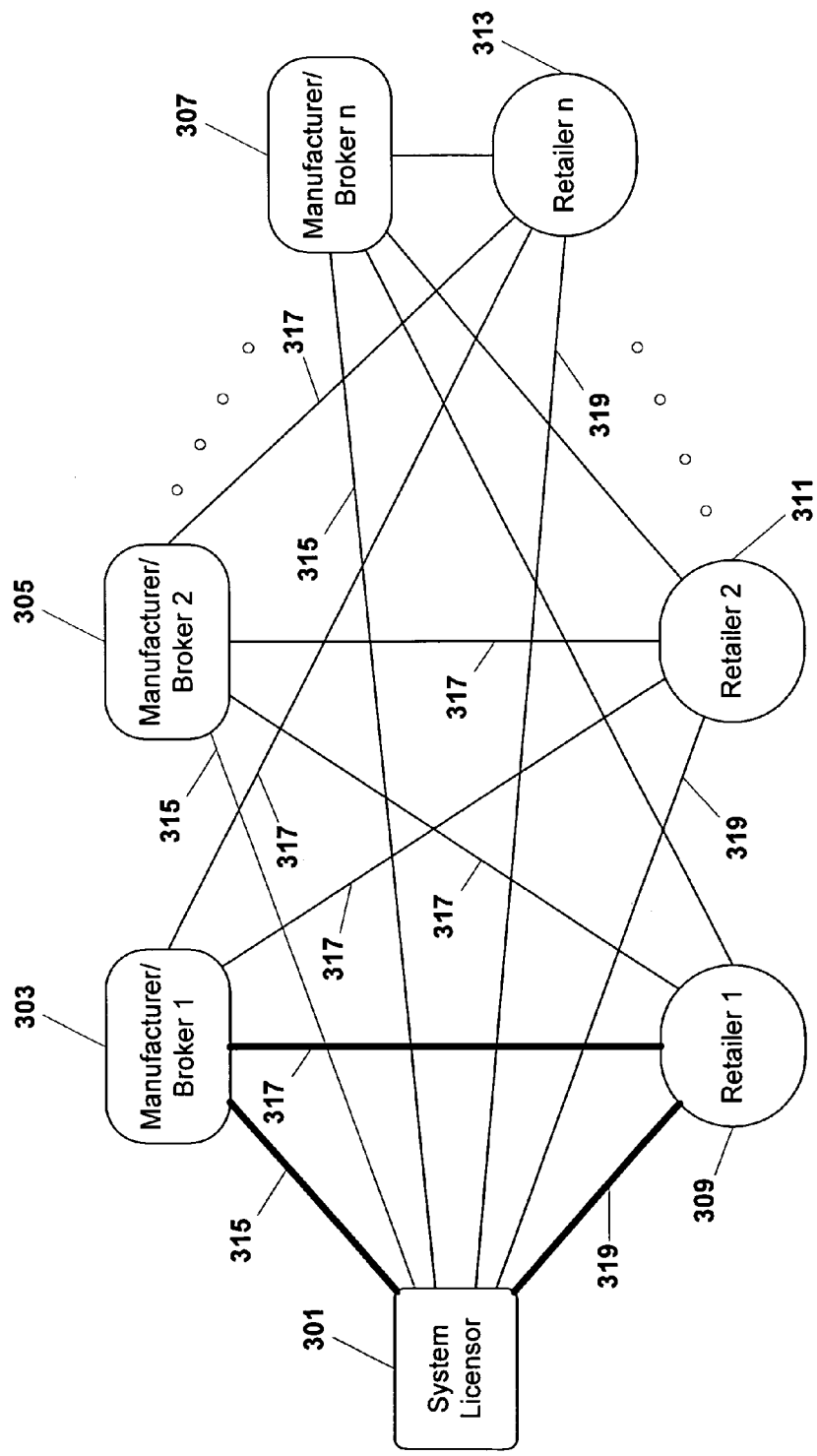
FIG. 3 is a block diagram showing the parties and their relationships according to preferred embodiments of the present invention. As shown, at least one salesperson representing at least one product obtains a presentation packet from the system licensor. The system then communicates that fact to a respective buyer, or buyers. The salesperson completes the presentation packet and communicates that presentation packet to the respective buyer(s). This relationship, as shown, may be repeated with multiple buyers and sellers in combination.

Referring to FIG. 3, the figure is a block diagram showing the parties and their relationships according to preferred embodiments of the present invention. Preferably, system licensor 301 markets the present system and business method to a company which offers merchandise at retail, preferably a grocery retailer, represented by retailer 1 309 (exemplary of any number of retailer 2 311, retailer n 313). If the retailer 1 309 agrees to the use of the system preferably the retailer 1 309 receives authority to use the present system and business method in exchange for a license fee as represented by license exchange 319. Preferably, the retailer 1 309 will then notify all sellers (acting for retail product providers) as represented, for example, by manufacturer/broker 1 303 (exemplary of any number of manufacturer/broker 2 305, manufacturer/broker n 307) that the system and business method must be used for any product offering presentation to retailer 1 309.

As shown, the authorization exchange 315 between the manufacturer/broker 1 303 and system licensor 301 preferably comprises a presentation package payment by manufacturer/broker 1 303 to system licensor 301 for which the manufacturer/broker 1 303 preferably receives authorization to prepare and present a product offering to one buyer representative of retailer 1 309 using the pre-defined presentation package structure (embodying herein wherein such at least one buying management system comprises at least one proposal package for use by such at least one retail-product-providing selling entity; and authorizing such at least one retail-product-providing selling entity to use such at least one proposal package to present such at least one retail product offering to such at least one for-retailer buying entity). Preferably a presentation package comprises authorization to prepare and present a presentation package for one product offering to one retailer. However, the same product offering may be prepared and presented to a different Retailer 1 309 by the same manufacturer if a presentation package is purchased by the manufacturer/broker 1 303.

A sales representative of manufacturer/broker 1 303 then preferably completes a presentation package for the product offering for the retailer 1 309. As noted, Manufacturer/broker 1 303 may buy a presentation package for retailer 2 311 for the same product offering and re-use of the product offering content from the presentation packages presented to retailer 1 309.

As represented by the presentation exchange 317, manufacturer/broker 1 303 remotely presents the presentation package to a buyer representative of retailer 1 309 using licensor's system. At the conclusion of the remote presentation retailer 1 309 notifies manufacturer/broker 1 303 of acceptance or rejection of the product offering. Additionally, licensor 301 receives notice of completion of the presentation of the product offering and allocates payment made by manufacturer/broker 1 303 to system licensor 301 on a pre-agreed basis between retailer 1 309 and system licensor 301.

As shown, this presentation exchange 317 relationship may be repeated in any combination between each retailer 1 309 requiring use of licensor's system and each manufacturer/broker 1 303 wishing to present product offerings to retailer 1 309. Benefits to manufacturer/broker 1 303 include multiple use of product offering information in multiple presentation packages, reduced preparation time; reduced travel because the presentation package is completed presented remotely. Benefits to retailer 1 309 include enforcement of consistency in competing product offering which improves comparability of offers, time savings because each presentation must be scheduled and revenue generation from each presentation completed by manufacturer/broker 1 303.

Figure 4:
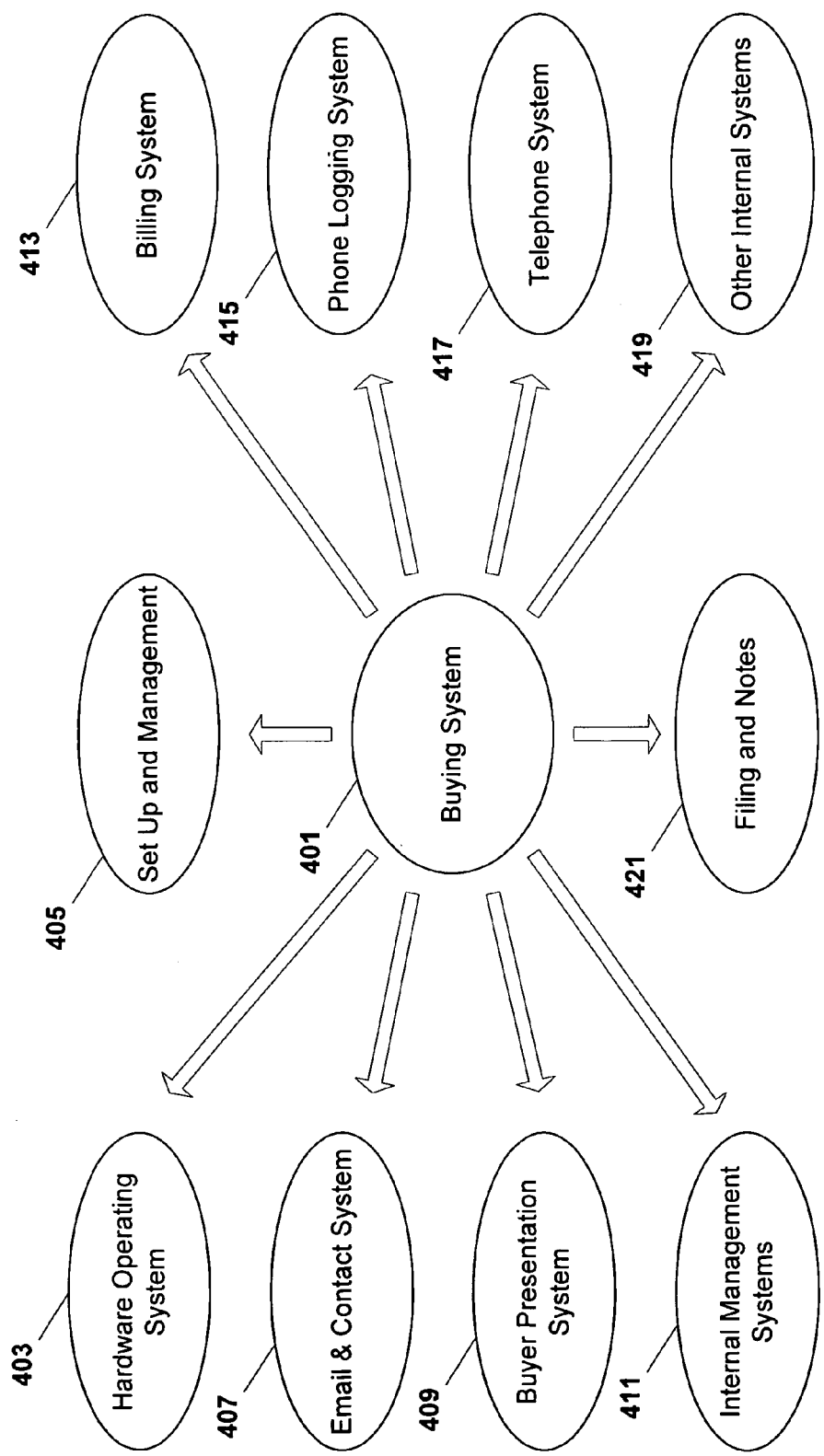
FIG. 4 is a general schematic illustrating the preferred primary software components and preferred external systems that are preferably available to a buyer using the instant system according to a preferred embodiment of the present invention.

Referring to FIG. 4, this is a general schematic illustrating the preferred primary software components and preferred external systems that are preferably available to a buyer representative of Retailer 1 309 using the instant system according to the preferred embodiment of the present invention. Preferably, the instant system permits integration on of various internal modules and external systems commonly used by buyer representative of Retailer 1 309 in their normal duties into a standardized and functional single point of access. Preferably, the primary point of integration is the Buying System 401 where a buyer representative of Retailer 1 309 may access any of the required systems or modules from a standard screen display. Additional system and module inter-operability integration preferably occurs between several systems and modules as well. The Buying System 401 preferably operates within a typical Hardware Operating System 403. Preferably, the instant system is capable of operating within the Microsoft Windows family of operating systems such Microsoft Windows 2000 and Microsoft Windows XP. Additionally, under appropriate circumstances, the instant system preferably operates with other operating systems such as Linux. Preferably, the operation of the instant system is therefore not specifically dependent on a particular Hardware Operating System 403.

According to a preferred embodiment of the present invention, the Buying System 401 provides authorized buyer representative of Retailer 1 309 access to the module Set Up and Maintenance 405. This point of integration with the Buying System 401 preferably permits security level modifications, user set up and modification of display standards within the instant system. Preferably, Set Up and Maintenance 405 also permits authorized users to create and manage the profiles of each of the brokers and manufacturers for use in presentation as well as ordinary telephone calls.

According to a preferred embodiment of the present invention, the Buying System 401 interfaces with at least one Email & Contact System 407. The preferred Email & Contact System 407 is Microsoft Outlook. Upon reading the teachings of this specification, those with ordinary skill in the art will now understand that, under appropriate circumstances, considering issues such as variations in installed systems and computer operating systems environments other arrangements may suffice, such as, interfacing the Buying System 401 with other applications which preferably permit buyer representative of Retailer 1 309 to access the other applications from pre-defined buttons on the Buyer Desktop 501. Preferably, the interface between the Buying System 401 and the Email and Contact System 407 provide the buyer representative of Retailer 1 309 direct access and display of email messages, personal calendar and address book information within the Buying System 401. The interface is preferably designed to permit access and input to the Email and Contact System 407 from the Buying System 401.

According to a preferred embodiment of the present invention, the Buying System 401 integrates with the Buyer Presentation System 409 to permit the buyer representative of Retailer 1 309 to view product offering presentations and control a product offering prepared by sellers through approval by the Retailer 1 309.

According to a preferred embodiment of the present invention, the Buying System 401 also provides an interface to the Internal Management Systems 411. Preferably, the Internal Management Systems 411 is a customized interface which permits an authorized user to access selected internal systems used by the retailer. Preferably, these internal systems are determined during initial installation of the customization of the instant system.

According to a preferred embodiment of the present invention, the Buying System 401 provides access to the Billing System 413 which preferably provides the capability to bill a Manufacturer/Broker 1 303 for telephone call time and for extensions of time beyond the allotted presentation time. Preferably, the Billing System 413 is a module of the Buying System 401 which operates in conjunction the Phone Logging System 415 to create invoices to Retailer 1 309 when requested by a buyer representative of Retailer 1 309.

According to a preferred embodiment of the present invention, the Buying System 401 provides access to the Phone Logging System 415. The Phone Logging System 415 is a module within the Buying System 401 which maintains a database containing all incoming and outgoing calls for each buyer representative of Retailer 1 309. Preferably, the Phone Logging System 415 obtains the required call information from the Buying System 401 which maintains a data interface with the telephone system used by the Retailer 1 309 to capture the call data.

According to a preferred embodiment of the present invention, the Buying System 401 provides a buyer representative of Retailer 1 309 direct control of particular features of the Telephone System 417 used by the Retail 1 309. Preferably, for example, a buyer representative of Retailer 1 309 may answer a call by selecting the answer button on the display of the Buying System 401 rather that picking up the hand set from the desk set. Additionally, preferably the integration of the Buying System 401 with the Telephone System 417 permits the display of an image of the caller based on recognition by the Telephone System 417 of the telephone number of the caller.

According to a preferred embodiment of the present invention, the Buying System 401 will optionally permit the definition and implementation of access points to Other Internal Systems 419 used by Retailer 1 309. Preferably, the Other Internal Systems 417 is a customized interface which permits an authorized user to access selected internal systems used by Retailer 1 309. Preferably, these internal systems are determined during initial installation of the customization of the instant system.

According to a preferred embodiment of the present invention, the Buying System 401 provides an interface to Filing and Notes 421. Filing and Notes 421 is a module of the Buying System 401 which permits a buyer representative of Retailer 1 309 to enter notes about a product offering from manufacturer/broker 1 303 and link them with the presentation package. Similarly, Filing and Notes 421 provides the capability to attached other documents or images to a presentation package presented by manufacturer/broker 1 303.

Figure 5:
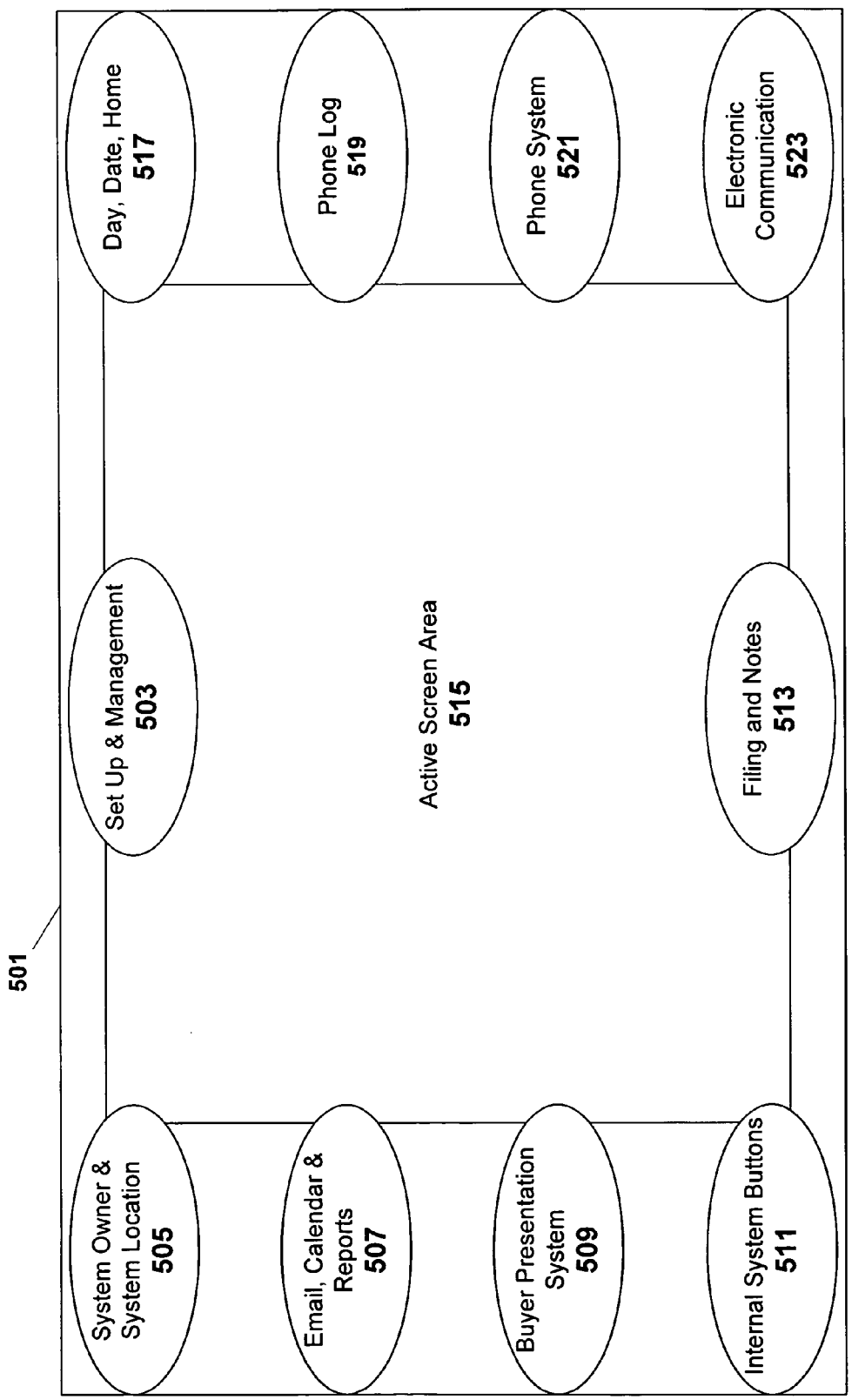
FIG. 5 is a general diagram illustrating the overall standardized buyer's screen configuration which preferably encompasses access to the primary functions included or accessed through the buying system according to a preferred embodiment of the present invention.
Figure 8:
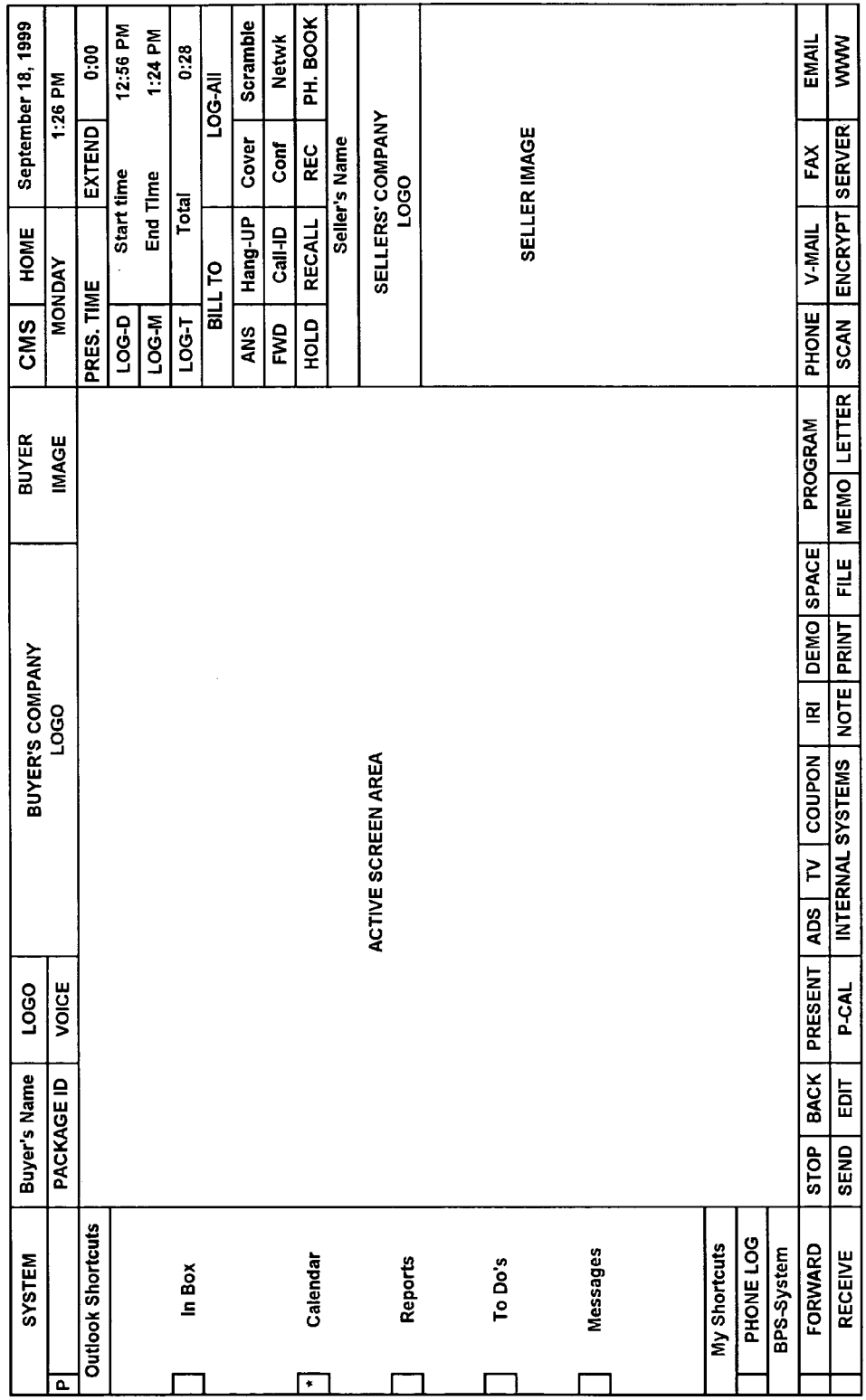
FIGS. 8 through 8K are diagrammatic views which illustrate each of the primary functions and their location within the preferred buyer's screen configuration shown in FIG. 5 according to a preferred embodiment of the present invention.

Referring to FIG. 5, is a general diagram illustrating the Buyer's Desktop 501, an overall standardized screen configuration which preferably encompasses access to the primary functions included or accessed through the Buying System 401 according to the preferred embodiment of the present invention. The display methods and organization of Buying System 401 utilizes a standardized desktop organization of the systems and modules of the Buying System 401 most commonly used by a buyer representative of Retailer 1 309 in the course of his or her daily work. As shown in FIG. 5, this approach is illustrated by the Buyer Desktop 501 which preferably provides standard locations within the structure of a computer display. This is accomplished by defining the central screen area as the Active Screen Area 515, then arranging the buttons and displays for the systems and modules around the periphery of the Active Screen Area 515. The Active Screen Area 515 permits the display of the usual user interface of a selected application or module while retaining the other areas on the screen. For example, if the buyer representative of Retailer 1 309 chooses to view his or her email the usual listing of messages in the email "inbox" is displayed in the Active Screen Area 515. An example of the preferred screen organization is depicted in FIG. 8. As can be seen, each buyer representative of Retailer 1 309 is presented with all the necessary tools to manage his or her daily work from a single presentation of all required system functions. Each functional area is identified and described in further detail below.

Figure 8A:
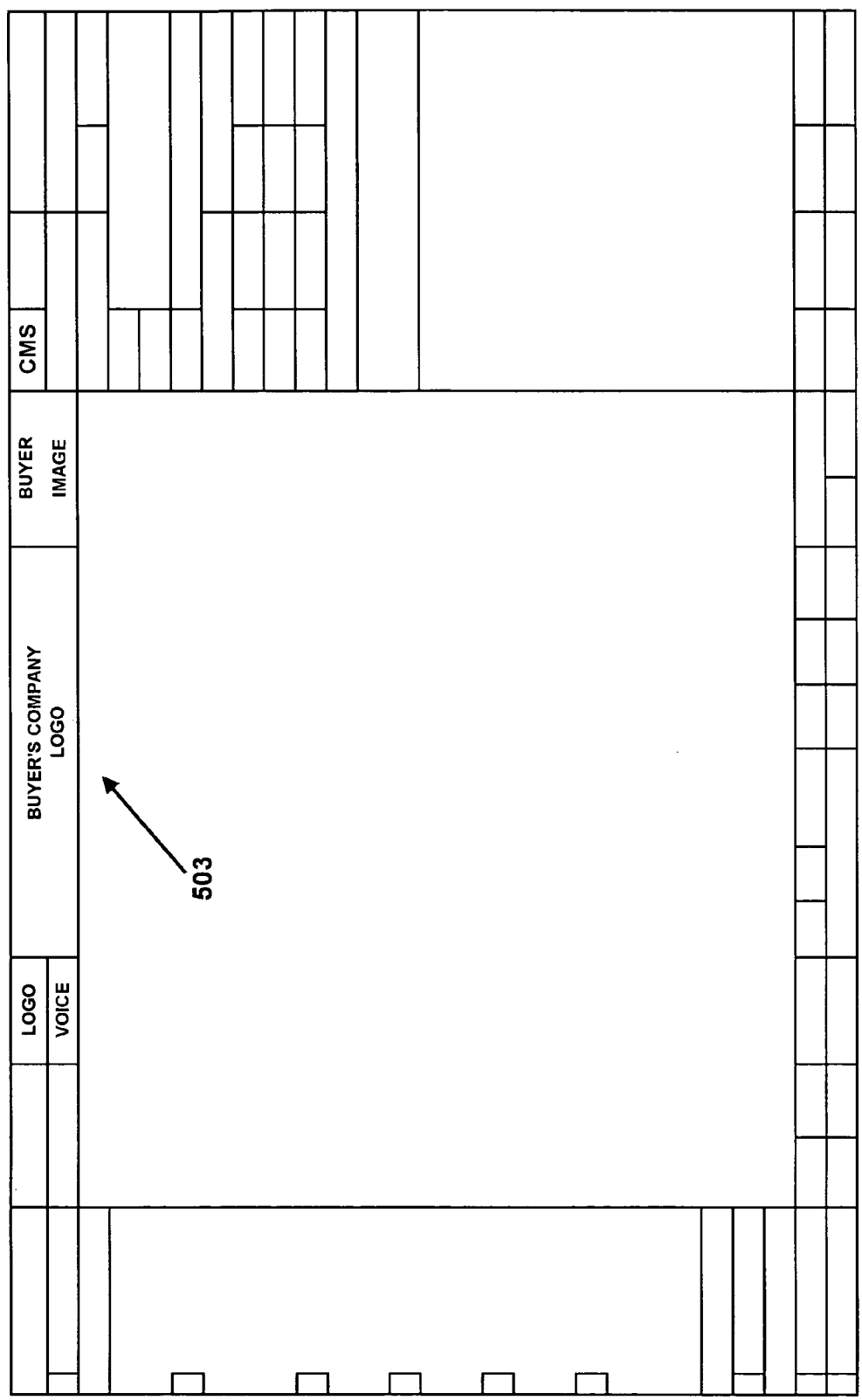

According to a preferred embodiment of the present invention the area for Set Up & Management 503 is located along the top of the Buyer Desktop 501. The buttons and display areas shown in FIG. 8A the area preferably encompass Set Up & Management 503. Preferably, a buyer representative of Retailer 1 309 may access the various set up options available to him or her by selecting the CMS button. Preferably, for example, set up may include setting and modifying security options, profile information regarding a manufacturer/broker 1 303 or the personal profile information of the buyer representative of Retailer 1 309. When selected the Voice button preferably enables the use of voice commands to operate the various functions available on the Buyer Desktop 501. The logo of the retailer 1 309 and an image of the buyer representative of Retailer 1 309 are also preferably displayed as part of Set Up & Management 503. FIG. 9, FIG. 10, FIG. 11, FIG. 12, FIG. 13, FIG. 20, FIG. 21, FIG. 22, and FIG. 23 are examples of the preferred screens preferably associated with Set Up and Management 503.

According to a preferred embodiment of the present invention the area System Owner & System Location 505, as depicted in FIG. 8B is preferably located in the upper left of the Buyer Desktop 501. The area System Owner & System Location 505 preferably encompasses navigational information by displaying the name of currently active functional area in the System field. For example, preferably "BPS" would be displayed if the buyer representative of Retailer 1 309 has selected the BPS-System to view presentation of a presentation package. The name of the buyer representative of Retailer 1 309 is also preferably displayed.

According to a preferred embodiment of the present invention the area Email, Calendar & Reports 507, as depicted in FIG. 8C provides access to the email, personal calendar of the buyer representative of Retailer 1 309 and graphical analysis reports. Preferably, the function selected from the area Email, Calendar & Reports 507 is presented to the buyer representative of Retailer 1 309 in the Active Screen Area 515. FIG. 14, FIG. 15, FIG. 16, FIG. 17, FIG. 18, FIG. 19, FIG. 49, FIG. 50, and FIG. 51 are examples of the preferred screens preferably associated with Email, Calendar & Reports 507.

According to a preferred embodiment of the present invention, the Buyer Presentation System 509, as depicted in FIG. 8D preferably provides access and control of the Buyer Presentation System module of the Buying System 401.

These buttons are preferably only active when after selection of the BPS-System button. Preferably, the Receive button controls receipt of a presentation package from a sales representative of manufacturer/broker 1 303 at the appointed time. Preferably, the Forward, Stop, and Back buttons are used to control the overall presentation flow of a product offering by a buyer representative of Retailer 1 309. Preferably the Present, ADS, TV, Coupon, IRI, Demo, Space and Programs buttons are shortcuts to the predefined segments of each presentation package and to display the detailed content for each segment. Preferably, as with the other systems and modules, each presentation package is displayed in the Active Screen Area 515. Preferably, selection of the P-Calendar button provides the buyer representative of Retailer 1 309 a view of all presentations that have been scheduled. Preferably, selection of the Send button will return the presentation to the sender to permit for corrections or completion by the sales representative of manufacturer/broker 1 303. Preferably, selection of the Edit button permits both the buyer representative of Retailer 1 309 and the sales representative of manufacturer/broker 1 303 to make modifications to the presentation package being presented. FIG. 25, FIG. 26, FIG. 27, FIG. 28, FIG. 29, FIG. 30, FIG. 31, FIG. 32, FIG. 33, FIG. 34, FIG. 35 and FIG. 36 are examples of the preferred screens preferably associated with the Buyer Presentation System 509.

Figure 8E:
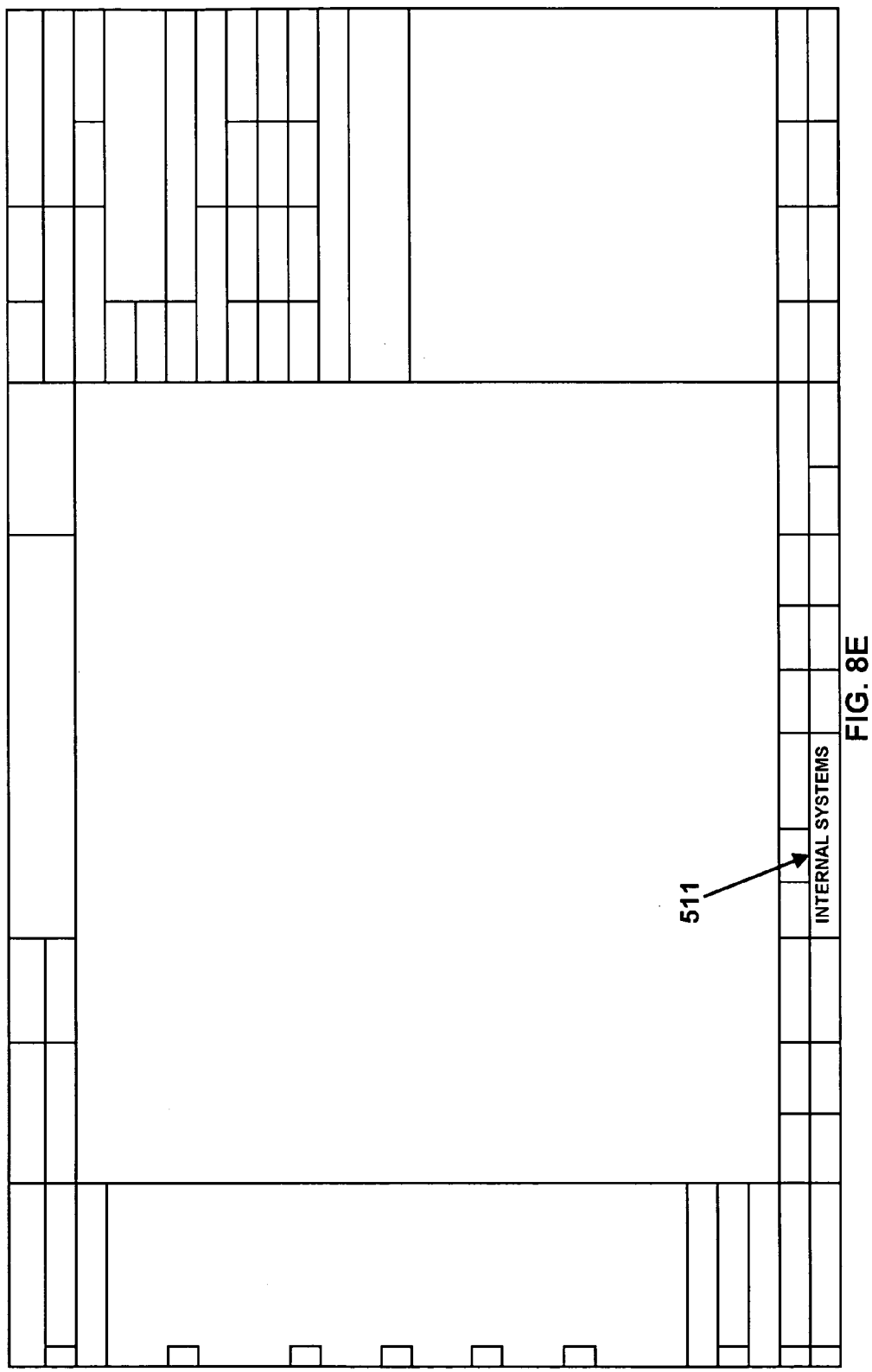

According to a preferred embodiment of the present invention the area Internal System Buttons 511, as depicted in FIG. 8E is reserved for designation of buttons for internal systems of Retailer 1 309. Preferably, during implementation additional systems are identified which are of particular importance to buyer representatives of Retailer 1 309. The systems then can preferably be accessed from this area and their primary display shown in the Active Screen Area 515 by the buyer representative of Retailer 1 309.

According to a preferred embodiment of the present invention the area Filing and Notes 513, as depicted in FIG. 8F provides access to common functions such as notes, memos and letters.

Preferably, selecting the Note button causes the presentation to be suspended and the Note page presented to the buyer representative of Retailer 1 309. This allows the buyer representative of Retailer 1 309 to create and link personal notes to the specific presentation page being viewed. Notes are preferably internal to the retailer if the presentation package is returned to the sales representative of manufacturer/broker 1 303. Preferably, selection of the Note button suspends the automatic time sequence of the presentation package. The Forward button must preferably be selected to continue the presentation of the presentation package.

Preferably, selecting the Print button causes the system to print the page or pages that are currently shown in the Active Screen Area 515.

Preferably, selecting the File button causes the system to save an image the page or pages that are currently shown in the Active Screen Area 515 to a location selectable by buyer representative of Retailer 1 309.

Preferably, selecting the Memo causes the presentation to be suspended and the Memo page presented to the buyer representative of Retailer 1 309. This allows the buyer representative of Retailer 1 309 to create and link a memo to the specific presentation page being viewed. Memos are preferably internal to the retailer if the presentation package is returned to the sales representative of manufacturer/broker 1 303. Preferably, selection of the Memo button suspends the automatic time sequence of the presentation package. The Forward button must preferably be selected to continue the presentation of the presentation package.

Preferably, selecting the Letter button causes the presentation to be suspended and the Letter page presented to the buyer representative of Retailer 1 309. This preferably allows the buyer representative of Retailer 1 309 to create and link a letter to the specific presentation page being viewed. Preferably selection of the Letter button suspends the automatic time sequence of the presentation package. The Forward button must preferably be selected to continue the presentation of the presentation package.

The Memo and Letter buttons preferably provide access to pre-formatted documents for use by buyer representative of Retailer 1 309.

According to a preferred embodiment of the present invention the area Active Screen Area 515, as depicted in FIG. 8G provides the primary area for display of the primary screens from each on the integrated systems or modules.

Figure 8H:
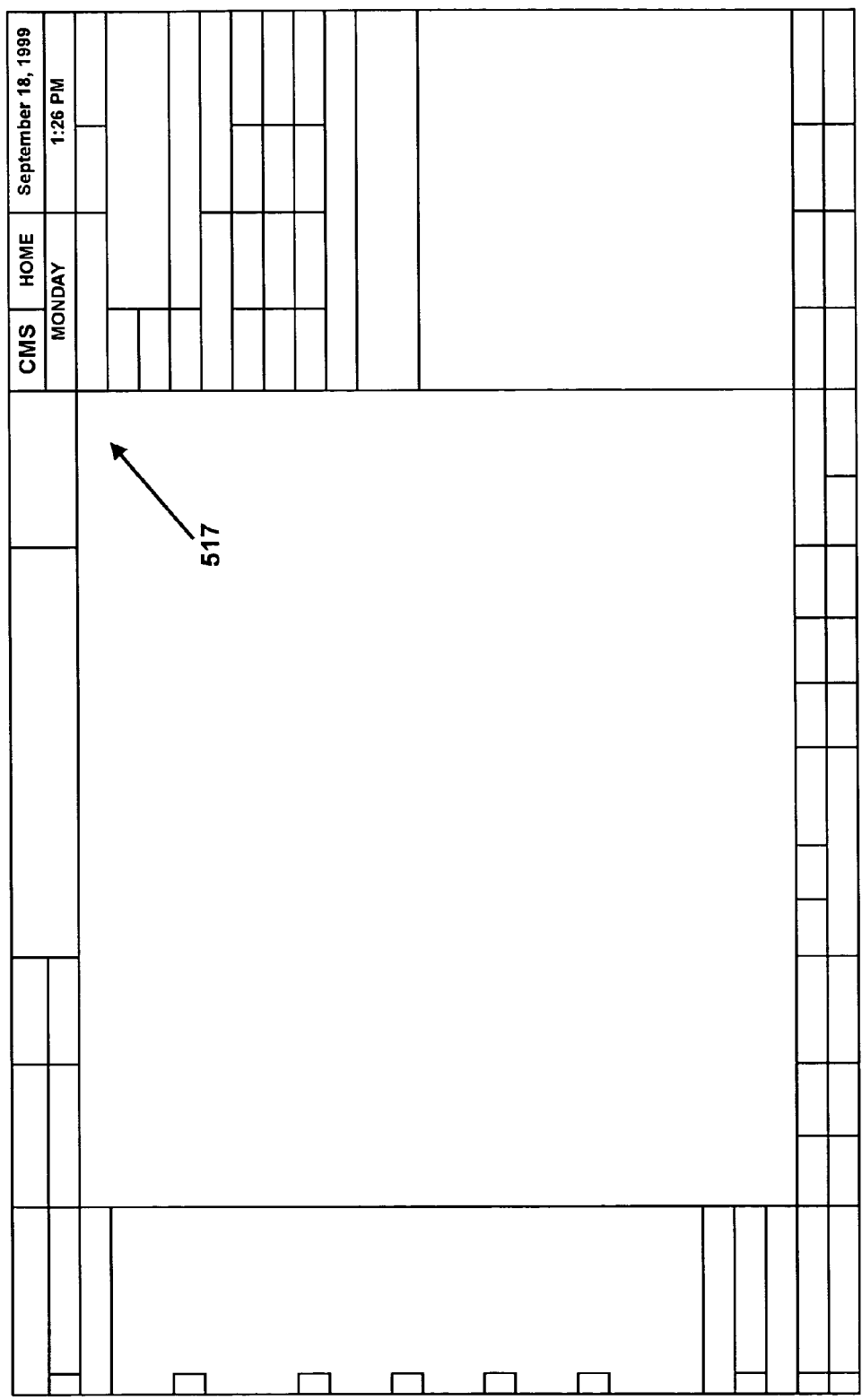

According to a preferred embodiment of the present invention the area Day, Date, Home 517, as depicted by FIG. 8H includes the basic status fields, Day of the Week, Date and Time, and Home. When selected, the Home button preferably returns the buyer to the primary display of the active function or application, for example when Outlook is the active application preferably the Inbox would be displayed.

According to a preferred embodiment of the present invention the Phone Log System 519, as depicted in FIG. 8I preferably presents start and end time for presentation package presentations and telephone calls. The buyer preferably also may display the telephone log by date, by manufacturer or in total in the Active Screen Area 515. Additionally, preferably a buyer may select the Bill To button to identify one or more logged calls as billable to the manufacturer. As shown, a buyer preferably may choose to log all calls by selecting the Log All button. FIG. 37, FIG. 38, FIG. 39, FIG. 40, FIG. 41, FIG. 42, FIG. 43, FIG. 44, FIG. 45, FIG. 46, FIG. 47 and FIG. 48 are examples of the preferred screens preferably associated with the Phone Log System 519.

Figure 8J:
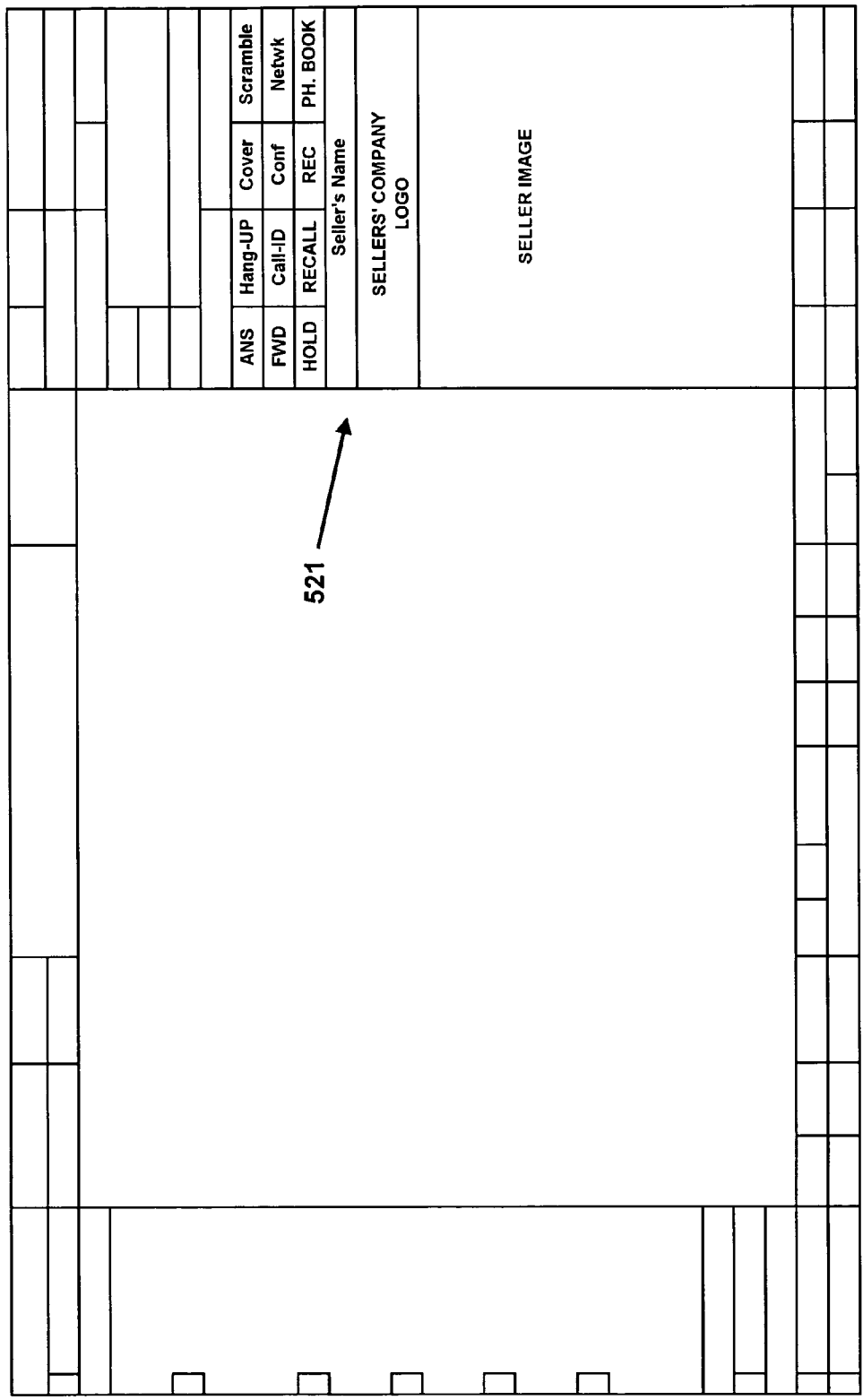

According to a preferred embodiment of the present invention, the area Phone System 521, as depicted in FIG. 8J represents the primary interface point with the private branch exchange, or similar, telephone system of the Retailer 1 309. Preferably, this integration permits the buyer to perform such usual telephony functions such as answer, hang up, conference another party, forward a call, or place a call on hold from the Buyer Desktop 501 rather than from the telephone system desk set. Additionally, preferably a buyer may choose to recall a previously called number, record a call, or look up a number in the internal phone book. A buyer may also chose the Cover button which will cover the screen with the logo Retailer 1 309 to prevent unwanted disclosure of what is displayed on the Buyer Desktop 501. Preferably, a buyer may select the Scramble button to encrypt the call to prevent unwarranted eavesdropping on a call. Preferably, integration with the telephone system permits a database look up based on the caller's number and display of the caller's name, employers and an image of the caller in the Phone System 521 area.

Figure 8K:
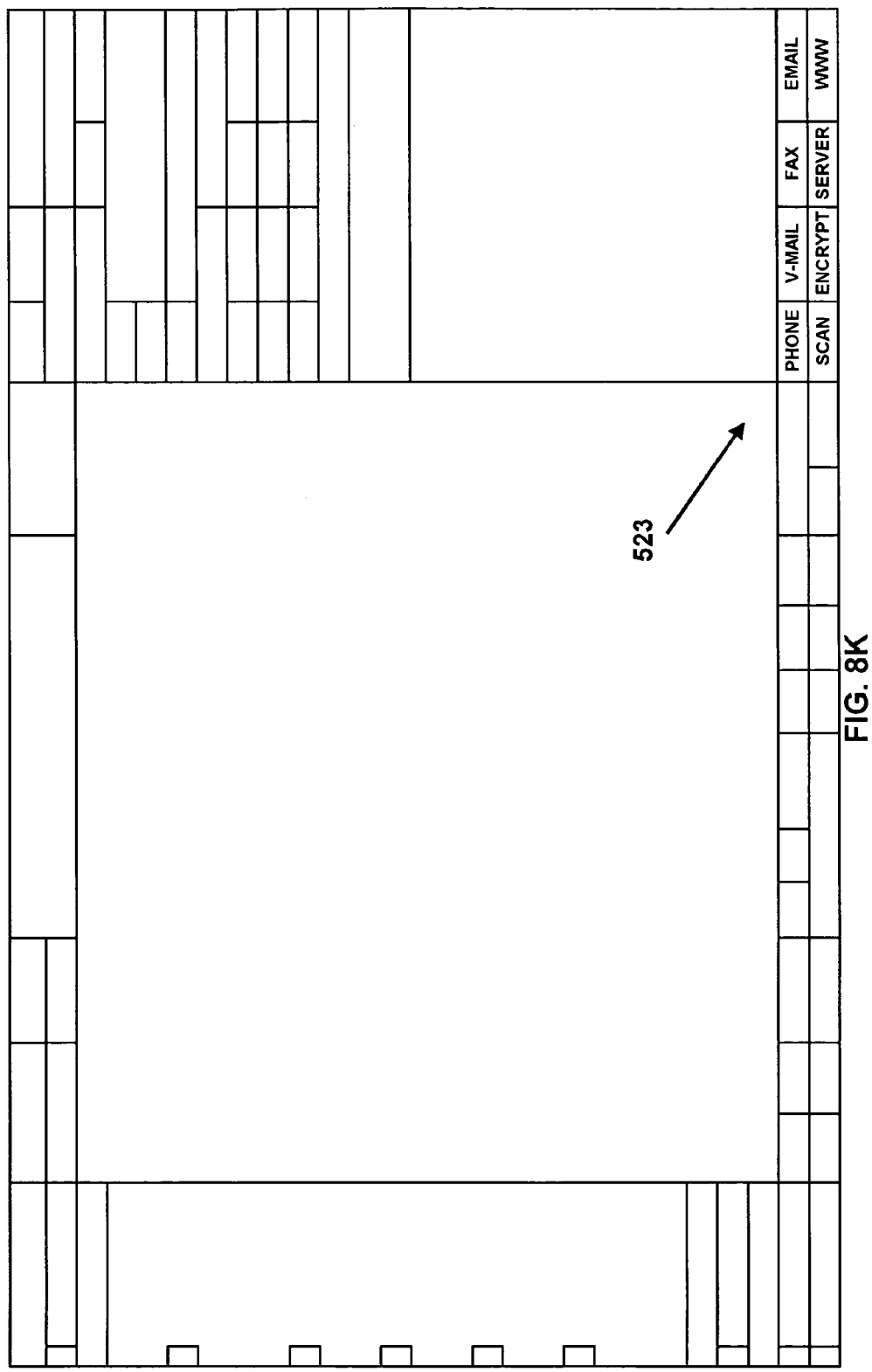
Figure 14:
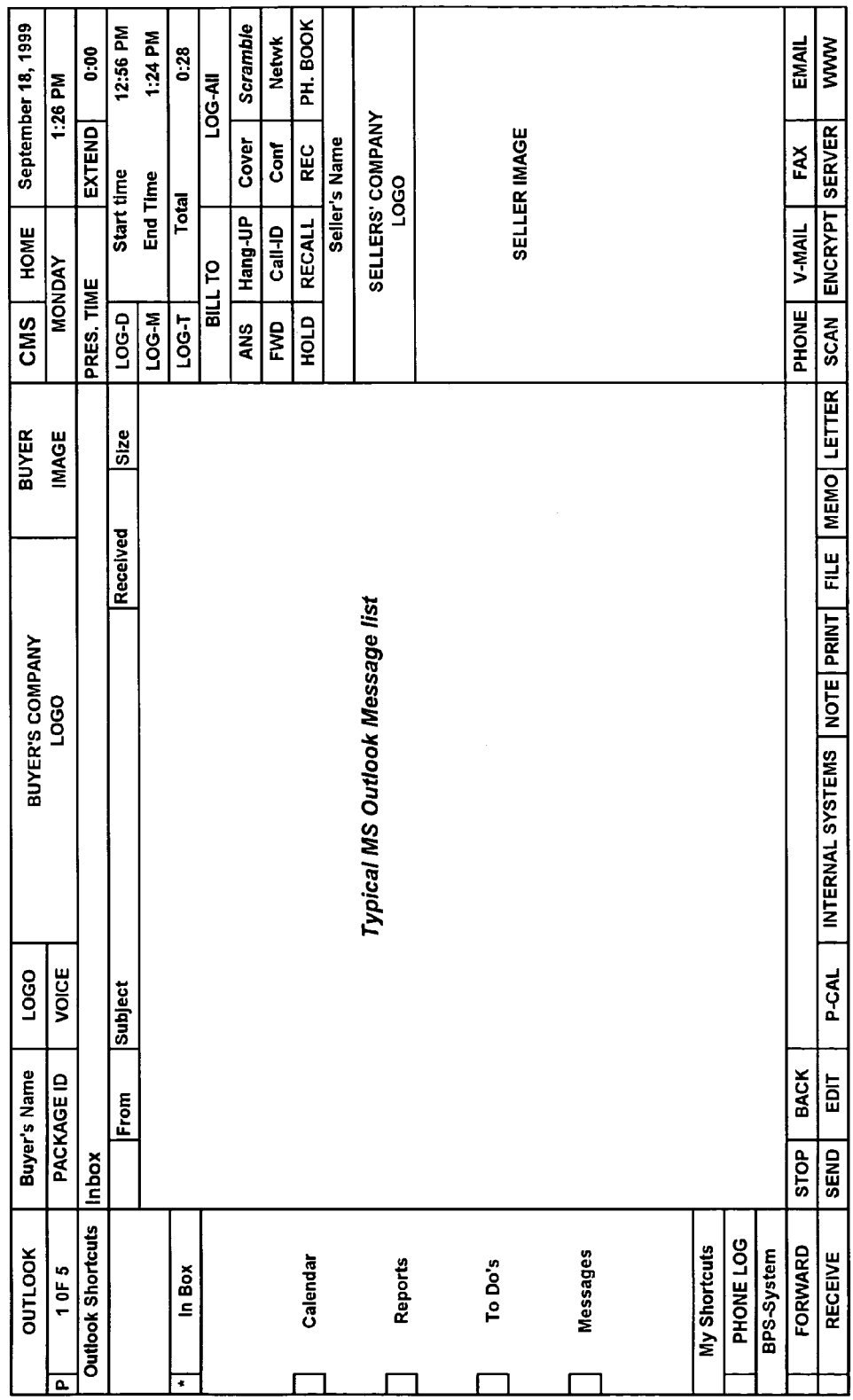
FIG. 14 is a diagrammatic view which illustrates a preferred screen presentation when a personal calendaring and email application, such as Microsoft Outlook, has been loaded into the active screen area of the instant system according to a preferred embodiment of the present invention.

According to a preferred embodiment of the present invention, the area Electronic Communication 523, as depicted by FIG. 8K preferably provides access to of the various functions of external applications such as fax software, document scanners, etc.

Figure 6:
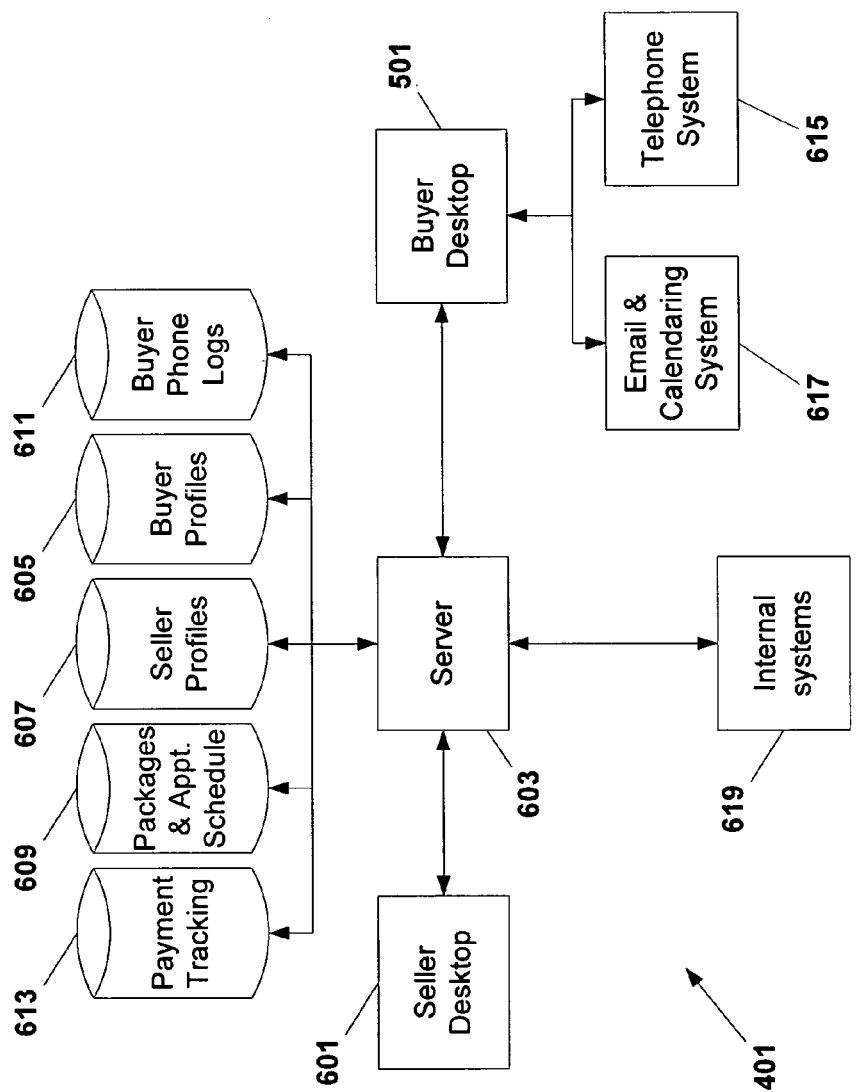
FIG. 6 is an overview block diagram illustrating the primary buying system components and their relationships according to a preferred embodiment of the present invention.

Referring to FIG. 6 which is an overview block diagram illustrating the primary components of Buying System 401 and their relationships according to a preferred embodiment of the present invention. Preferably, the central component of Buying System 401 is the Server 603 which preferably is comprised of a variety of application software modules, a database manger, reporting modules and external application software interfaces to manage and control the use of the Buying System 401 by buyer representative of Retailer 1 309 and sales representative of manufacturer/broker 1 303 to assist in managing the daily buying activities of a buyer representative of Retailer 1 309. The primary software modules preferably provided by Server 603 include system set up and management, buyer presentation system, phone logging system, telephone billing, and payment tracking and accounting, Interfaces with other applications and hardware preferably comprise Microsoft Outlook (or a similar email and calendaring application) interface, telephone system interface, and internal systems interfaces. Preferably, the Server 603 may operate in hardware and network environments internal to buyer representative of Retailer 1 309. Upon reading the teachings of this specification, those with ordinary skill in the art will now understand that, under appropriate circumstances, considering issues such as implementation and distribution costs and the convenience demanded by buyer representative of Retailer 1 309 and sales representative of manufacturer/broker 1 303 other arrangements may suffice, such as, providing essentially all the Buying System 401 functions to buyer representative of Retailer 1 309 and sales representative of manufacturer/broker 1 303 via the Internet or by some similar means.

As depicted in FIG. 6, various databases will be maintained by the Buying System 401. Preferably, the Buyer Profiles Database 605 will maintain specific information related to each buyer representative of Retailer 1 309 authorized to use the Buying System 401. Information retained will include contact information, position, optionally an image and all security settings and parameter specific to buyer representative of Retailer 1 309.

Preferably, the Seller Profiles Database 607 will maintain specific information related to each sales representative of manufacturer/broker 1 303 authorized to use the Buying System 401. Information retained will include contact information, position, products or manufacturers represented and optionally an image of themselves.

Preferably, the Packages and Appointment Database 609 contains presentation package authorizations and the related presentation package content. Additionally, the Packages and Appointment Database 609 retains the status information on each presentation package relative to whether it has been presented and whether buyer representative of Retailer 1 309 has made a final decision accepting the product proposal contained in the presentation package. Finally, the Packages and Appointment Database 609 contains the presentation appointment calendar of availability for each buyer representative of Retailer 1 309.

Preferably, the Buyer Phone Log Database 611 is a repository of information related each incoming and outgoing telephone call for each buyer representative of Retailer 1 309. Typical information regarding each call such as date, start time, end time and called/calling number are preferably captured and preferably buyer representative of Retailer 1 309 may input the calling party, subject and whether the call should be billed to the sales representative of manufacturer/broker 1 303. Call billing information will be communicated preferably to an internal accounting system of buyer 3 for tracking and management of the payments by the Server 603. Preferably, Server 603 will essentially automatically update billing status in the Phone Log Database 611 for each call requiring billing.

Preferably, the Payment Tracking Database 613 will contain data regarding payments made by sales representative of manufacturer/broker 1 303 for presentation package authorizations. Information maintained in the Payment Tracking Database 613 comprises presentation package authorization identifier, payment amount received, the buyer 3 who will receive the presentation, and the sales representative of manufacturer/broker 1 303 making the payment and date and time of presentation of the presentation package. A presentation package authorization payment is preferably retained in a "suspense" status until presentation package presentation has been completed by sales representative of manufacturer/broker 1 303. At the conclusion of the presentation of a presentation package the date and time are automatically recorded by Server 603 and payment amounts for buyer representative of Retailer 1 309 and system licensor 301 are calculated. Amounts to be paid may then be automatically transmitted to the internal accounting system of buyer representative of Retailer 1 309 for payment. Upon reading the teachings of this specification, those with ordinary skill in the art will now understand that, under appropriate circumstances, considering issues such as costs and the convenience demanded by buyer representative of Retailer 1 309, other arrangements may suffice, such as, permitting electronic funds transfer via the Internet to system licensor 301 and buyer representative of Retailer 1 309 or by some similar means.

As depicted in FIG. 6, the functions of the Buying System 401 are primarily delivered through the Buyer Desktop 501 or the Seller Desktop 601. Preferably, the Seller Desktop is generally configured in a manner similar to the Buyer Desktop 501. However, the Seller Desktop 601 will preferably be limited to capabilities which permit a sales representative of manufacturer/broker 1 303 to purchase presentation package authorizations, input, and edit presentation packages, view the presentation schedule for a selected buyer representative of Retailer 1 309, schedule a presentation appointment with that buyer representative of Retailer 1 309 and finally present a completed presentation packages to buyer representative of Retailer 1 309.

Preferably, the set up and management function provides the means for initial implementation and ongoing management of the Buying System 401. Particularly, it preferably provides the means for establishing authorized users, input and retention of sales representative of manufacturer/broker 1 303 and seller profiles, pricing of the various presentation packages and a broad range of variables used by the Buying System 401 to operate properly with minimum of human intervention.

Preferably, the buyer presentation system comprises means for sales representative of manufacturer/broker 1 303 to create and present presentation package to a buyer representative of Retailer 1 309. Preferably, the buyer presentation system issues and controls purchase of presentation package authorizations by sales representative of manufacturer/broker 1 303 including recording payments and subsequent allocation of the payment to buyer representative of Retailer 1 309 and system licensor 301. Additionally, the buyer presentation system assists in managing the decision making process of the buyer representative of Retailer 1 309. Further, the buyer presentation system permits the buyer 3 to set the overall time periods he or she is available for presentation of presentation package by a sales representative of manufacturer/broker 1 303.

As further depicted in FIG. 6, the Telephone System 615 is preferably directly interfaced with the Buyer Desktop 501 to permit control of selected functions of the Telephone System 615 by buyer representative of Retailer 1 309 from the Buyer Desktop 501. Additionally, the Telephone System 615 will preferably supply call date, call start time, call end time and calling/called telephone number for display on the Buyer Desktop 501 and storage in the Buyer Phone Log Database 611.

As further depicted in FIG. 6, the Email and Calendaring System 617 is preferably linked to the Buyer Desktop 501 permit control of selected functions of the Email and Calendaring System 617 by buyer representative of Retailer 1 309 from the Buyer Desktop 501. The preferred integration of the Email and Calendaring System 617 with Buyer Desktop 501 is further described and demonstrated above in conjunction with FIG. 5.

As further depicted in FIG. 6, the Internal Systems 619 represents internal systems, such as accounting, purchasing, warehousing, shipping, etc., which preferably may send and/or receive information to/from the Buying System 401 via a connection with Server 601.

Figure 7:
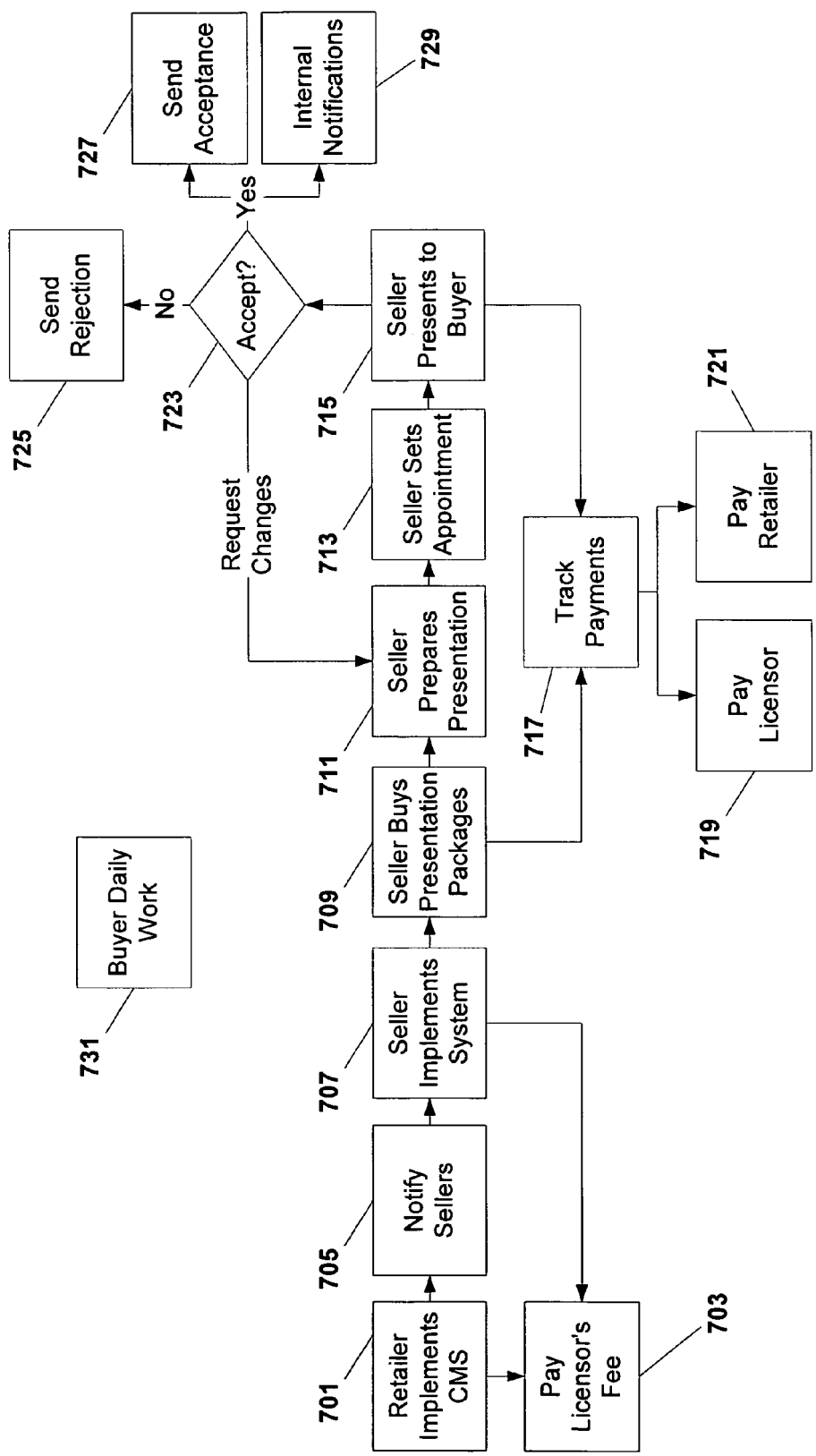
FIG. 7 is an overview block diagram illustrating the buying system implementation and usage business method according to preferred embodiments of the present invention.

Referring now to FIG. 7, an overview block diagram which illustrates the buying system implementation and usage business method according to preferred embodiments of the present invention, initially system licensor 301 preferably licenses the Buying System 401 to a retailer, preferably a chain of retail grocery stores, preferably any other class of retail trade, preferably any organization wishing to better manage the buying process (embodying herein offering at least one buying management system to such at least one for-retailer buying entity by at least one offeror; and licensing such at least one buying management system to such at least one for-retailer buying entity by such at least one offeror). Preferably, the Retailer 1 309 will license the Buying System 401 and implement it as shown in step Retailer Implements System 701. Additionally, system licensor 301 preferably will assist Retailer 1 309 in the initial set up and customization of the Buying System 401 and implementation of interfaces with internal software and telephone systems used by Retailer 1 309. As part of implementation, preferably each buyer representative of Retailer 1 309 completes the appropriate profile information as shown in FIG. 21. Additionally, the general security standards and individual security requirements are set up as shown in FIG. 9, FIG. 10, FIG. 11, FIG. 12 and FIG. 13. Finally, each buyer representative of Retailer 1 309 establishes the telephone system and telephone logging parameters preferably using the screens as shown in FIG. 37, FIG. 38, FIG. 39, FIG. 40, FIG. 41, FIG. 42 and FIG. 43. Preferably, all the set up parameters for security, the telephone system and telephone logging can be modified at any time by an authorized user.

As shown, in step Pay Licensor's Fee 703 Retailer 1 309 preferably pays system licensor 301 a license fee plus an implementation fee (embodying herein receiving license payment from such at least one for-retailer buying entity by such at least one offeror). In the step Notify Sellers 705, which is part of the implementation of the Buying System 401, Retailer 1 309 preferably notifies each Manufacturer/Broker 1 303 that all future product offering presentations must conform to the presentation standards required by the Retailer 1 309 (embodying herein permitting such at least one for-retailer buying entity to require such at least one retail-product-providing selling entity to use such buying management system for such at least one retail product offering presentation). Preferably, these requirements include use of the Buying System 401 to prepare, schedule and present the product offering of the Manufacturer/Broker 1 303. Additionally, preferably, each Manufacturer/Broker 1 303 is notified that they must purchase the right to make a product offering presentation using the Buying System 401 for each product offering they intend to present to Retailer 1 309. Preferably, it is the intent of Retailer 1 309 to eliminate most, if not all, face-to-face product offering presentations by sales representatives of each Manufacturer/Broker 1 303. Preferably, the cost of purchasing the right to make a product offering presentation to Retailer 1 309 will be less than the cost of traditional methods which include preparation of a unique presentation for each Retailer 1 309 and the cost of travel and time for making face-to-face presentations.

In the next step, Seller Implements System 707, each Manufacturer/Broker 1 303 will implement the portions of the Buying System 401 which are intended for use by sales representatives of the Manufacturer/Broker 1 303 with the assistance of system licensor 301. As part of the agreement with the Retailer 1 309 the Manufacturer/Broker 1 303 preferably agrees to use the Buying System 401 exclusively for presenting product offers and that acceptance of a product offer by the Retailer 1 309 constitutes acceptance of a contract offer from the Manufacturer/Broker 1 303. Therefore, the product offer, as presented, becomes an enforceable contractual agreement between the Manufacturer/Broker 1 303 and the Retailer 1 309.

Preferably, Manufacturer/Broker 1 303 will pay system licensor 301 fees for the software and implementation assistance. Preferably, the Manufacturer/Broker 1 303 may implement the software internally or elect to implement an Internet-based version. Preferably, sales representatives of Manufacturer/Broker 1 303 utilize a module of the Buying System 401 intended for preparation of presentation package, presentation appointment scheduling, presentation of the presentation package to a buyer representative of Retailer 1 309. Additionally, other optional analytical support modules may be implemented by a Manufacturer/Broker 1 303. Examples of optional modules available to a Manufacturer/Broker 1 303 include:

- The Executive Management System, a top management communication and reporting system for key executives, preferably has standardized forms and reports that can be tailored to the specific needs of any Manufacturer/Broker 1 303.
- The Regional Management System, a mid-management communication and reporting system for mid level managers, preferably has standardized forms and reports that can be tailored to the specific needs of any Manufacturer/Broker 1 303.
- The Salesman Management System, a direct salesman management, communication, and reporting system for direct salesmen, preferably has standardized forms and reports that can he tailored to the specific needs of any Manufacturer/Broker 1 303.
- The Broker Management System, a broker salesman management, communication, and reporting system for broker salesmen, preferably has standardized forms and reports that can be tailored to the specific needs of any Manufacturer/Broker 1 303.

As part of implementation preferably sales representatives of Manufacturer/Broker 1 303 complete the appropriate profile information as shown in FIG. 20 and FIG. 22.

Figure 25:
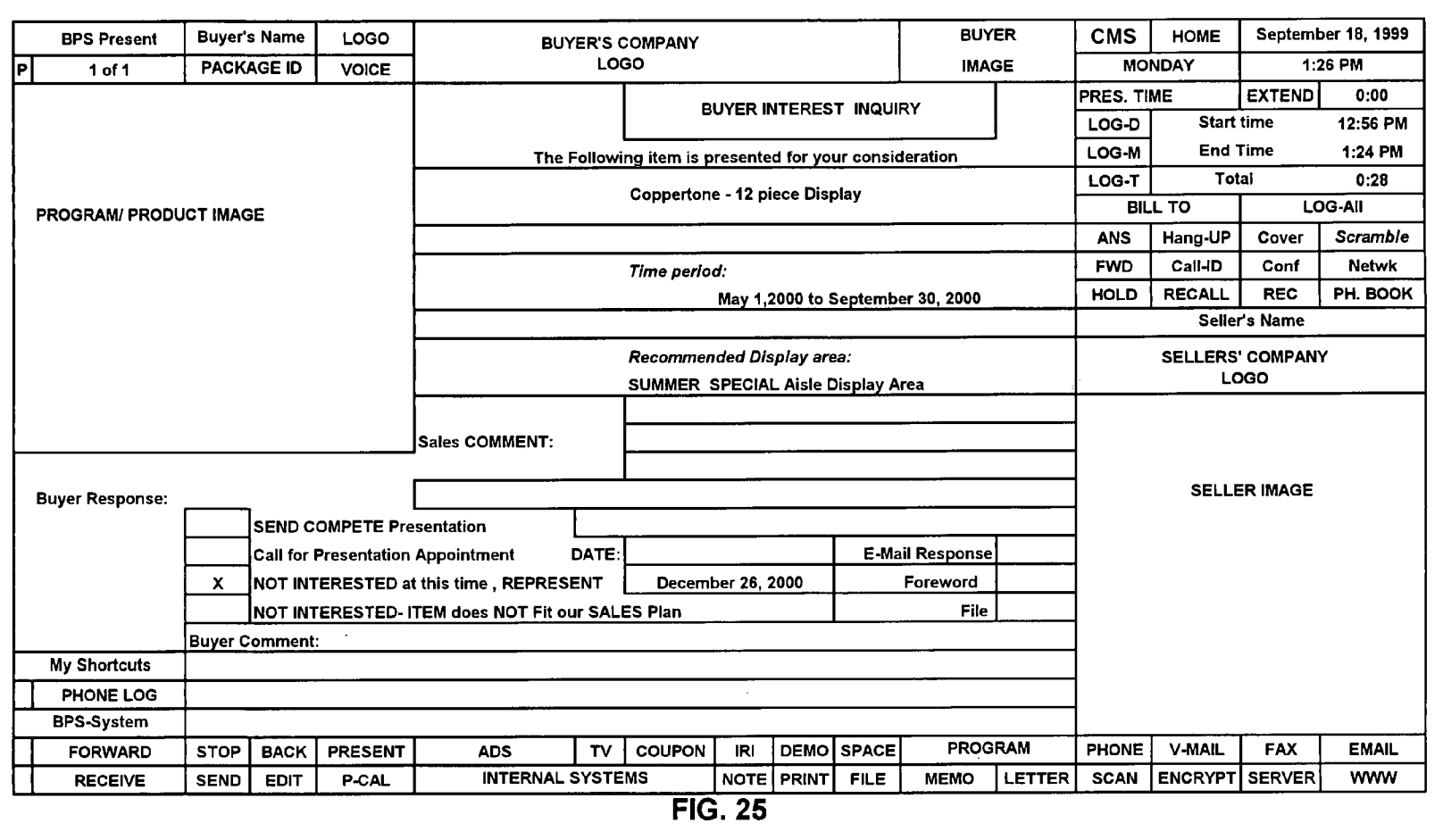

After completing implementation of the portions of the Buying System 401 which are intended for use by sales representatives of the Manufacturer/Broker 1 303 each Manufacturer/Broker 1 303 preferably may begin preparation for presentation of product proposals to the Retailer 1 309. This process begins with step Seller Buys Presentation Packages 709 in which a sales representative of Manufacturer/Broker 1 303 obtains the right to prepare and present one product offering to a buyer representative of Retailer 1 309 for a fee amount set by the Retailer 1 309 (embodying herein receiving payment from such at least one retail-product-providing selling entity for such at least one proposal package). The fee amount and the amount of presentation time allotted preferably will vary depending on the type of presentation package selected by a sales representatives of Manufacturer/Broker 1 303. Preferably the nature of the product offering a sales representative of Manufacturer/Broker 1 303 wishes to present will determine which presentation package is selected. Preferably, there will be at least three types of presentation packages. One is a buyer interest inquiry package which contains only summary information and is sent to a buyer representative of Retailer 1 309 and is not intended to be formally presented by a sales representative of Manufacturer/Broker 1 303 (embodying herein at least one proposal package comprises at least one interest inquiry proposal package). The buyer representative of Retailer 1 309 may review the presentation package and make an immediate decision to reject it or request a full presentation of the product offering. FIG. 25 provides an example of a preferred buyer interest inquiry package as it would be viewed by a buyer representative of Retailer 1 309. The product introduction presentation package is the second type of presentation package is preferably intended for product offerings which represent the introduction of new products or are intended for single use in a defined timeframe, such as a seasonal promotion of a product (embodying herein at least one proposal package comprises at least one product introduction proposal package). Typically, these presentation packages preferably do not require updates or ongoing adjustments. Example screens for a preferred product introduction presentation package, as it would be viewed by a buyer representative of Retailer 1 309, are shown in FIG. 26, FIG. 27, FIG. 28, FIG. 29, FIG. 30, FIG. 31, FIG. 32, FIG. 33 and FIG. 34. The ongoing product program presentation package is the third type of presentation package and is preferably intended of product offerings which include annual marketing and promotion plans (embodying herein at least one proposal package comprises at least one on-going product proposal package). Typically, these presentation packages require periodic update (often quarterly), presentation, review and acceptance by buyer representative of Retailer 1 309. Preferably the ongoing product program presentation package, as it would be viewed by a buyer representative of Retailer 1 309, will utilize the same screens as the product introduction presentation package which are shown in FIG. 26, FIG. 27, FIG. 28, FIG. 29, FIG. 30, FIG. 31, FIG. 32, FIG. 33 and FIG. 34.

Preferably, presentation packages will be purchased from system licensor 301. Preferably, purchase of a presentation package entitles a sales representative of Manufacturer/Broker 1 303 to prepare and present a selected product offering to a selected Retailer 1 309 once. Upon receipt of the payment by system licensor 301 preferably provides the sales representative of Manufacturer/Broker 1 303 with an access code which links the product offering, the Manufacturer/Broker 1 303 and the Retailer 1 309 (embodying herein issuing at least one authorization to present such at least one proposal package to such at least one retail-product-providing selling entity; and associating such at least one authorization with such at least one for-retailer buying entity). The access code is then is stored in the Packages and Appointment Schedules database 609 and used to control access by the sales representative of Manufacturer/Broker 1 303 and track when the presentation package is presented. Preferably, a presentation package may be presented only once to the selected Manufacturer/Broker 1 303 unless changes or updates are requested by the buyer representative of Retailer 1 309. If a presentation package requires updating preferably the Manufacturer/Broker 1 303 is required to make an additional payment to system licensor 301. Additionally, preferably system licensor 301 retains the payment for allocation at completion of the presentation of the presentation package by the sales representative of Manufacturer/Broker 1 303 as part of step Track Payments 717.

In the step Seller Prepares Presentation 711 the required descriptions of each component of the presentation package are prepared and input by the sales representative of Manufacturer/Broker 1 303 (embodying herein permitting preparation of such at least one proposal package using such at least one retail product offering by at least one sales representative of such at least one retail-product-providing selling entity). Preferably, a standard outline required by the product introduction package includes several components, including:
   i) product presentation control,
   ii) product offering key points,
   iii) print advertising support plans,
   iv) television advertising support plans,
   v) coupon support plans,
   vi) market research analysis,
   vii) demonstration support plans analysis,
   viii) product placement recommendations,
   ix) product offering summary display (embodying herein at least one standard presentation outline).

Preferably, Manufacturer/Broker 1 303 may purchase presentation packages for presentation of the same product offering to more than one Retailer 1 309, but each unique combination of Manufacturer/Broker 1 303, product offering and Retailer 1 309 is assigned a unique access code. However, the same product offering content preferably may be used for all presentation packages thus saving Manufacturer/Broker 1 303 significant preparation time and improving the consistency of the presentation of the product offering to each Retailer 1 309. Preferably the presentation package preparation module will permit the sales representative of Manufacturer/Broker 1 303 to input text information, upload images and graphics, and include links to Internet-based information as necessary to complete each of the components of a presentation package. Preferably, the sales representative of Manufacturer/Broker 1 303 has access to the presentation package and may change it until the start of the presentation to a buyer representative of Retailer 1 309. Finally, preferably, the presentation package preparation module will not permit presentation to a buyer representative of Retailer 1 309 until all components of the presentation package have been completed to ensure consistency and completeness of each presentation package when it is presented. Example screens of a product introduction or ongoing product program presentation package are shown in FIG. 26, FIG. 27, FIG. 28, FIG. 29, FIG. 30, FIG. 31, FIG. 32, FIG. 33 and FIG. 34 (embodying herein at least one standard presentation outline comprises at least five of the group consisting essentially of: product presentation control display, product offering key points display, print advertising support plans display, television advertising support plans display, coupon support plans display, market research analysis display, demonstration support plans analysis, product placement recommendations, and product offering summary display).

In step Seller Sets Appointment 713 the sales representative of Manufacturer/Broker 1 303 will schedule a presentation appointment with the buyer representative of Retailer 1 309 when the presentation package is complete (embodying herein permitting scheduling at least one appointment with such at least one buying representative to present such at least one prepared proposal package by such at least one retail-product-providing selling entity). The appointment scheduling process is preferably controlled by the presentation calendar module of the Buying System 401. Preferably, each buyer representative of Retailer 1 309 defines to the presentation calendar module the times he or she is available for scheduled presentations each working day. Each sales representative of Manufacturer/Broker 1 303 preferably may view the presentation calendar for a buyer representative of Retailer 1 309 and request a particular date and time. If the requested date and time are acceptable to the buyer representative of Retailer 1 309 preferably sales representative of Manufacturer/Broker 1 303 is notified and the agreed presentation date and time are blocked on the presentation calendar for the buyer representative of Retailer 1 309. Preferably, the presentation calendar module will send appointment reminders at pre-set intervals prior to the scheduled appointment. Finally, the presentation calendar module preferably will also initiate the necessary connections to the presentation package, preferably Internet web site based, preferably internal server based to permit both the sales representative of Manufacturer/Broker 1 303 and the buyer representative of Retailer 1 309 to view and control the presentation of the presentation package.

Figure 36:
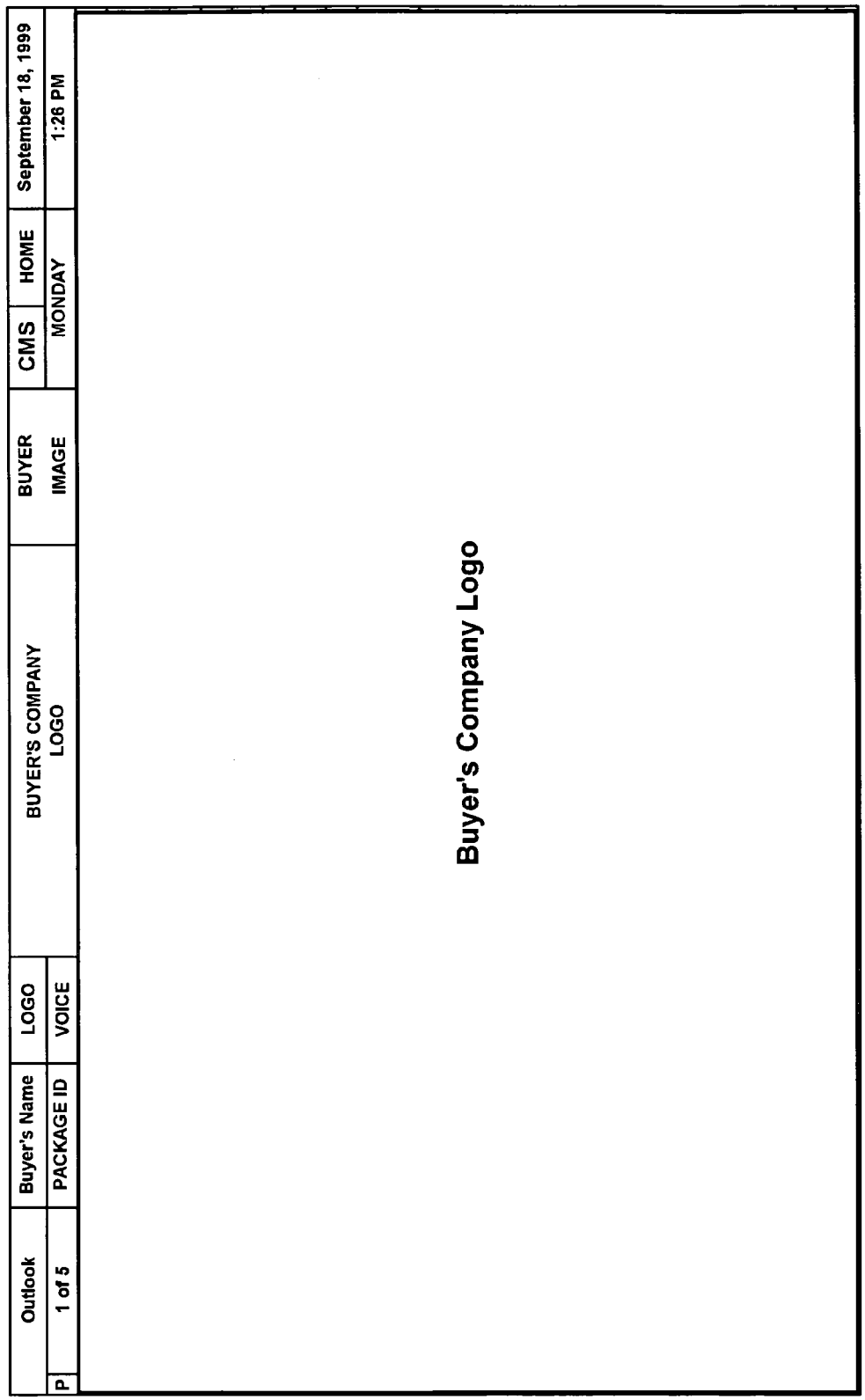
FIG. 36 is a diagrammatic view which illustrates a preferred usage of a "full screen cover" used to hide a sensitive portion of the active screen area of screen without modifying or losing the underlying information displayed on the screen according to a preferred embodiment of the present invention.

In the step Seller Presents to Buyer 715 preferably both the sales representative of Manufacturer/Broker 1 303 and the buyer representative of Retailer 1 309 view the presentation of the presentation package, remotely from each of their offices respectively, as each component is presented automatically (embodying herein permitting presentation of such at least one prepared proposal package by such at least one sales representative to at least one buying representative of such at least one for-retailer buying entity; and permitting remote presentation of such at least one prepared proposal package to such at least one buying representative by such at least one sales representative). Preferably, both the sales representative of Manufacturer/Broker 1 303 and the buyer representative of Retailer 1 309 are connected via telephone to permit discussion of each of the components as they are presented. Preferably, the buyer representative of Retailer 1 309 may override the automated presentation of the components to permit additional review or discussion or to skip components which require little or no discussion. Preferably, the presentation of each component of the presentation package is timed to permit completion of the entire presentation within the timeframe of the scheduled appointment. If the presentation requires additional time to complete, the buyer representative of Retailer 1 309 may permit extensions of time in increments defined by the buyer representative of Retailer 1 309. Depending on the reason for the presentation time extension the buyer may authorize billing the Manufacturer/Broker 1 303 for the overrun. The buyer preferably may designate the billing of the presentation time extension within the phone logging system module of the Buying System 401. At the conclusion of the presentation the presentation package is "locked" and the sales representative of Manufacturer/Broker 1 303 is prevented from making any changes to the presentation package. Examples of the presentation package screen components are shown in FIG. 26, FIG. 27, FIG. 28, FIG. 29, FIG. 30, FIG. 31, FIG. 32, FIG. 33 and FIG. 34. If the buyer representative of Retailer 1 309 places the presentation on hold, for whatever reason, preferably the presentation may be covered partially or completely by selecting logo of the Retailer 1 309 at the top of the screen as shown in FIG. 35 and FIG. 36.

Preferably, no presentation is scheduled for buyer interest inquiry presentation package. As shown in FIG. 25, it is a single screen of summary information from which a buyer representative of Retailer 1 309 may choose to request a full presentation, reject the inquiry or reconsider the product offering at a later date (embodying herein at least one proposal package comprises at least one interest inquiry proposal package).

Preferably, for ongoing product program presentations the scheduled appointment may be for the initial presentation or for presentation of the updated product offering (embodying herein at least one proposal package comprises at least one on-going product proposal package). In either case the preferred process of presentation of the presentation package is the same.

Preferably, completion of the presentation of the presentation package results in the status of the presentation package being changed to "completed" in the Packages and Appointment Schedule database 609 (embodying herein recording completion of such presentation of such at least one prepared proposal package).

In step Track Payments 717, preferably the status of each presentation package is essentially periodically reviewed and presentation packages which have been completed preferably have the presentation package payment amount allocated on a pre-set basis between system licensor 301 and Manufacturer/Broker 1 303 and payment instructions prepared (embodying herein calculating at least one first portion of such at least one payment from such at least one retail-product-providing selling entity to be paid to such at least one for-retailer buying entity; and calculating at least one second portion of such at least one payment from such at least one retail-product-providing selling entity to be paid to such at least one offeror).

In step Pay Licensor 719 and step Pay Retailer 721 the amounts allocated in step Track Payments 717 are paid to the respective parties (embodying herein paying at least one first portion of such at least one payment from such at least one retail-product-providing selling entity to be paid to such at least one for-retailer buying entity; and paying at least one second portion of such at least one payment from such at least one retail-product-providing selling entity to be paid to such at least one offeror).

In step Accept? 723, preferably at the conclusion of the presentation of either the product introduction presentation package or an ongoing product offering presentation package the buyer representative of Retailer 1 309 must take action. He or she may choose to accept the product offering, reject it, request changes in the product offering, or mark the presentation package as "pending" which preferably places it in an electronic tickler file for consideration at a later date (embodying herein recording decision about such at least one presented proposal package by such at least one buying representative). Preferably, the buyer representative of Retailer 1 309 is required to make a decision on each product offering at some point. Preferably, the buyer representative of Retailer 1 309 may optionally request review and approval of the presented product offering of any presented presentation package placed in a pending status. Preferably, the Buying System 401 permits the presented presentation package to be viewed by other authorized users of the Retailer 1 309 such as members of a buying committee charged with responsibility for evaluating product offers (embodying herein notifying at least one buying review representative of such at least one for-retailer buying entity; and permitting review of such at least one presented proposal package by such at least one buying review representative). Preferably, the Buying System 401 permits each authorized user to provide notes linked to the presentation package regarding their assessment of the product offer (embodying herein recording at least one comment by such at least one buying review representative). Preferably, the buyer representative of Retailer 1 309 may review the notes of the buying committee members and make a final decision about a presented product offer (embodying herein permitting such at least one buying representative to review such at least one recorded comment).

If the buyer representative of Retailer 1 309 requests changes in the product offering the presentation package is "unlocked" and made available to the sales representative of Manufacturer/Broker 1 303 to make the requested changes (embodying herein permitting requesting at least one alteration to such at least one presented proposal package by such at least one buying representative; and notifying such at least one selling representative of such at least one requested alteration to such at least one presented proposal package). The sales representative of Manufacturer/Broker 1 303 then will make the necessary changes and repeat the steps Seller Sets Appointment 713 and Seller Presents to Buyer 715 as described above (embodying herein permitting alteration of such at least one presented proposal package by such at least one selling representative; and permitting remote presentation of such at least one altered proposal package by such at least one selling representative to such at least one buying representative).

In step Send Rejection 725, if the buyer representative of Retailer 1 309 rejects the product offering the sales representative of Manufacturer/Broker 1 303 is essentially automatically notified and presentation package is changed to a rejected status (embodying herein recording rejection of such at least one presented proposal package by such at least one buying representative; and substantially automatically notifying such at least one selling representative of such rejection of such at least one presented proposal package by such at least one buying representative).

In step Send Acceptance 727, the Manufacturer/Broker 1 303 is automatically notified that the product offer has been accepted as presented when the buyer accepts the product offer and it is recorded by the system (embodying herein recording approval of such at least one presented proposal package by such at least one buying representative; and substantially automatically notifying such at least one selling representative of such approval of such at least one presented proposal package by such at least one buying representative). As noted, acceptance of a product offer by the Retailer 1 309 constitutes acceptance of a contract offer from the Manufacturer/Broker 1 303.

In step Internal Notification 729, when a product offer is accepted by the Retailer 1 309 various other departments with the Retailer 1 309 are essentially automatically informed of the details of the product offer which directly involve them (embodying herein substantially automatically notifying at least one operations representative of such at least one for-retailer buying entity of such approval of such at least one presented proposal package). Examples of departments concerned about preferably comprise receiving, distribution, accounts payable and others. Thus, the process is streamlined and formalized.

Figure 24:
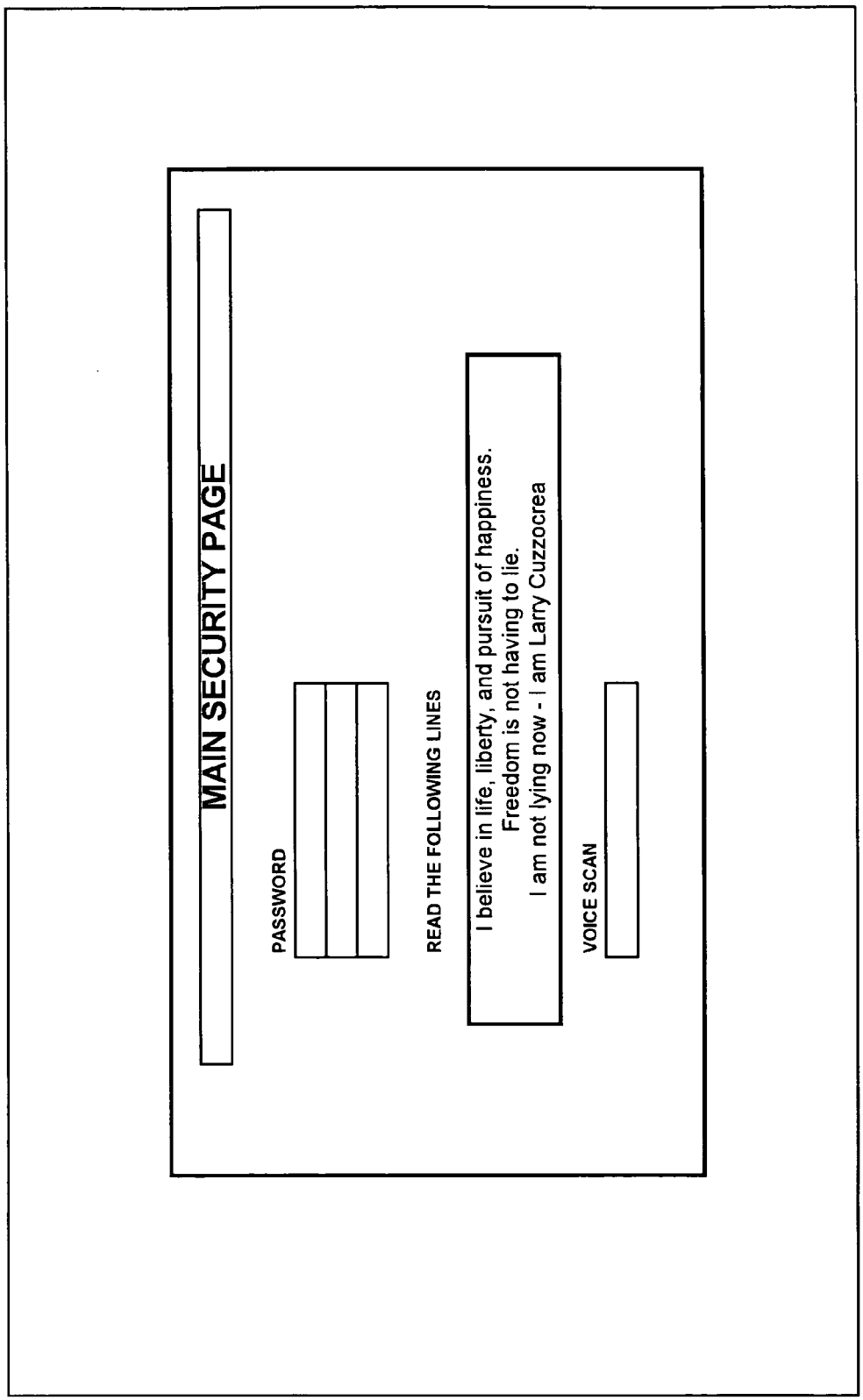
FIG. 24 is a diagrammatic view which illustrates a preferred user management screen which permits authorized users and their passwords and voice prints to login to primary functional areas of the instant system according to a preferred embodiment of the present invention.

In addition to typical processes of reviewing and accepting product offers as integral part of the buying activities a buyer representative of Retailer 1 309 must manage and complete related buying activities which are in step Buyer Daily Work 731. Preferably, the Buying System 401 is an integral part of these daily activities. Preferably, a buyer representative of Retailer 1 309 will login to the Buying System 401 each day to access to manage his or her daily communications and personal calendar. An example of the preferred login screen is shown in FIG. 24. Depending on security settings each buyer representative of Retailer 1 309 preferably may be required to login using a password and a voice print match.

Preferably, after logging in the buyer representative of Retailer 1 309 will be presented with the integrated desktop screen as shown in FIG. 8. Preferably the buyer may access any of the functions available from this screen, including his or her email, calendar, task list or analysis reports. Examples of these screens and the information presented are shown in FIG. 14, FIG. 15, FIG. 16, FIG. 17, FIG. 18, and FIG. 19. To permit seamless access to the typical email messaging, calendaring and task list functions the Buying System 401 is integrated with preferably Microsoft Outlook. Upon reading the teachings of this specification, those with ordinary skill in the art will now understand that, under appropriate circumstances, considering issues such as costs and the requirements of the Manufacturer/Broker 1 303 other arrangements may suffice, such as, integration of the Buying System 401 with other similar email, calendaring and task list applications. As shown in FIG. 15, the buyer representative of Retailer 1 309 may choose to hide the phone log portion of the screen to facilitate a full screen display of the selected email, calendar, report or task list function beyond the normal Active Screen Area 515. As shown in FIG. 18, FIG. 49, FIG. 50, and FIG. 51 each buyer representative of Retailer 1 309 may preferably access a variety of analysis reports which are integrated with the Buying System 401.

Additionally, as shown in FIG. 44, FIG. 45, FIG. 46 and FIG. 47 each buyer may review the phone logs of all incoming and outgoing calls which have been logged by the Buying System 401 (embodying herein recording at least one telephone log entry relating to at least one telephone call received by such at least one buying representative; and recording such at least one telephone log entry relating to at least one telephone call placed by such at least one buying representative). As shown in FIG. 44 any phone call can be selected and automatically billed to a Manufacturer/Broker 1 303 at the discretion of the buyer representative of Retailer 1 309 (embodying herein permitting such at least one buying representative to identify such at least one telephone log entry as billable; substantially automatically creating at least one invoice related to each such identified telephone log entry; receiving payment from such at one retail-product-providing selling entity related to such at least one invoice). Preferably the phone log may be expanded beyond the normal Active Screen Area 515 as shown in FIG. 45 to facilitate review of the calls and facilitate the billing decision. Preferably, phone calls associated with presentation of presentation packages are also logged and presented.

Finally, preferably each buyer representative of Retailer 1 309 may access a personal home page, as shown in FIG. 52, for the purpose of managing activities such as expense reports, mileage tracking and other personal, but business related activities without exiting from the Buying System 401.

Although applicant has described applicant's preferred embodiments of this invention, it will be understood that the broadest scope of this invention includes such modifications as diverse shapes and sizes and materials. Such scope is limited only by the below claims as read in connection with the above specification.

Further, many other advantages of applicant's invention will be apparent to those skilled in the art from the above descriptions and the below claims.

What is claimed is:

1. A method, relating to managing presentation of at least one retail product offering by at least one retail-product-providing selling entity to at least one for-retailer buying entity, comprising the steps of:
   a) offering at least one buying management system to such at least one for-retailer buying entity by at least one offeror;
   b) wherein such at least one buying management system comprises at least one proposal package for use by such at least one retail-product-providing selling entity; and
   c) authorizing such at least one retail-product-providing selling entity to use such at least one proposal package to present such at least one retail product offering to such at least one for-retailer buying entity;
   d) wherein such step of authorizing such at least one retail-product-providing selling entity to use such at least one proposal package to present such at least one retail product offering to such at least one for-retailer buying entity comprises the steps of:
      i) receiving payment from such at least one retail-product-providing selling, entity for such at least one proposal package;
      ii) issuing at least one authorization to present such at least one proposal package to such at least one retail-product-providing selling entity;
      iii) associating such at least one authorization with such at least one for-retailer buying entity;
      iv) preparing such at least one proposal package using such at least one retail product offering by at least one sales representative of such at least one retail-product-providing selling entity;
      v) presenting such at least one prepared proposal package by such at least one sales representative to at least one buying representative of such at least one for-retailer buying entity;
      vi) scheduling at least one appointment with such at least one buying representative to present such at least one prepared proposal package by such at least one retail-product-providing selling entity;
      vii) remotely presenting such at least one prepared proposal package to such at least one buying representative by such at least one sales representative; and
      viii) recording completion of such presentation of such at least one prepared proposal package.

2. The method according to claim 1 wherein such step of authorizing such at least one retail-product-providing selling entity to use such at least one proposal package to present such at least one retail product offering to such at least one for-retailer buying entity further comprises the step of authorizing such at least one for-retailer buying entity to require such at least one retail-product-providing selling entity to use such buying management system for such at least one retail product offering presentation.

3. The method according to claim 1 wherein such step of authorizing such at least one retail-product-providing selling entity to use such at least one proposal package to present such at least one retail product offering to such at least one for-retailer buying entity further comprises the steps of:
   a) calculating at least one first portion of such at least one payment from such at least one retail-product-providing selling entity to be paid to such at least one for-retailer buying entity;
   b) calculating at least one second portion of such at least one payment from such at least one retail-product-providing selling entity to be paid to such at least one offeror;
   c) paying at least one first portion of such at least one payment from such at least one retail-product-providing selling entity to be paid to such at least one for-retailer buying entity; and
   d) paying at least one second portion of such at least one payment from such at least one retail-product-providing selling entity to be paid to such at least one offeror.

4. The method according to claim 1 wherein such step of authorizing such at least one retail-product-providing selling entity to use such at least one proposal package to present such at least one retail product offering to such at least one for-retailer buying entity further comprises the step of recording decision about such at least one presented proposal package by such at least one buying representative.

5. The method according to claim 4 wherein the step of recording decision about such at least one presented proposal package by such at least one buying representative comprises the steps of:
   a) requesting at least one alteration to such at least one presented proposal package by such at least one buying representative;
   b) notifying such at least one selling representative of such at least one requested alteration to such at least one presented proposal package;
   c) altering such at least one presented proposal package by such at least one selling representative; and
   d) presenting such at least one altered proposal package by such at least one selling representative to such at least one buying representative.

6. The method according to claim 4 wherein the step of recording decision about such at least one presented proposal package by such at least one buying representative comprises the steps of:
   a) recording rejection of such at least one presented proposal package by such at least one buying representative; and
   b) substantially automatically notifying such at least one selling representative of such rejection of such at least one presented proposal package by such at least one buying representative.

7. The method according to claim 4 wherein the step of recording decision about such at least one presented proposal package by such at least one buying representative comprises the steps of:
   a) recording approval of such at least one presented proposal package by such at least one buying representative;
   b) substantially automatically notifying such at least one selling representative of such approval of such at least one presented proposal package by such at least one buying representative; and
   c) substantially automatically notifying at least one operations representative of such at least one for-retailer buying entity of such approval of such at least one presented proposal package.

8. The method according to claim 7 wherein the step of recording approval of such at least one presented proposal package by such at least one buying representative comprises the steps of:
   a) notifying at least one buying review representative of such at least one for-retailer buying entity;
   b) reviewing such at least one presented proposal package by such at least one buying review representative;
   c) recording at least one comment by such at least one buying review representative: and
   d) reviewing such at least one recorded comment by such at least one buying review representative.

9. The method according to claim 1 wherein such at least one proposal package comprises at least one interest inquiry proposal package.

10. The method according to claim 1 wherein such at least one proposal package comprises at least one on-going product proposal package.

11. The method according to claim 1 wherein such at least one proposal package comprises at least one product introduction proposal package.

12. The method according to claim 11 wherein such at least one product introduction proposal package comprises:
   a) at least one standard presentation outline;
   b) wherein such at least one standard presentation outline comprises at least five of the group consisting essentially of
      i) product presentation control display,
      ii) product offering key points display,
      iii) print advertising support plans display,
      iv) television advertising support plans display,
      v) coupon support plans display,
      vi) market research analysis display,
      vii) demonstration support plans analysis,
      viii) product placement recommendations, and
      ix) product offering summary display.

13. The method according to claim 1 wherein the step of offering such at least one buying management system to such at least one for-retailer buying entity comprises the steps of:
   a) licensing such at least one buying management system to such at least one for-retailer buying entity by such at least one offeror; and
   b) receiving license payment from such at least one for-retailer buying entity by such at least one offeror.

14. The method according to claim 1 wherein such step of authorizing such at least one retail-product-providing selling entity to use such at least one proposal package to present such at least one retail product offering to such at least one for-retailer buying entity further comprises the steps of:
   a) recording at least one telephone log entry relating to at least one telephone call received by such at least one buying representative; and
   b) recording such at least one telephone log entry relating to at least one telephone call placed by such at least one buying representative.

15. The method according to claim 14 further comprising the steps of:
   a) identifying by such at least one buying representative, such at least one telephone log entry as billable;
   b) substantially automatically creating at least one invoice related to each such identified telephone log entry; and
   c) receiving payment from such at one retail-product-providing selling entity related to such at least one invoice.

16. A method, relating to managing presentation of at least one retail product offering by at least one retail-product-providing selling entity to at least one for-retailer buying entity, comprising the steps of:
   a) offering at least one buying management system to such at least one for-retailer buying entity by at least one offeror;
   b) wherein such at least one buying management system comprises at least one proposal package for use by such at least one retail-product-providing selling entity;
   c) authorizing such at least one for-retailer buying entity to require such at least one retail-product-providing selling entity to use such buying management system for such at least one retail product offering presentation;
   d) receiving payment from such at least one retail-product-providing selling entity for such at least one proposal package;
   e) issuing at least one authorization to present such at least one proposal package to such at least one retail-product-providing selling entity,
   f) associating such at least one authorization with such at least one for-retailer buying entity;

g) preparing such at least one proposal package using such at least one retail product offering by at least one sales representative of such at least one retail-product-providing selling entity;

h) scheduling at least one appointment with such at least one buying representative to present such at least one prepared proposal package by such at least one retail-product-providing selling entity;

i) remotely presenting such at least one prepared proposal package to such at least one buying representative by such at least one sales representative j) recording completion of such presentation of such at least one prepared proposal package;

k) recording decision about such at least one presented proposal package by such at least one buying representative;

l) calculating at least one first portion of such at least one payment from such at least one retail-product-providing selling entity to be paid to such at least one for-retailer buying entity;

m) calculating at least one second portion of such at least one payment from such at least one retail-product-providing selling entity to be paid to such at least one offeror;

n) paying at least one first portion of such at least one payment from such at least one retail-product-providing selling entity to be paid to such at least one for-retailer buying entity; and o) paying at least one second portion of such at least one payment from such at least one retail-product-providing selling entity to be paid to such at least one offeror.

17. The method according to claim 16 wherein the step of recording decision about such at least one presented proposal package by such at least one buying representative comprises the steps of:

a) requesting at least one alteration to such at least one presented proposal package by such at least one buying representative;

b) notifying such at least one selling representative of such at least one requested alteration to such at least one presented proposal package;

c) altering such at least one presented proposal package by such at least one selling representative;

d) remotely presenting such at least one altered proposal package by such at least one selling representative to such at least one buying representative;

e) recording rejection of such at least one presented proposal package by such at least one buying representative;

f) substantially automatically notifying such at least one selling representative of such rejection of such at least one presented proposal package by such at least one buying representative;

g) recording approval of such at least one presented proposal package by such at least one buying representative;

h) wherein the step of recording approval of such at least one presented proposal package by such at least one buying representative comprises the steps of
  i) notifying at least one buying review representative of such at least one for-retailer buying entity,
  ii) reviewing such at least one presented proposal package by such at least one buying review representative,
  iii) recording at least one comment by such at least one buying review representative, and
  iv) authorizing such at least one buying representative to review such at least one recorded comment;

i) substantially automatically notifying such at least one selling representative of such approval of such at least one presented proposal package by such at least one buying representative; and j) substantially automatically notifying at least one operations representative of such at least one for-retailer buying entity of such approval of such at least one presented proposal package.

18. The method according to claim 16 wherein such at least one proposal package comprises:

a) at least one interest inquiry proposal package;

b) at least one on-going product proposal package;

c) at least one product introduction proposal package;

d) wherein such at least one product introduction proposal package comprises at least one standard presentation outline;

e) wherein such at least one standard presentation outline comprises at least five of the group consisting essentially of
  i) product presentation control display,
  ii) product offering key points display,
  iii) print advertising support plans display,
  iv) television advertising support plans display,
  v) coupon support plans display,
  vi) market research analysis display,
  vii) demonstration support plans analysis,
  viii) product placement recommendations, and
  ix) product offering summary display.

19. The method according to claim 16 wherein the step of offering such at least one buying management system to such at least one for-retailer buying entity comprises the steps of:

a) licensing such at least one buying management system to such at least one for-retailer buying entity by such at least one offeror; and b) receiving license payment from such at least one for-retailer buying entity by such at least one offeror.

20. The method according to claim 16 further comprising the steps of:

a) recording at least one telephone log entry relating to at least one telephone call received by such at least one buying representative;

b) recording such at least one telephone log entry relating to at least one telephone call placed by such at least one buying representative;

c) authorizing such at least one buying representative to identify such at least one telephone log entry as billable;

d) substantially automatically creating at least one invoice related to each such identified telephone log entry; and e) receiving payment from such at one retail-product-providing selling entity related to such at least one invoice.

* * * * *